(12) United States Patent
Tsukuba

(10) Patent No.: US 12,501,057 B2
(45) Date of Patent: Dec. 16, 2025

(54) IMAGE PROCESSING APPARATUS AND METHOD

(71) Applicant: Sony Group Corporation, Tokyo (JP)

(72) Inventor: Takeshi Tsukuba, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 19 days.

(21) Appl. No.: 18/682,453

(22) PCT Filed: Sep. 14, 2022

(86) PCT No.: PCT/JP2022/034320
§ 371 (c)(1),
(2) Date: Feb. 9, 2024

(87) PCT Pub. No.: WO2023/053957
PCT Pub. Date: Apr. 6, 2023

(65) Prior Publication Data
US 2024/0357129 A1    Oct. 24, 2024

Related U.S. Application Data

(60) Provisional application No. 63/249,082, filed on Sep. 28, 2021.

(51) Int. Cl.
*H04N 19/159*    (2014.01)
*H04N 19/172*    (2014.01)
*H04N 19/46*     (2014.01)

(52) U.S. Cl.
CPC ......... *H04N 19/159* (2014.11); *H04N 19/172* (2014.11); *H04N 19/46* (2014.11)

(58) Field of Classification Search
CPC .... H04N 19/159; H04N 19/172; H04N 19/46; H04N 19/593; H04N 19/107; H04N 19/174; H04N 19/70
See application file for complete search history.

(56) References Cited

U.S. PATENT DOCUMENTS

| 2023/0026492 A1* | 1/2023 | Ikai ....................... H04N 19/184 |
| 2023/0262248 A1* | 8/2023 | Hendry ................ H04N 19/188 |
| | | 375/240.26 |
| 2024/0146944 A1* | 5/2024 | Ikai ....................... H04N 19/174 |

OTHER PUBLICATIONS

Bross et al., "Versatile Video Coding Editorial Refinements on Draft 10", Joint Video Experts Team (JVET) of ITU-T SG 16 WP 3 and ISO/IEC JTC 1/SC 29, Document: JVET-T2001-v 2, Oct. 7-16, 2020, pp. 1-511. (Year: 2020).*

(Continued)

*Primary Examiner* — Dramos Kalapodas
(74) *Attorney, Agent, or Firm* — XSENSUS LLP

(57) ABSTRACT

The present disclosure relates to an image processing apparatus and method that enable a specification of a bitstream to correspond to a profile more reliably.
In a case where a predetermined condition is satisfied, a moving image as an encoding target is encoded with a picture type of all pictures set as an I-picture. Furthermore, a bitstream of a moving image as a decoding target is decoded, and it is checked whether the picture type of all pictures of the moving image is the I-picture in the bitstream in a case where a predetermined condition is satisfied. The present disclosure can be applied to, for example, an image processing apparatus, an image processing method, or the like.

18 Claims, 27 Drawing Sheets

(56) References Cited

OTHER PUBLICATIONS

Suzuki (Sony) T: "AHG 5 and 18: Profiles for Range Extensions", 15. JCT-VC Meeting; Oct. 23, 2013-Jan. 11, 2013; Geneva; (Joint Collaborative Team on Video Coding of ISO/IEC JTC1/S, (Year: 2013).*

Bross et al., "Versatile Video Coding Editorial Refinements on Draft 10", Joint Video Experts Team (JVET) of ITU-T SG 16 WP 3 and ISO/IEC JTC 1/SC 29, Document: JVET-T2001—vol. 2, Sep. 21, 2022, pp. 1-511.

Bossen et al., "VVC operation range extensions (Draft 3)", Joint Video Experts Team (JVET) of ITU-T SG 16 WP 3 and ISO/IEC JTC 1/SC 29, Document: JVET-V2005—vol. 1, May 8, 2021, pp. 1-19.

Chen et al., "Algorithm description for Versatile Video Coding and Test Model 13 (VTM 13)", Joint Video Experts Team (JVET) of ITU-T SG 16 WP 3 and ISO/IEC JTC 1/SC 29, Document: JVET-V2002—vol. 1, Jul. 5, 2021, pp. 1-102.

Ikai et al., "Suggested initial profile text for VVC operation range extension", Joint Video Experts Team (JVET) of ITU-T SG 16 WP 3 and ISO/IEC JTC 1/SC 29, Document: JVET-W0136—vol. 5, Jul. 16, 2021, pp. 1-27.

International Search Report and Written Opinion mailed on Nov. 22, 2022, received for PCT Application PCT/JP2022/034320, filed on Sep. 14, 2022, 6 pages including English Translation.

Suzuki (Sony) T: "AHG 5 and 18: Profiles for Range Extensions", 15. JCT-VC Meeting; Oct. 23, 2013-Jan. 11, 2013; Geneva; (Joint Collaborative Team on Video Coding of ISO/IEC JTC1/S.

* cited by examiner

FIG. 1

| METHOD 1 | IN CASE WHERE PREDETERMINED CONDITION IS SATISFIED, PICTURE TYPE OF ALL PICTURES IS LIMITED TO I-PICTURE |
|---|---|
| METHOD 1-1 | NAL UNIT TYPE OF ALL VCL NAL UNITS AS DECODING TARGET PICTURE IS LIMITED TO "VALUE INDICATING IRAP" |
| METHOD 1-2 | IN CASE OF INTRA PROFILE, PICTURE TYPE OF ALL PICTURES IS LIMITED TO I-PICTURE |
| METHOD 1-3 | IN CASE WHERE CONTROL FLAG IS TRUE, PICTURE TYPE OF ALL PICTURES IS LIMITED TO I-PICTURE |

FIG. 2

In bitstreams conforming to the Main 12 Intra, Main 12 4:4:4 Intra, or Main 16 4:4:4 Intra profiles, the values of nal_unit_type of VCL NAL units for the current picture shall be in the range of IDR_W_RADL to CRA_NUT, inclusive.

FIG. 3

7.3.1.1 General NAL unit syntax

| nal_unit( NumBytesInNalUnit ) { | Descriptor |
|---|---|
|   nal_unit_header( ) | |
|   NumBytesInRbsp = 0 | |
|   for( i=2; i < NumBytesInNalUnit; i++ ) | |
|     if( i + 2 < NumBytesInNalUnit && next_bits( 24 ) == 0x000003 ) { | |
|       rbsp_byte[ NumBytesInRbsp++ ] | b(8) |
|       rbsp_byte[ NumBytesInRbsp++ ] | b(8) |
|       i += 2 | |
|       emulation_prevention_three_byte /* equal to 0x03 */ | f(8) |
|     } else | |
|       rbsp_byte[ NumBytesInRbsp++ ] | b(8) |
| } | |

7.3.1.2 NAL unit header syntax

| nal_unit_header( ) { | Descriptor |
|---|---|
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } | |

FIG. 4

A.3.5 Format range extensions profiles

The following profiles, collectively referred to as the format range extensions profiles, are specified in this subclause:
- The Main 12, Main 12 4:4:4 and Main 16 4:4:4 profiles
- The Main 12 Intra, Main 12 4:4:4 Intra and Main 16 4:4:4 Intra profiles
- The Main 12 Still Picture, Main 12 4:4:4 Still Picture and Main 16 4:4:4 Still Picture profiles Bitstreams conforming to the format range extensions profiles shall obey the following constraints:
- Referenced SPSs shall have ptl_multilayer_enabled_flag equal to 0.
- In bitstreams conforming to the Main 12 Still Picture, Main 12 4:4:4 Still Picture and Main 16 4:4:4 Still Picture profiles, the bitstream shall contain only one picture.
- In bitstreams conforming to the Main 12, Main 12 4:4:4, Main 16 4:4:4, Main 12 Intra, Main 12 4:4:4 Intra, or Main 16 4:4:4 Intra profiles, general_level_idc for all values of i in active SPSs shall not be equal to 255 (which indicates level 15.5).
- The tier and level constraints specified for the Main 12, Main 12 4:4:4, Main 16 4:4:4, Main 12 Intra, Main 12 4:4:4 Intra or Main 16 4:4:4 Intra profiles in subclause A.4, as applicable, shall be fulfilled.

- In bitstreams conforming to the Main 12 Intra, Main 12 4:4:4 Intra, or Main 16 4:4:4 Intra profiles, the values of nal_unit_type of VCL NAL units for the current picture shall be in the range of IDR_W_RADL to CRA_NUT, inclusive.

FIG. 15

| METHOD 2 | IN CASE OF INTRA PROFILE, INTRA-only CONSTRAINT FLAG IS LIMITED TO TRUE |
|---|---|
| METHOD 2-1 | IN CASE WHERE PROFILE IS ANY OF Main 12 Intra profile, Main 12 4:4:4 Intra profile, OR Main 16 4:4:4 Intra profile, INTRA-only CONSTRAINT FLAG IS LIMITED TO TRUE |
| METHOD 2-1-1 | IN CASE WHERE PROFILE IDENTIFIER IS 10, 42 OR 44, INTRA-only CONSTRAINT FLAG IS LIMITED TO TRUE |
| METHOD 2-2 | ALSO IN CASE OF STILL PICTURE PROFILE, INTRA-only CONSTRAINT FLAG IS LIMITED TO TRUE |

FIG. 16

In bitstreams conforming to the Main 12 Intra, Main 12 4:4:4 Intra, or Main 16 4:4:4 Intra profiles, gci_intra_only_constraint_flag for all values of i in active SPSs shall be equal to 1.

FIG. 17

7.3.3.2 General constraints information syntax

| general_constraints_info( ) { | Descriptor |
|---|---|
| ... | |
| gci_intra_only_constraint_flag | u(1) |
| ... | |
| gci_no_virtual_boundaries_constraint_flag | u(1) |
| gci_num_additional_bits | u(8) |
| if( gci_num_additional_bits > 0 ) { | |
| general_lower_bit_rate_constraint_flag | u(1) |
| numAdditionalBitsUsed = 1 | |
| } else | |
| numAdditionalBitsUsed = 0 | |
| for( i = 0; i < gci_num_additional_bits − numAdditionalBitsUsed; i++ ) | |
| gci_reserved_zero_bit[ i ] | u(1) |
| } | |
| while( !byte_aligned( ) ) | |
| gci_alignment_zero_bit | f(1) |
| } | |

[Semantic on gci_intra_only_constraint_flag]
gci_intra_only_constraint_flag equal to 1 specifies that sh_slice_type for all slices in OlsInScope shall be equal to 2. gci_intra_only_constraint_flag equal to 0 does not impose such a constraint.

FIG. 18

A.3.5 Format range extensions profiles
The following profiles, collectively referred to as the format range extensions profiles, are specified in this subclause:
- The Main 12, Main 12 4:4:4 and Main 16 4:4:4 profiles
- The Main 12 Intra, Main 12 4:4:4 Intra and Main 16 4:4:4 Intra profiles
- The Main 12 Still Picture, Main 12 4:4:4 Still Picture and Main 16 4:4:4 Still Picture profiles Bitstreams conforming to the format range extensions profiles shall obey the following constraints:
- Referenced SPSs shall have ptl_multilayer_enabled_flag equal to 0.
- In bitstreams conforming to the Main 12 Still Picture, Main 12 4:4:4 Still Picture and Main 16 4:4:4 Still Picture profiles, the bitstream shall contain only one picture.
- In bitstreams conforming to the Main 12, Main 12 4:4:4, Main 16 4:4:4, Main 12 Intra, Main 12 4:4:4 Intra, or Main 16 4:4:4 Intra profiles, general_level_idc for all values of i in active SPSs shall not be equal to 255 (which indicates level 15.5).
- The tier and level constraints specified for the Main 12, Main 12 4:4:4, Main 16 4:4:4, Main 12 Intra, Main 12 4:4:4 Intra or Main 16 4:4:4 Intra profiles in subclause A.4, as applicable, shall be fulfilled.

- In bitstreams conforming to the Main 12 Intra, Main 12 4:4:4 Intra, or Main 16 4:4:4 Intra profiles, gci_intra_only_constraint_flag for all values of i in active SPSs shall be equal to 1.
Or
In bitstreams conforming to the Main 12 Intra, Main 12 4:4:4 Intra, or Main 16 4:4:4 Intra profiles, sh_slice_type for all slices in OlsInScope shall be equal to 2.

IMAGE PROCESSING APPARATUS AND METHOD

CROSS-REFERENCE TO RELATED APPLICATIONS

The present application is based on PCT filing PCT/JP2022/034320, filed Sep. 14, 2022, which claims priority from U.S. Provisional Application No. 63/249,082, filed Sep. 28, 2021, the contents of each are hereby incorporated by reference.

TECHNICAL FIELD

The present disclosure relates to an image processing apparatus and method, and more particularly to an image processing apparatus and method that can make a specification of a bitstream to correspond to a profile more reliably.

BACKGROUND ART

Conventionally, there have been versatile video coding (VVC) and the like as an encoding method for a moving image (see, for example, Non-Patent Document 1 to Non-Patent Document 3). Furthermore, in this VVC, the following profiles have been added as extended profiles of VVC ver. 2 (for example, see Non-Patent Document 4).

Main 12 profile, Main 12 4:4:4 profile, Main 16 4:4:4 profile

Main 12 Intra profile, Main 12 4:4:4 Intra profile, Main 16 4:4:4 Intra profile

Main 12 Still Picture profile, Main 12 4:4:4 Still Picture profile, Main 16 4:4:4 Still Picture profile Among these profiles, the Main 12 Intra profile, the Main 12 4:4:4 Intra profile, and the Main 16 4:4:4 Intra profile are profiles designed to encode all pictures only with an I-picture as an application for video production. Furthermore, the Main 12 Still Picture profile, the Main 12 4:4:4 Still Picture profile, and the Main 16 4:4:4 Still Picture profile are profiles that use an I-picture to encode a still image.

CITATION LIST

Non-Patent Document

Non-Patent Document 1: Benjamin Bross, Jianle Chen, Shan Liu, "Versatile Video Coding (Draft 10)", JVET-T2001-v2, Joint Video Experts Team (JVET) of ITU-T SG 16 WP 3 and ISO/IEC JTC 1/SC 29, version 1-date 2020 Oct. 27

Non-Patent Document 2: Jianle Chen, Yan Ye, Seung Hwan Kim, "Algorithm description for Versatile Video Coding and Test Model 13 (VTM 13)", JVET-V2002-v1, Joint Video Experts Team (JVET) of ITU-T SG 16 WP 3 and ISO/IEC JTC 1/SC 29, version 1-date 2021 Jul. 15

Non-Patent Document 3: Frank Bossen, Benjamin Bross, Tomohiro Ikai, Dmytro Rusanovskyy, Ye-Kui Wang, "VVC operation range extensions (Draft 3)", JVET-V2005-v1, Joint Video Experts Team (JVET) of ITU-T SG 16 WP 3 and ISO/IEC JTC 1/SC 29, 2021 May 8

Non-Patent Document 4: Tomohiro Ikai, Takeshi Chujoh, Tomoko Aono, Sachin Deshpande, "Suggested initial profile text for VVC operation range extension", JVET-W0136-v5, oint Video Experts Team (JVET) of ITU-T SG 16 WP 3 and ISO/IEC JTC 1/SC 29, 2021 Jul. 16

SUMMARY OF THE INVENTION

Problems to be Solved by the Invention

However, in a definition of the intra profile (the Main 12 Intra profile, the Main 12 4:4:4 Intra profile, and the Main 16 4:4:4 Intra profile), there has been no constraint on a slice type. Therefore, even in a case where these intra profiles are applied, an encoder has been able to encode a slice of each picture as a P-slice or a B-slice. Therefore, there has been a possibility that a specification of a bitstream does not correspond to the profile.

The present disclosure has been made in view of such a situation, and an object of the present disclosure is to enable a specification of a bitstream to correspond to a profile more reliably.

Solutions to Problems

An image processing apparatus according to one aspect of the present technology is an image processing apparatus including a picture encoding unit configured to encode a moving image as an encoding target with a picture type of all pictures set as the I-picture, in a case where a predetermined condition is satisfied.

An image processing method according to one aspect of the present technology is an image processing method including encoding a moving image as an encoding target with a picture type of all pictures set as the I-picture, in a case where a predetermined condition is satisfied.

An image processing apparatus according to another aspect of the present technology is an image processing apparatus including: a picture decoding unit configured to decode a bitstream of a moving image as a decoding target; and a checking unit configured to check whether a picture type of all pictures of the moving image is the I-picture in the bitstream, in a case where a predetermined condition is satisfied.

An image processing method according to another aspect of the present technology is an image processing method including: decoding a bitstream of a moving image as a decoding target; and checking whether a picture type of all pictures of the moving image is the I-picture in the bitstream, in a case where a predetermined condition is satisfied.

An image processing apparatus according to still another aspect of the present technology is an image processing apparatus including: a parameter set encoding unit configured to set a control flag to true and encode a parameter set including the control flag, the control flag being for control of whether to limit a slice type of all slices of a moving image to an I-slice, in a case where a profile for encoding of the moving image is an intra profile; and a picture encoding unit configured to encode the moving image with all the slices set as I-slices in a case where the control flag is true.

An image processing method according to still another aspect of the present technology is an image processing method including: setting a control flag to true and encoding a parameter set including the control flag, the control flag being for control of whether to limit a slice type of all slices of a moving image to an I-slice, in a case where a profile for encoding of the moving image is an intra profile; and encoding the moving image with all the slices set as I-slices in a case where the control flag is true.

An image processing apparatus according to still another aspect of the present technology is an image processing apparatus including: a control flag decoding unit configured to decode a bitstream of a moving image and generate a control flag for control of whether to limit a slice type of all slices of the moving image to an I-slice; and a control flag checking unit configured to check whether the control flag is true in a case where a profile of the bitstream is an intra profile.

An image processing method according to still another aspect of the present technology is an image processing method including: decoding a bitstream of a moving image and generating a control flag for control of whether to limit a slice type of all slices of the moving image to an I-slice; and checking whether the control flag is true in a case where a profile of the bitstream is an intra profile.

In the image processing apparatus and method according to one aspect of the present technology, in a case where a predetermined condition is satisfied, a moving image as an encoding target is encoded with a picture type of all pictures set as the I-picture.

In the image processing apparatus and method according to another aspect of the present technology, a bitstream of a moving image as a decoding target is decoded, and it is checked whether a picture type of all pictures of the moving image is an I-picture in the bitstream in a case where a predetermined condition is satisfied.

In the image processing apparatus and method according to still another aspect of the present technology, a control flag is set to true and a parameter set including the control flag is encoded in which the control flag is for control of whether to limit a slice type of all slices of a moving image to an I-slice, in a case where a profile for encoding of the moving image is an intra profile, and all slices are set to I-slices and the moving image is encoded in a case where the control flag is true.

In the image processing apparatus and method according to still another aspect of the present technology, a bitstream of a moving image is decoded, a control flag for control of whether to limit a slice type of all slices of the moving image to an I-slice is generated, and it is checked whether the control flag is true in a case where a profile of the bitstream is an intra profile.

BRIEF DESCRIPTION OF DRAWINGS

FIG. 1 is a view illustrating an example of a bitstream constraint.

FIG. 2 is a view illustrating an example of a bitstream constraint.

FIG. 3 is a view illustrating an example of syntax.

FIG. 4 is a view illustrating a modification example of a standard.

FIG. 15 is a view illustrating an example of a bitstream constraint.

FIG. 16 is a view illustrating an example of a bitstream constraint.

FIG. 17 is a view illustrating an example of syntax and semantics.

FIG. 18 is a view illustrating a modification example of a standard.

MODE FOR CARRYING OUT THE INVENTION

Figure 5:
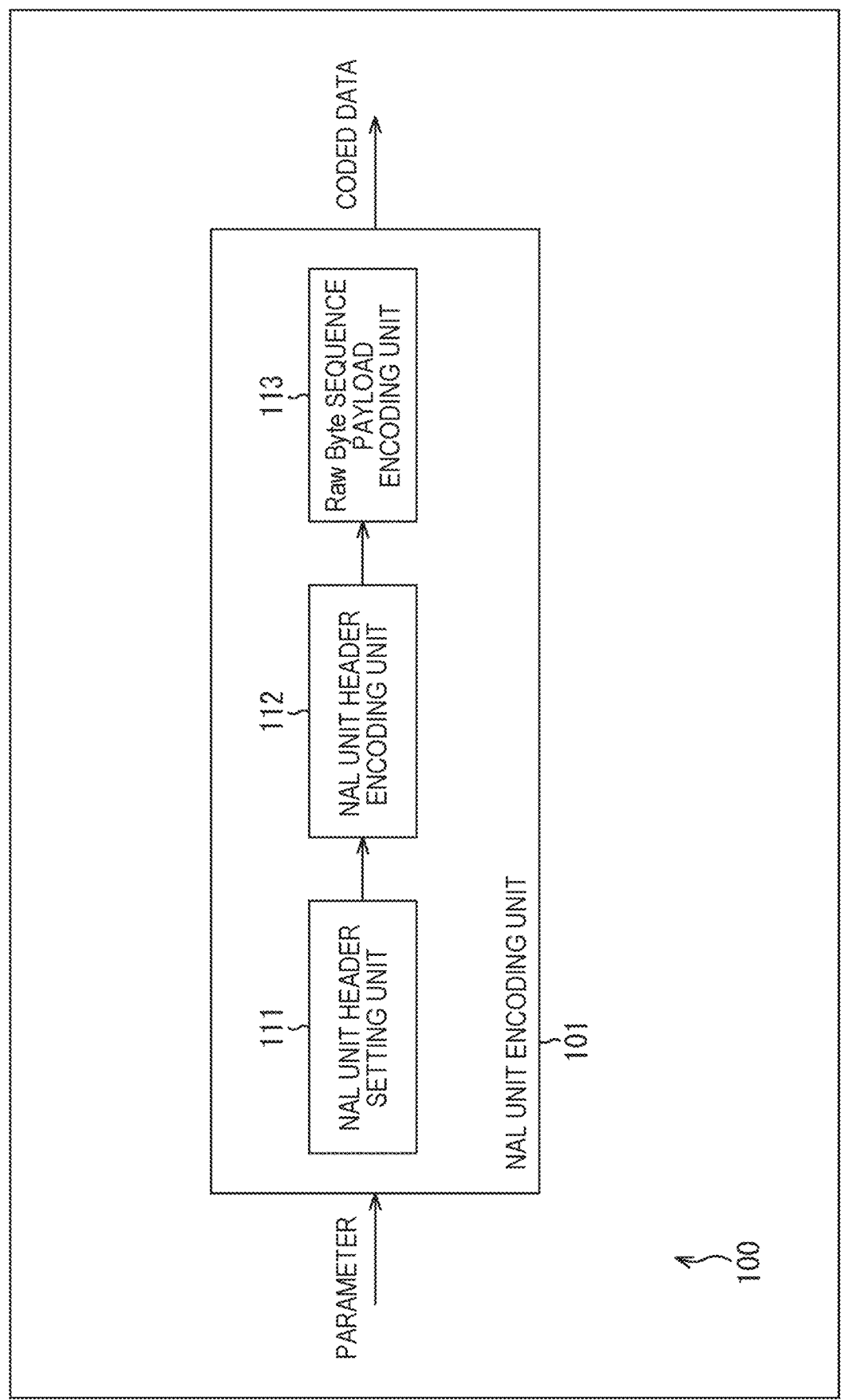
FIG. 5 is a block diagram illustrating a main configuration example of an encoding device.

Hereinafter, a mode for carrying out the present disclosure (hereinafter referred to as an embodiment) will be described. Note that a description will be given in the following order.

1. Documents and the like supporting technical content and technical terms
2. Profile
3. Constraint on picture type
4. Constraint on slice type
5. Embodiment (image encoding device/image decoding device)
6. Supplementary note 1. Documents and the Like Supporting Technical Content and Technical Terms The scope disclosed in the present technology includes not only the content described in the embodiment but also the content described in the following non-patent documents and the like that are known at the time of filing, the content of other documents referred to in the following non-patent documents, and the like.

Non-Patent Document 1: (described above)
Non-Patent Document 2: (described above)
Non-Patent Document 3: (described above)
Non-Patent Document 4: (described above)

Non-Patent Document 5: Recommendation ITU-T H.264 (April 2017) "Advanced video coding for generic audiovisual services", April 2017

Non-Patent Document 6: Recommendation ITU-T H.265 (August 2021) "High efficiency video coding", August 2021

Non-Patent Document 7: Frank Bossen, Benjamin Bross, Tomohiro Ikai, Dmytro Rusanovskyy, Gary Sullivan, Ye-Kui Wang, "VVC operation range extensions (Draft 4)", JVET-W2005-v1, Joint Video Experts Team (JVET) of ITU-T SG 16 WP 3 and ISO/IEC JTC 1/SC 29, 2021 Aug. 24

That is, the contents disclosed in above-mentioned Non-Patent Documents also serve as the basis for determining the support requirements. For example, even in a case where the quad-tree block structure and the quad-tree plus binary tree (QTBT) block structure described in the above-described non-patent documents are not directly described in the embodiment, they are within the scope of disclosure of the present technology and are assumed to satisfy the support requirements of the claims. Furthermore, for example, technical terms such as parsing, syntax, and semantics are also within the scope of disclosure of the present technology even in a case where there is no direct description in the embodiment, and are assumed to meet the support requirements of the claims.

Furthermore, in the present specification, a "block" (not a block indicating a processing unit) used in the description as a partial region or a unit of processing of an image (picture) indicates any partial region in the picture unless otherwise especially mentioned, and its size, shape, characteristics and the like are not limited. For example, examples of the "block" include any partial region (unit of processing) such as a transform block (TB), a transform unit (TU), a prediction block (PB), a prediction unit (PU), a smallest coding unit (SCU), a coding unit (CU), a largest coding unit (LCU), a coding tree block (CTB), a coding tree unit (CTU), a sub-block, a macroblock, a tile, or a slice disclosed in Non-Patent Documents mentioned above.

Furthermore, when the size of such block is designated, the block size may be designated not only directly but also indirectly. For example, the block size may be designated using identification information for identification of the size. Furthermore, for example, the block size may be designated by a ratio with the size of a reference block (for example, LCU, SCU and the like) or a difference therefrom. For example, in a case of transmitting information for specifying the block size as a syntax element and the like, information indirectly specifying the size as described above may be used as this information. By doing so, an information amount of the information can be reduced, and encoding efficiency may be improved in some cases. Furthermore, the specification of the block size also includes specification of a range of the block size (for example, specification of the range of an allowable block size and the like).

2. Profile

<Intra Profile>

Conventionally, for example, as disclosed in Non-Patent Documents 1 to 3, there have been versatile video coding (VVC) and the like as an encoding method for a moving image. In a general standard for encoding of a moving image such as WVC, a profile representing a set of functions defined for each intended use is defined. Non-Patent Document 4 proposes addition of the following profiles as extended profiles of VVC ver. 2.

Main 12 profile, Main 12 4:4:4 profile, Main 16 4:4:4 profile

Main 12 Intra profile, Main 12 4:4:4 Intra profile, Main 16 4:4:4 Intra profile

Main 12 Still Picture profile, Main 12 4:4:4 Still Picture profile, Main 16 4:4:4 Still Picture profile In the present specification, the Main 12 Intra profile, the Main 12 4:4:4 Intra profile, and the Main 16 4:4:4 Intra profile are also referred to as intra profiles. Furthermore, the Main 12 Still Picture profile, the Main 12 4:4:4 Still Picture profile, and the Main 16 4:4:4 Still Picture profile are also referred to as still picture profiles.

Among the above-described added profiles, the intra-profiles (the Main 12 Intra profile, the Main 12 4:4:4 Intra profile, and the Main 16 4:4:4 Intra profile) are profiles designed to encode all pictures only with an I-picture as an application for video production. Furthermore, the still picture profiles (the Main 12 Still Picture profile, the Main 12 4:4:4 Still Picture profile, and the Main 16 4:4:4 Still Picture profile) are profiles that use an I-picture to encode a still image. The I-picture (also referred to as an intra picture) is a picture to which only intra prediction for generating a predicted image with reference to an inside of a screen (region) is applied as prediction processing.

That is, in a case where these profiles are applied, each picture (each slice) of a moving image is desirably encoded as the I-picture (I-slice). A slice is a data unit formed in a picture. Similarly to the I-picture, the I-slice is a slice to which only intra prediction is applied as prediction processing.

However, in a definition of the intra profile, there has been no constraint on a slice type. Therefore, even in a case where these intra profiles are applied, an encoder has been able to encode each picture as a P-picture or a B-picture or encode a slice of each picture as a P-slice or a B-slice. The P-picture (P-slice) and the B-picture (B-slice) are pictures (slices) to which inter prediction for generating a predicted image with reference to another frame can be applied as prediction processing. Therefore, there has been a possibility that a specification of a bitstream does not correspond to the profile.

3. Constraint on Picture Type

<Method 1>

Therefore, as illustrated in the uppermost row of the table in FIG. 1, in a case where a predetermined condition is satisfied, a picture type of all pictures is limited to the I-picture (Method 1). By providing such a constraint (also referred to as "bitstream constraint on intra profile"), for example, this constraint can be applied to the intra profile described above. Therefore, a specification of a bitstream can be made to correspond to the profile more reliably.

<Method 1-1>

For example, in a case of applying Method 1, as illustrated in the second row from the top of the table in FIG. 1, a network abstraction layer (NAL) unit type of all the videocoding layer (VCL) NAL units as a decoding target picture may be limited to a "value indicating IRAP" (Method 1-1). The intra random access pictures (IRAP) are pictures that are for random access and include only I-slices. In this way, by controlling the NAL unit type, the picture type can be more easily limited to the I-picture.

<Method 1-2>

For example, in a case of applying Method 1, as illustrated in the third row from the top of the table in FIG. 1, in a case of an intra profile, the picture type of all pictures may be limited to the I-picture (Method 1-2). By providing such a constraint, in a case of applying the intra profile, each picture (each slice) of a moving image can be more reliably encoded as an I-picture (I-slice). Therefore, a specification of a bitstream can be made to correspond to the profile more reliably.

<Bitstream Constraint>

For example, in a general encoding standard (encoding/decoding method) for a moving image such as VVC, a bitstream constraint as illustrated in FIG. 2 may be provided as a bitstream constraint related to an intra profile. For example, in a case of VVC, a NAL unit type (nal_unit_type) is set in a NAL unit header as in syntax illustrated in FIG. 3. In the bitstream constraint of FIG. 2, in a case of an intra profile (the Main 12 Intra profile, the Main 12 4:4:4 Intra profile, or the Main 16 4:4:4 Intra profile), this NAL unit type is limited within a range of IDR_W_RADL to CRA_NUT.

For example, in a case of VVC, the parameter nal_unit_type indicates an identification number of the NAL unit type. Then, nal_unit_type==7 indicates IDR_W_RADL, nal_unit_type==8 indicates IDR_N_LP, nal_unit_type==9 indicates CRA_NUT, nal_unit_type==10 indicates GDR_NUT, and nal_unit_type==11 indicates RSV_IRAP_11 (reserve), individually. As the IRAP, there are an instantaneous decoder refresh (IDR) picture, a clean random access (CRA) picture, a gradual decoding refresh (GDR) picture, and the like. That is, these values of nal_unit_type are the "value indicating IRAP".

By adding such a bitstream constraint to the general encoding standard of a moving image, each picture (each slice) of the moving image can be encoded as an I-picture (I-slice) in a case of applying an intra profile. For example, in a case of VVC, as illustrated in FIG. 4, the bitstream constraint of FIG. 2 may simply be added to "A3.5 Format range extensions profiles" of Non-Patent Document 7.

<Encoding Device>

FIG. 5 is a block diagram illustrating an example of a configuration of an encoding device, which is one mode of an image processing apparatus to which the present technology is applied. An encoding device 100 illustrated in FIG. 5 is a device that encodes a moving image as an encoding target and generates a bitstream.

For example, the encoding device 100 derives a prediction residual of a moving image and a predicted image thereof, performs coefficient transform (for example, orthogonal transform) on the prediction residual, and quantizes and encodes a transform coefficient thereof. Of course, this encoding method is an example. A method of encoding a moving image by the encoding device 100 is not limited to this example. For example, some of the above-described processing such as coefficient transform and quantization may be skipped (omitted).

The encoding device 100 encodes the moving image by applying Method 1, Method 1-1, or Method 1-2 described above, or a combination thereof.

Note that, in FIG. 5, main parts of processing units, data flows, and the like are illustrated, and those illustrated in FIG. 5 are not necessarily all. That is, the encoding device 100 may include a processing unit not illustrated as a block in FIG. 5. Furthermore, the encoding device 100 may have a process or a data flow that is not illustrated as an arrow or the like in FIG. 5.

As illustrated in FIG. 5, the encoding device 100 includes a NAL unit encoding unit 101. The NAL unit encoding unit 101 performs processing related to encoding of a NAL unit to be stored in a bitstream. The NAL unit encoding unit 101 acquires any parameter, forms a NAL unit for a moving image as an encoding target by using the parameter, and encodes the NAL unit. That is, the NAL unit encoding unit 101 can also be said as a picture encoding unit that encodes a picture of the moving image. The NAL unit encoding unit 101 encodes the NAL unit by applying Method 1, Method 1-1, or Method 1-2 described above, or a combination thereof.

As illustrated in FIG. 5, the NAL unit encoding unit 101 includes a NAL unit header setting unit 111, a NAL unit header encoding unit 112, and a Raw Byte sequence payload encoding unit 113.

The NAL unit header setting unit 111 sets a header (NAL unit header) of the NAL unit by using the parameter supplied to the NAL unit encoding unit 101, and supplies the header to the NAL unit header encoding unit 112.

The NAL unit header encoding unit 112 encodes the NAL unit header supplied from the NAL unit header setting unit 111 in accordance with a definition of a syntax table.

The Raw Byte sequence payload encoding unit 113 encodes a Raw Byte sequence payload in accordance with a definition of a syntax table.

The NAL unit encoding unit 101 (NAL unit header setting unit 111) having such a configuration performs processing by applying Method 1, Method 1-1, or Method 1-2 described above, or a combination thereof. That is, the NAL unit encoding unit 101 encodes a moving image in accordance with the bitstream constraint related to the intra profile described above. For example, in a case where a predetermined condition is satisfied, the NAL unit encoding unit 101 encodes a moving image as an encoding target with a picture type of all pictures set as the I-picture. For example, the NAL unit encoding unit 101 may encode the moving image in accordance with the bitstream constraint illustrated in FIG. 2.

At that time, the NAL unit encoding unit 101 (NAL unit header setting unit 111) may set the picture type of all pictures as the I-picture by setting the NAL unit type of all VCL NAL units to the "value indicating IRAP". That is, in a case where a predetermined condition is satisfied, the NAL unit encoding unit 101 may set the NAL unit type of all VCL NAL units to the "value indicating IRAP" and encode the moving image. For example, in a case of VVC, the NAL unit encoding unit 101 (NAL unit header setting unit 111) may set nal_unit_type to any value from 7 to 11.

Furthermore, the NAL unit encoding unit 101 (NAL unit header setting unit 111) may set, as "predetermined condition", a state where a profile for encoding of a moving image is an intra profile. That is, in a case where the profile for encoding of a moving image is the intra profile, the NAL unit encoding unit 101 may encode the moving image with the picture type of all pictures set as the I-picture. In other words, in a case where the profile is an intra profile, the NAL unit encoding unit 101 (NAL unit header setting unit 111) may set the NAL unit type of all VCL NAL units to the "value indicating IRAP".

At that time, the NAL unit encoding unit 101 (NAL unit header setting unit 111) may regard, as being the intra profile, a state where the profile is the Main 12 Intra profile, the Main 12 4:4:4 Intra profile, or the Main 16 4:4:4 Intra profile. That is, in a case where the profile is the Main 12 Intra profile, the Main 12 4:4:4 Intra profile, or the Main 16 4:4:4 Intra profile, the NAL unit encoding unit 101 (NAL unit header setting unit 111) may set the picture type of all pictures as the I-picture.

Note that the NAL unit encoding unit 101 (NAL unit header setting unit 111) may determine which profile it is by using a profile identifier (general_profile_idc) for identification of the profile. "general_profile_idc==10" indicates that the profile is the Main 12 Intra profile. "general_profile_idc==42" indicates that the profile is the Main 12 4:4:4 Intra profile. "general_profile_idc==44" indicates that the profile is the Main 16 4:4:4 Intra profile. That is, in a case where a value of the profile identifier is 10, 42, or 44, the NAL unit encoding unit 101 (NAL unit header setting unit 111) may set the picture type of all pictures as the I-picture. Note that, in this example, values of the profile identifiers corresponding to the Main 12 Intra profile, the Main 12 4:4:4 Intra profile, and the Main 16 4:4:4 Intra profile are 10, 42, and 44, respectively, but are not limited thereto, and may be any values within a feasible range.

Furthermore, the NAL unit encoding unit 101 (NAL unit header setting unit 111) may treat a still picture profile similarly to the intra profile. That is, also in a case where the profile is a still picture profile, similarly to the case of the intra profile, the NAL unit encoding unit 101 (NAL unit header setting unit 111) may set the picture type of all pictures as the I-picture.

At that time, the NAL unit encoding unit 101 (NAL unit header setting unit 111) may regard, as being the still picture profile, a state where the profile is the Main 12 Still Picture profile, the Main 12 4:4:4 Still Picture profile, or the Main 16 4:4:4 Still Picture profile. That is, in a case where the profile is the Main 12 Still Picture profile, the Main 12 4:4:4 Still Picture profile, or the Main 16 4:4:4 Still Picture profile, the NAL unit encoding unit 101 (NAL unit header setting unit 111) may set the picture type of all pictures as the I-picture.

"general_profile_idc==66" indicates that the profile is Main 12 Still Picture profile. "general_profile_idc==98" indicates that the profile is Main 12 4:4:4 Still Picture profile. "general_profile_idc==100" indicates that the profile is Main 16 4:4:4 Still Picture profile. That is, in a case where a value of the profile identifier is 66, 98, or 100, the NAL unit encoding unit 101 (NAL unit header setting unit 111) may set the picture type of all pictures as the I-picture. Note that, in this example, values of the profile identifiers corresponding to the Main 12 Still Picture profile, the Main 12 4:4:4 Still Picture profile, and the Main 16 4:4:4 Still Picture profile are 66, 98, and 100, respectively, but are not limited thereto, and may be any value within a feasible range.

With such a configuration, the encoding device 100 can encode a moving image in accordance with a bitstream constraint such as "encoding a moving image as an encoding target with a picture type of all pictures set as the I-picture, in a case where a predetermined condition is satisfied". For example, the encoding device 100 can encode a moving image in accordance with the bitstream constraint illustrated in FIG. 2. That is, the encoding device 100 can make a specification of the bitstream to correspond to the profile more reliably.

<Flow of Encoding Processing>

Next, an example of a flow of encoding processing executed by the encoding device 100 will be described with reference to a flowchart in FIG. 6.

When the encoding processing is started, the NAL unit header setting unit 111 of the encoding device 100 sets a NAL unit type on the basis of a profile that is externally designated, in step S101. At that time, the NAL unit header setting unit 111 may set the NAL unit type by applying Method 1, Method 1-1, or Method 1-2 described above, or a combination thereof.

For example, in a case where a predetermined condition is satisfied, the NAL unit header setting unit 111 may set the picture type of all pictures as the I-picture. Furthermore, in a case where the condition is satisfied, the NAL unit header setting unit 111 may set the NAL unit type of all VCL NAL units to the "value indicating IRAP". Furthermore, in a case where a profile for encoding of the moving image is an intra profile, the NAL unit header setting unit 111 may set the picture type of all pictures as the I-picture. At that time, the NAL unit header setting unit 111 may set, as being "intra profile", a state where the profile is "the Main 12 Intra profile, the Main 12 4:4:4 Intra profile, or the Main 16 4:4:4 Intra profile". Furthermore, the profile identifier (general_profile_idc) may be used to determine whether or not the profile is an intra profile. Furthermore, also in a case of a still picture profile, the NAL unit type may be limited similarly to the case of the intra profile.

In step S102, the NAL unit header encoding unit 112 encodes the NAL unit header that has been set in step S101, in accordance with a definition of a syntax table.

In step S103, the Raw Byte sequence payload encoding unit 113 encodes a Raw byte sequence payload in accordance with a definition of a syntax table. That is, the Raw Byte sequence payload encoding unit 113 encodes the Raw byte sequence payload as the NAL unit of the NAL unit type that has been set in step S101. That is, the Raw Byte sequence payload encoding unit 113 applies Method 1, Method 1-1, or Method 1-2 described above, or a combination thereof, and encodes the Raw byte sequence payload so as to satisfy the above-described bitstream constraint related to the intra profile (in accordance with the bitstream constraint).

When the processing in step S103 ends, the encoding processing ends.

By executing individual processing in this manner, the encoding device 100 can encode the moving image in accordance with, for example, the bitstream constraint illustrated in FIG. 2. That is, the encoding device 100 can make a specification of the bitstream to correspond to the profile more reliably.

<Decoding Device>

Figure 7:
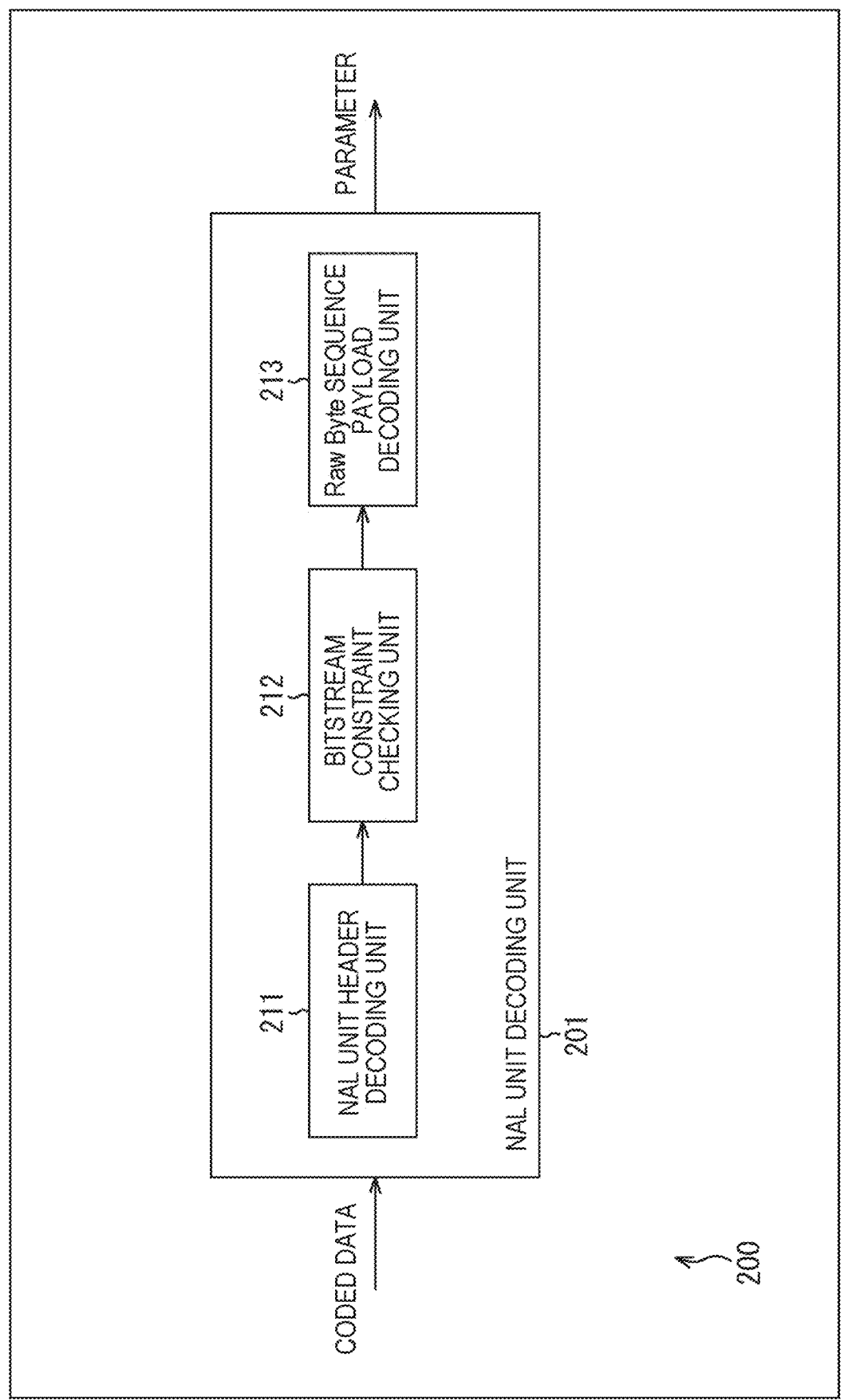
FIG. 7 is a block diagram illustrating a main configuration example of a decoding device.

FIG. 7 is a block diagram illustrating an example of a configuration of a decoding device which is an aspect of the image processing apparatus to which the present technology is applied. A decoding device 200 illustrated in FIG. 7 is a device that decodes a bitstream to generate (restore) a moving image as an encoding target.

For example, the decoding device 200 decodes a bitstream to generate (restore) a quantization coefficient, inversely quantizes the quantization coefficient to derive a transform coefficient, performs inverse coefficient transform (for example, inverse orthogonal transform) on the transform coefficient to derive a prediction residual, generates a predicted image from a decoded image, and adds the predicted image to the prediction residual to generate (restore) image data. Of course, this decoding method is an example. A method of decoding a bitstream by the decoding device 200 is not limited to this example. For example, some of the above-described processing such as inverse quantization and inverse coefficient transform may be skipped (omitted).

The decoding device 200 corresponds to an encoding method applied by the encoding device 100. That is, the decoding device 200 performs decoding processing by applying a decoding method corresponding to the encoding method. In other words, the decoding device 200 can decode a bitstream generated by an image processing apparatus (for example, the encoding device 100) to which the present technology is applied. Therefore, the decoding device 200 decodes the bitstream by applying Method 1, Method 1-1, or Method 1-2 described above, or a combination thereof. More specifically, the decoding device 200 checks whether or not the bitstream as a decoding target satisfies the bitstream constraint related to the intra profile described above (decodes the bitstream while checking).

Note that, in FIG. 7, main parts of processing units, data flows, and the like are illustrated, and those illustrated in FIG. 7 are not necessarily all. That is, the decoding device 200 may include a processor not illustrated as a block in FIG. 26. Furthermore, the decoding device 200 may have a process or a data flow that is not illustrated as an arrow or the like in FIG. 7.

As illustrated in FIG. 7, the decoding device 200 includes a NAL unit decoding unit 201. The NAL unit decoding unit 201 performs processing related to decoding of a NAL unit stored in a bitstream. The NAL unit decoding unit 201 acquires and decodes a bitstream supplied to the decoding device 200, generates (restores) a NAL unit, and outputs a parameter related to the NAL unit. That is, the NAL unit decoding unit 201 can also be said as a picture decoding unit that decodes a bitstream to generate (restore) a picture of a moving image thereof. The NAL unit decoding unit 201 applies Method 1, Method 1-1, or Method 1-2 described above, or a combination thereof to decode the bitstream, to generate (restore) the NAL unit.

As illustrated in FIG. 7, the NAL unit decoding unit 201 includes a NAL unit header decoding unit 211, a bitstream constraint checking unit 212, and a Raw Byte sequence payload decoding unit 213.

The NAL unit header decoding unit 211 decodes a bitstream supplied to the NAL unit encoding unit 101, generates (restores) a NAL unit header, and supplies the NAL unit header to the bitstream constraint checking unit 212.

By using a parameter included in the generated NAL unit header, the bitstream constraint checking unit 212 checks whether or not the bitstream as a decoding target satisfies a bitstream constraint. At that time, the bitstream constraint checking unit 212 performs the checking by applying Method 1, Method 1-1, or Method 1-2 described above, or a combination thereof. That is, the bitstream constraint checking unit 212 checks whether or not the bitstream as a decoding target satisfies the bitstream constraint related to the intra profile described above (decodes the bitstream while checking).

For example, in a case where a predetermined condition is satisfied, the bitstream constraint checking unit 212 may check whether the picture type of all pictures of the moving image is the I-picture in the bitstream as a decoding target. For example, the bitstream constraint checking unit 212 may check whether or not the bitstream as a decoding target satisfies the bitstream constraint illustrated in FIG. 2.

Furthermore, in a case where the condition is satisfied, the bitstream constraint checking unit 212 may check whether the NAL unit type of all VCL NAL units is the "value indicating IRAP" in the bitstream as a decoding target. For example, in a case of VVC, the bitstream constraint checking unit 212 may check whether nal_unit_type is set to any one of values 7 to 11 in the NAL unit header.

Furthermore, in a case where a profile for encoding of a moving image is an intra profile, the bitstream constraint checking unit 212 may check whether the picture type of all pictures is the I-picture in the bitstream as a decoding target. In other words, in a case where the profile is an intra profile, the bitstream constraint checking unit 212 may check whether or not the NAL unit type of all VCL NAL units is set to the "value indicating IRAP" in the NAL unit header.

At that time, the bitstream constraint checking unit 212 may regard, as being the intra profile, a state where the profile is the Main 12 Intra profile, the Main 12 4:4:4 Intra profile, or the Main 16 4:4:4 Intra profile. That is, in a case where the profile is the Main 12 Intra profile, the Main 12 4:4:4 Intra profile, or the Main 16 4:4:4 Intra profile, the bitstream constraint checking unit 212 may check whether the picture type of all pictures is the I-picture in the bitstream as a decoding target.

Note that the bitstream constraint checking unit 212 may determine which profile it is by using the profile identifier (general_profile_idc) for identification of the profile. That is, in a case where a value of the profile identifier is 10, 42, or 44, the bitstream constraint checking unit 212 may check whether the picture type of all pictures is the I-picture in the bitstream as a decoding target.

Furthermore, the bitstream constraint checking unit 212 may treat a still picture profile similarly to the intra profile. That is, also in a case where the profile is a still picture profile, similarly to the case of the intra profile, the bitstream constraint checking unit 212 may check whether the picture type of all pictures is the I-picture in the bitstream as a decoding target.

At that time, the bitstream constraint checking unit 212 may regard, as being the still picture profile, a state where the profile is the Main 12 Still Picture profile, the Main 12 4:4:4 Still Picture profile, or the Main 16 4:4:4 Still Picture profile. That is, in a case where the profile is the Main 12 Still Picture profile, the Main 12 4:4:4 Still Picture profile, or the Main 16 4:4:4 Still Picture profile, the bitstream constraint checking unit 212 may check whether the picture type of all pictures is the I-picture in the bitstream as a decoding target. At that time, in a case where a value of the profile identifier is 66, 98, or 100, the bitstream constraint checking unit 212 may check whether the picture type of all pictures is the I-picture in the bitstream as a decoding target.

The bitstream constraint checking unit 212 may output a check result as described above. For example, in a case where the bitstream constraint checking unit 212 determines that the bitstream does not satisfy a bitstream constraint corresponding to Method 1, Method 1-1, or Method 1-2 described above, or a combination thereof, the bitstream constraint checking unit 212 may notify a user or the like of a warning message indicating that the bitstream constraint is not satisfied. For example, the bitstream constraint checking unit 212 may display the warning message on a screen as a character or an image, or may output the warning message as sound from a speaker or the like. Furthermore, the bitstream constraint checking unit 212 may provide the warning message to another device, another processing unit (another application), or the like as data or the like.

Furthermore, the bitstream constraint checking unit 212 may control decoding of the bitstream on the basis of the check result. For example, in a case where the bitstream constraint checking unit 212 determines that the bitstream does not satisfy a bitstream constraint corresponding to Method 1, Method 1-1, or Method 1-2 described above, or a combination thereof, the bitstream constraint checking unit 212 may end the decoding processing on the bitstream. Furthermore, in a case where the bitstream constraint checking unit 212 determines that the bitstream does not satisfy a bitstream constraint corresponding to Method 1, Method 1-1, or Method 1-2 described above, or a combination thereof, the bitstream constraint checking unit 212 may temporarily stop the decoding processing on the bitstream until permitted by the user or the like.

Furthermore, the bitstream constraint checking unit 212 may perform both the output of the warning message and the control of the decoding processing.

The Raw Byte sequence payload decoding unit 213 decodes a bitstream on the basis of a parameter included in the generated NAL unit header, and derives a Raw Byte sequence payload. Therefore, the Raw Byte sequence payload decoding unit 213 can also be said as a picture decoding unit that decodes a bitstream of a moving image as a decoding target.

With such a configuration, the decoding device 200 can check whether the bitstream as a decoding target satisfies a bitstream constraint such as "encoding a moving image as an encoding target with a picture type of all pictures set as the I-picture, in a case where a predetermined condition is satisfied". For example, the decoding device 200 can check whether or not the bitstream as a decoding target satisfies the bitstream constraint illustrated in FIG. 2. That is, the decoding device 200 can make a specification of the bitstream to be decoded to correspond to the profile more reliably.

<Flow of Decoding Processing>

Next, an example of a flow of decoding processing executed by the decoding device 200 will be described with reference to the flowchart in FIG. 8.

When the decoding processing is started, the NAL unit header decoding unit 211 of the decoding device 200 decodes coded data of a NAL unit header in accordance with a definition of a syntax table in step S201.

In step S202, the bitstream constraint checking unit 212 determines whether or not the bitstream satisfies a bitstream constraint related to an intra profile. At that time, the bitstream constraint checking unit 212 may perform the checking by applying Method 1, Method 1-1, or Method 1-2 described above, or a combination thereof.

For example, in a case where a predetermined condition is satisfied, the bitstream constraint checking unit 212 may check whether the picture type of all pictures of the moving image is the I-picture in the bitstream as a decoding target. Furthermore, in a case where the condition is satisfied, the bitstream constraint checking unit 212 may check whether the NAL unit type of all VCL NAL units is the "value indicating IRAP" in the bitstream. For example, as described below, checking may be performed as to whether nal_unit_type is any of 7 to 11.

ret=(nal_unit_type>=7 && nal_unit_type<=11)? 1:0

In this case, in a case where the parameter ret is true (ret=1), it is determined that the bitstream satisfies the bitstream constraint on the intra profile.

Furthermore, in a case where the profile of the bitstream is an intra profile, the bitstream constraint checking unit 212 may check whether the picture type of all pictures is the I-picture in the bitstream. At that time, the bitstream constraint checking unit 212 may set, as being "intra profile", a state where the profile is "the Main 12 Intra profile, the Main 12 4:4:4 Intra profile, or the Main 16 4:4:4 Intra profile". Furthermore, the profile identifier (general_profile_idc) may be used to determine whether or not the profile is an intra profile. Furthermore, also in a case of a still picture profile, similarly to the case of the intra profile, checking may be performed as to whether the picture type of all pictures is the I-picture in the bitstream as a decoding target.

In a case where it is determined in step S202 that the bitstream constraint related to the intra profile is not satisfied (for example, in a case where the parameter ret is false (ret=0)), the processing proceeds to step S203.

In step S203, the bitstream constraint checking unit 212 notifies of a warning message indicating that the bitstream constraint related to the intra profile is not satisfied.

When the processing of step S203 ends, the processing proceeds to step S204. Furthermore, in a case where it is determined in step S202 that the bitstream as a decoding target satisfies the bitstream constraint related to the intra profile, the processing proceeds to step S204.

In step S204, the Raw Byte sequence payload decoding unit 213 decodes a Raw byte sequence payload in accordance with a definition of a syntax table.

When the processing of step S204 ends, the decoding processing ends.

By executing individual processing in this manner, the decoding device 200 can check whether the bitstream as a decoding target satisfies a bitstream constraint such as "encoding a moving image as an encoding target with a picture type of all pictures set as the I-picture, in a case where a predetermined condition is satisfied". For example, the decoding device 200 can check whether or not the bitstream as a decoding target satisfies the bitstream constraint illustrated in FIG. 2. That is, the decoding device 200 can make a specification of the bitstream to be decoded to correspond to the profile more reliably.

<Modifications>

Note that, in a case of applying Method 1, the picture type of all pictures may be limited to the I-picture (Method 1-3) in a case where the control flag is true as illustrated in the bottom row of the table in FIG. 1. By providing such a constraint, in a case where the control flag is true, each picture (each slice) of a moving image can be more reliably encoded as an I-picture (I-slice). That is, by setting the control flag to true, it is possible to more reliably encode each picture (each slice) of the moving image as an I-picture (I-slice), for example, even in a case other than the intra profile. Therefore, a specification of a bitstream can be made to correspond to the profile more reliably.

<Encoding Device>

Figure 9:
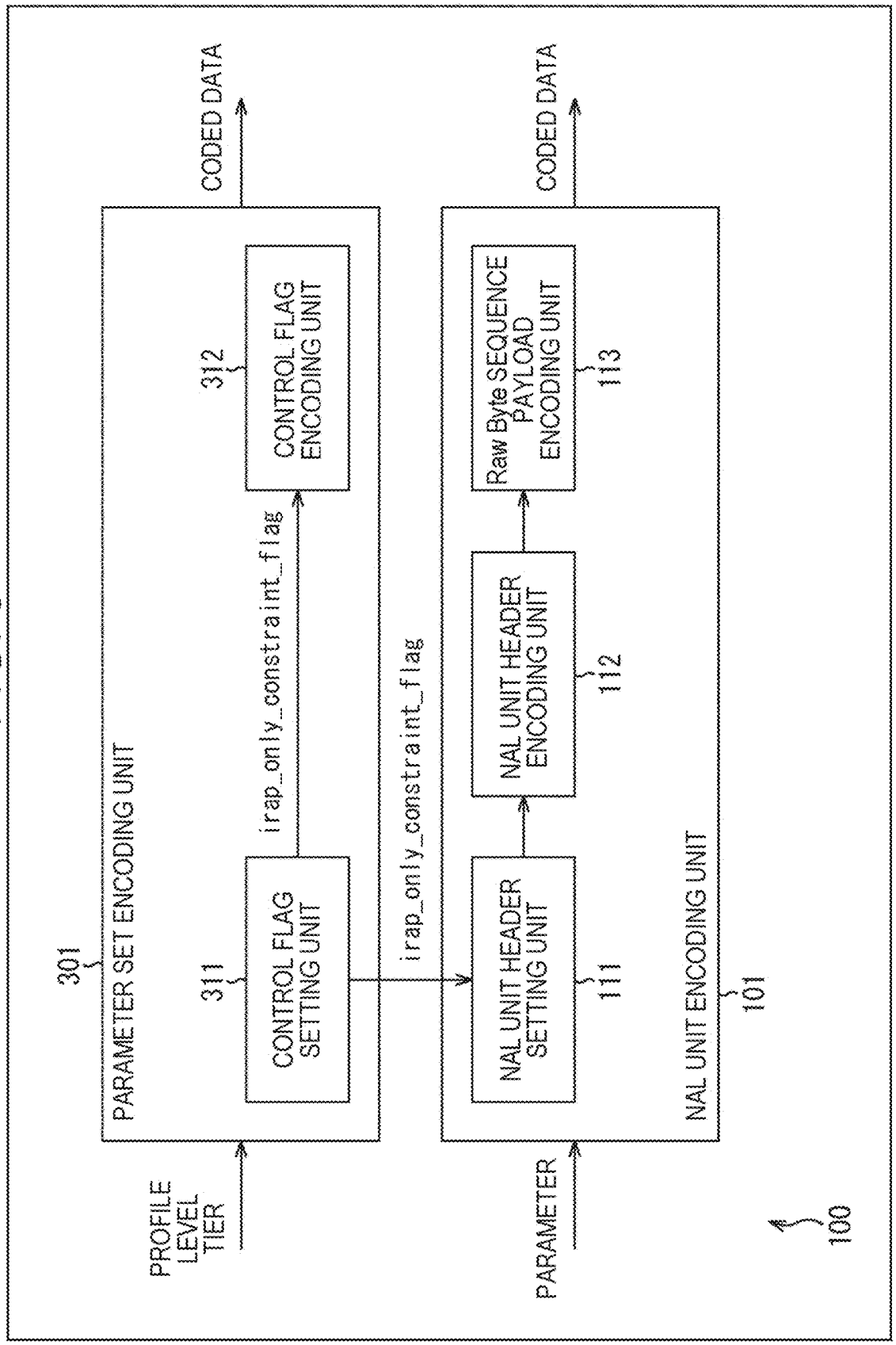
FIG. 9 is a block diagram illustrating a main configuration example of the encoding device.

FIG. 9 is a block diagram illustrating a main configuration example of the encoding device 100 in that case (when Method 1-3 is applied). Note that, in FIG. 9, main parts of processing units, data flows, and the like are illustrated, and those illustrated in FIG. 9 are not necessarily all. That is, the encoding device 100 may include a processing unit not illustrated as a block in FIG. 9. Furthermore, the encoding device 100 may have a process or a data flow that is not illustrated as an arrow or the like in FIG. 9.

As illustrated in FIG. 9, the encoding device 100 in this case includes a parameter set encoding unit 301 in addition to the configuration of FIG. 5. The parameter set encoding unit 301 acquires and encodes a parameter set including parameters such as a profile, a level, and a tier, and outputs the coded data (stores the coded data into a bitstream).

At that time, the parameter set encoding unit 301 may perform processing by applying Method 1-3 described above. For example, the parameter set encoding unit 301 may set a control flag (irap_only_constraint_flag) for control of whether to limit a picture type of all pictures of a moving image to the I-picture, encode the set control flag, and store the control flag into the bitstream. For example, the parameter set encoding unit 301 includes a control flag setting unit 311 and a control flag encoding unit 312.

The control flag setting unit 311 sets the control flag (irap_only_constraint_flag). The control flag (irap_only_constraint_flag) is flag information for control of whether to limit a picture type of all pictures of the moving image to the I-picture. In a case where the control flag is true (for example, irap_only_constraint_flag==1), the picture type of all pictures of the moving image is limited to the I-picture. Furthermore, in a case where the control flag is false (for example, irap_only_constraint_flag==0), the limitation of the picture type is not made.

The control flag setting unit 311 sets the control flag on the basis of, for example, an instruction from the user or the like. Then, the control flag setting unit 311 supplies the set control flag to the control flag encoding unit 312. Furthermore, the control flag setting unit 311 supplies the set control flag to the NAL unit header setting unit 111.

The control flag encoding unit 312 encodes the control flag and outputs the coded data (stores the coded data into the bitstream).

The NAL unit encoding unit 101 (NAL unit header setting unit 111) applies Method 1-3 described above, and performs processing on the basis of this control flag. For example, in a case where the control flag is true, the NAL unit encoding unit 101 may encode the moving image with the picture type of all pictures set as the I-picture. At that time, the NAL unit encoding unit 101 (NAL unit header setting unit 111) may set the picture type of all pictures as the I-picture by setting the NAL unit type of all VCL NAL units to the "value indicating IRAP". For example, in a case of VVC, the NAL unit encoding unit 101 (NAL unit header setting unit 111) may set nal_unit_type to any value from 7 to 11.

The NAL unit header encoding unit 112 and the Raw Byte sequence payload encoding unit 113 perform processing similarly to the case of FIG. 5.

With such a configuration, in a case where the control flag (irap_only_constraint_flag) for control of whether to limit a picture type of all pictures of the moving image to the I-picture is true, the encoding device 100 can encode the moving image as an encoding target with the picture type of all pictures set as the I-picture. That is, the encoding device 100 can make a specification of the bitstream to correspond to the profile more reliably.

<Flow of Encoding Processing>

Next, an example of a flow of encoding processing executed by the encoding device 100 will be described with reference to a flowchart in FIG. 10.

In this case, when the encoding processing is started, in step S301, the control flag setting unit 311 of the encoding device 100 sets the control flag (irap_only_constraint_flag) for control of whether to limit a picture type of all pictures of the moving image to the I-picture, on the basis of an instruction of the user or the like, for example.

In step S302, the control flag encoding unit 312 encodes the control flag (irap_only_constraint_flag) that has been set in step S301, and stores the control flag into the bitstream.

In step S303, the NAL unit encoding unit 101 applies Method 1-3 described above, and executes NAL unit encoding processing on the basis of the control flag (irap_only_constraint_flag) that has been set in step S301 to encode the NAL unit. That is, in a case where the control flag is true, the NAL unit encoding unit 101 encodes the moving image with the picture type of all pictures set as the I-picture.

When the processing of step S303 ends, the encoding processing ends.

<Flow of NAL Unit Encoding Processing>

Next, an example of a flow of the NAL unit encoding processing executed in step S303 of FIG. 10 will be described with reference to a flowchart of FIG. 11.

When the NAL unit encoding processing is started, the NAL unit header setting unit 111 sets a NAL unit type on the basis of the control flag (irap_only_constraint_flag) in step S321. For example, in a case where the control flag is true, the NAL unit header setting unit 111 sets the picture type of all pictures as the I-picture. For example, in that case, the NAL unit header setting unit 111 may set the NAL unit type of all VCL NAL units to the "value indicating IRAP". For example, in a case of VVC, the NAL unit header setting unit 111 may set nal_unit_type to any value from 7 to 11.

In step S322, the NAL unit header encoding unit 112 encodes the NAL unit header that has been set in step S301, in accordance with a definition of a syntax table.

In step S323, the Raw Byte sequence payload encoding unit 113 encodes a Raw byte sequence payload in accordance with a definition of a syntax table. That is, the Raw Byte sequence payload encoding unit 113 encodes the Raw byte sequence payload as the NAL unit of the NAL unit type that has been set in step S321. That is, the Raw Byte sequence payload encoding unit 113 encodes the Raw byte sequence payload by applying Method 1-3 described above.

Figure 10:
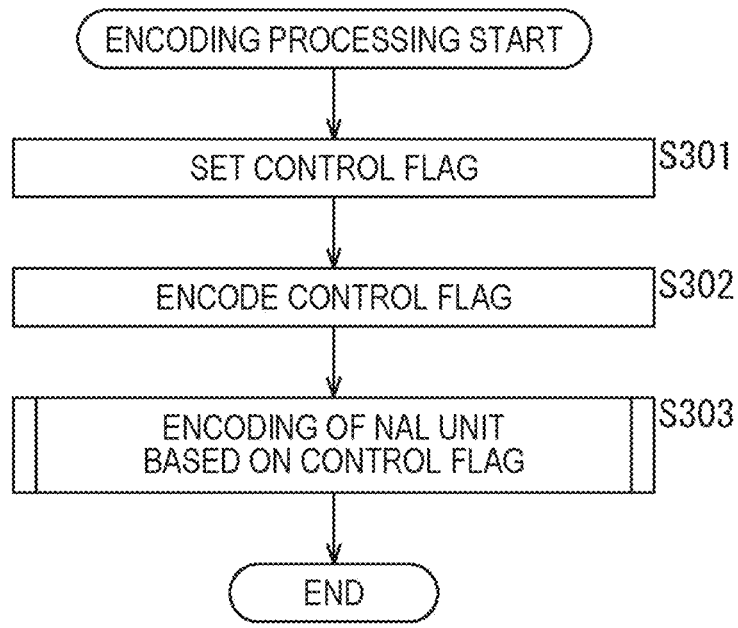
FIG. 10 is a flowchart for explaining an example of a flow of encoding processing.
Figure 11:
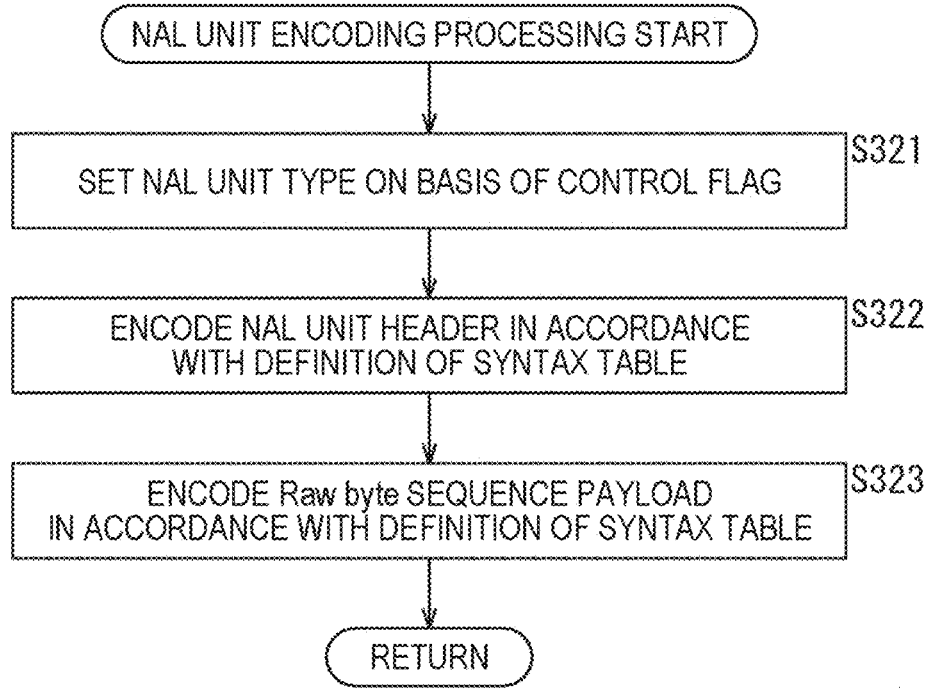
FIG. 11 is a flowchart illustrating an example of a flow of the NAL unit encoding processing.

When the processing of step S323 ends, the NAL unit encoding processing ends, and the processing returns to FIG. 10.

By executing individual processing in this manner, in a case where the control flag (irap_only_constraint_flag) for control of whether to limit a picture type of all pictures of the moving image to the I-picture is true, the encoding device 100 can encode the moving image as an encoding target with the picture type of all pictures set as the I-picture. That is, the encoding device 100 can make a specification of the bitstream to correspond to the profile more reliably.

<Decoding Device>

Figure 12:
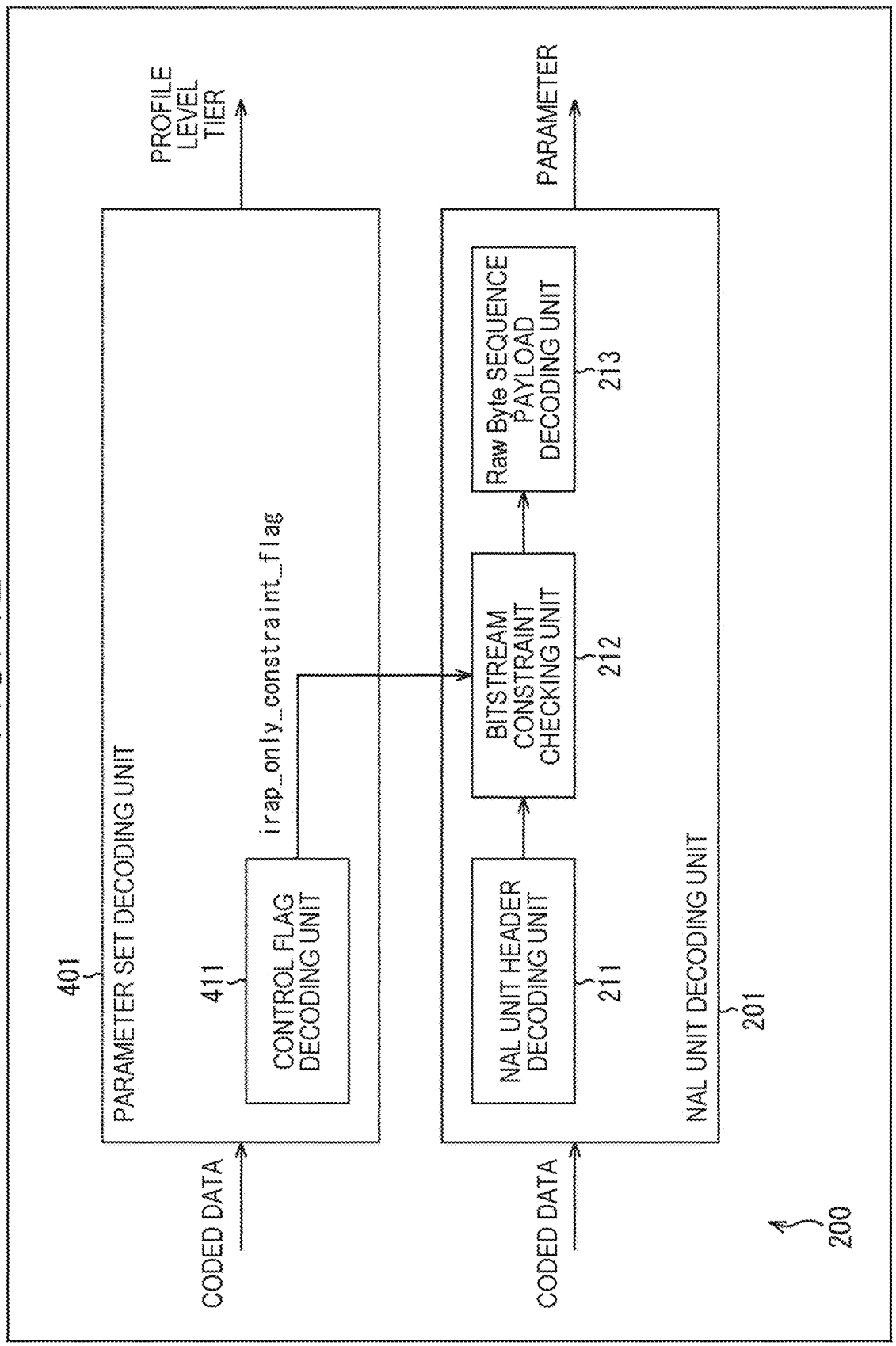
FIG. 12 is a block diagram illustrating a main configuration example of the decoding device.

FIG. 12 is a block diagram illustrating a main configuration example of a decoding device in this case (case of applying Method 1-3). Note that, in FIG. 12, main parts of processing units, data flows, and the like are illustrated, and those illustrated in FIG. 12 are not necessarily all. That is, the decoding device 200 may include a processor not illustrated as a block in FIG. 12. Furthermore, the decoding device 200 may have a process or a data flow that is not illustrated as an arrow or the like in FIG. 12.

As illustrated in FIG. 12, the decoding device 200 in this case includes a parameter set decoding unit 401 in addition to the configuration of FIG. 7. The parameter set decoding unit 401 acquires coded data of a parameter set including parameters such as a profile, a level, and a tier stored in a bitstream, and decodes the coded data to generate (restore) the parameter set (for example, the parameters such as a profile, a level, and a tier).

The parameter set decoding unit 401 includes a control flag decoding unit 411. The control flag decoding unit 411 applies Method 1-3 described above, and decodes a bitstream to generate (restore) the control flag (irap_only_constraint_flag) for control of whether to limit a picture type of all pictures of the moving image to the I-picture. The control flag decoding unit 411 supplies the generated control flag to the bitstream constraint checking unit 212.

The bitstream constraint checking unit 212 performs processing by applying Method 1-3 described above. For example, in a case where the control flag for control of whether to limit the picture type of all pictures of the moving image to the I-picture is true (for example, irap_only_constraint_flag==1), the bitstream constraint checking unit 212 may check whether the picture type of all pictures is the I-picture in the bitstream as a decoding target. For example, in a case where the control flag supplied from the control flag decoding unit 411 is true (for example, irap_only_constraint_flag==1), the bitstream constraint checking unit 212 may check whether the picture type of all pictures is the I-picture in the bitstream as a decoding target.

For example, the bitstream constraint checking unit 212 may check whether the NAL unit type of all VCL NAL units is the "value indicating IRAP" in the bitstream as a decoding target. For example, in a case of VVC, the bitstream constraint checking unit 212 may check whether nal_unit_type is set to any one of values 7 to 11 in the NAL unit header.

The bitstream constraint checking unit 212 may output a check result as described above. For example, in a case where it is determined that the bitstream does not satisfy a bitstream constraint corresponding to Method 1-3 described above, the bitstream constraint checking unit 212 may notify the user or the like of a warning message indicating that the bitstream constraint is not satisfied. For example, the bitstream constraint checking unit 212 may display the warning message on a screen as a character or an image, or may output the warning message as sound from a speaker or the like. Furthermore, the bitstream constraint checking unit 212 may provide the warning message to another device, another processing unit (another application), or the like as data or the like.

Furthermore, the bitstream constraint checking unit 212 may control decoding of the bitstream on the basis of the check result. For example, in a case where the bitstream constraint checking unit 212 determines that the bitstream does not satisfy a bitstream constraint corresponding to Method 1-3 described above, the bitstream constraint checking unit 212 may end the decoding processing on the bitstream. Furthermore, in a case where the bitstream constraint checking unit 212 determines that the bitstream does not satisfy a bitstream constraint corresponding to Method 1-3 described above, the bitstream constraint checking unit 212 may temporarily stop the decoding processing on the bitstream until permitted by the user or the like.

Furthermore, the bitstream constraint checking unit 212 may perform both the output of the warning message and the control of the decoding processing.

The NAL unit header decoding unit 211 and the Raw Byte sequence payload decoding unit 213 perform processing similarly to the case of FIG. 7.

With such a configuration, in a case where the control flag (irap_only_constraint_flag) for control of whether to limit a picture type of all pictures of the moving image to the I-picture is true, the decoding device 200 can check whether the picture type of all pictures is the I-picture in the bitstream as a decoding target. That is, the decoding device 200 can make a specification of the bitstream to be decoded to correspond to the profile more reliably.

<Flow of Decoding Processing>

Next, an example of a flow of decoding processing executed by the decoding device 200 will be described with reference to the flowchart in FIG. 13.

In this case, when the decoding processing is started, in step S401, the control flag decoding unit 411 of the decoding device 200 decodes (coded data of a control flag included in) a bitstream, to generate (restore) the control flag (irap_only_constraint_flag) for control of whether to limit a picture type of all pictures of the moving image to the I-picture.

In step S402, the NAL unit decoding unit 201 performs the NAL unit encoding processing by applying Method 1-3 described above, and decodes the coded data of the NAL unit on the basis of the control flag (irap_only_constraint_flag) generated (restored) in step S401. That is, in a case where the control flag is true, the NAL unit encoding unit 101 checks whether the picture type of all pictures is the I-picture in the bitstream as a decoding target.

When the processing in step S402 ends, the decoding processing ends.

<Flow of NAL Unit Decoding Processing>

Next, an example of a flow of NAL unit decoding processing executed in step S402 of FIG. 13 will be described with reference to a flowchart of FIG. 14.

When the NAL unit decoding processing is started, in step S421, the NAL unit header decoding unit 211 decodes coded data of the NAL unit header in accordance with a definition of a syntax table.

In step S422, the bitstream constraint checking unit 212 determines whether or not the bitstream as a decoding target satisfies a bitstream constraint related to an intra profile. At that time, the bitstream constraint checking unit 212 may perform the checking by applying Method 1-3 described above.

Figure 13:
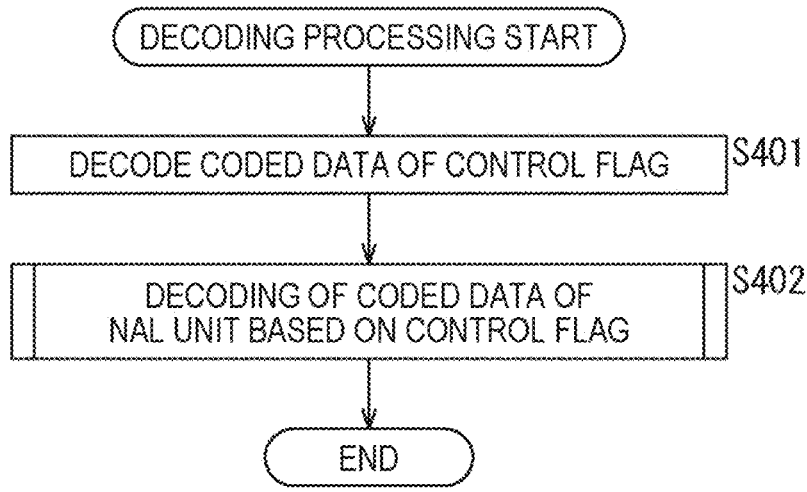
FIG. 13 is a flowchart for explaining an example of a flow of decoding processing.
Figure 14:
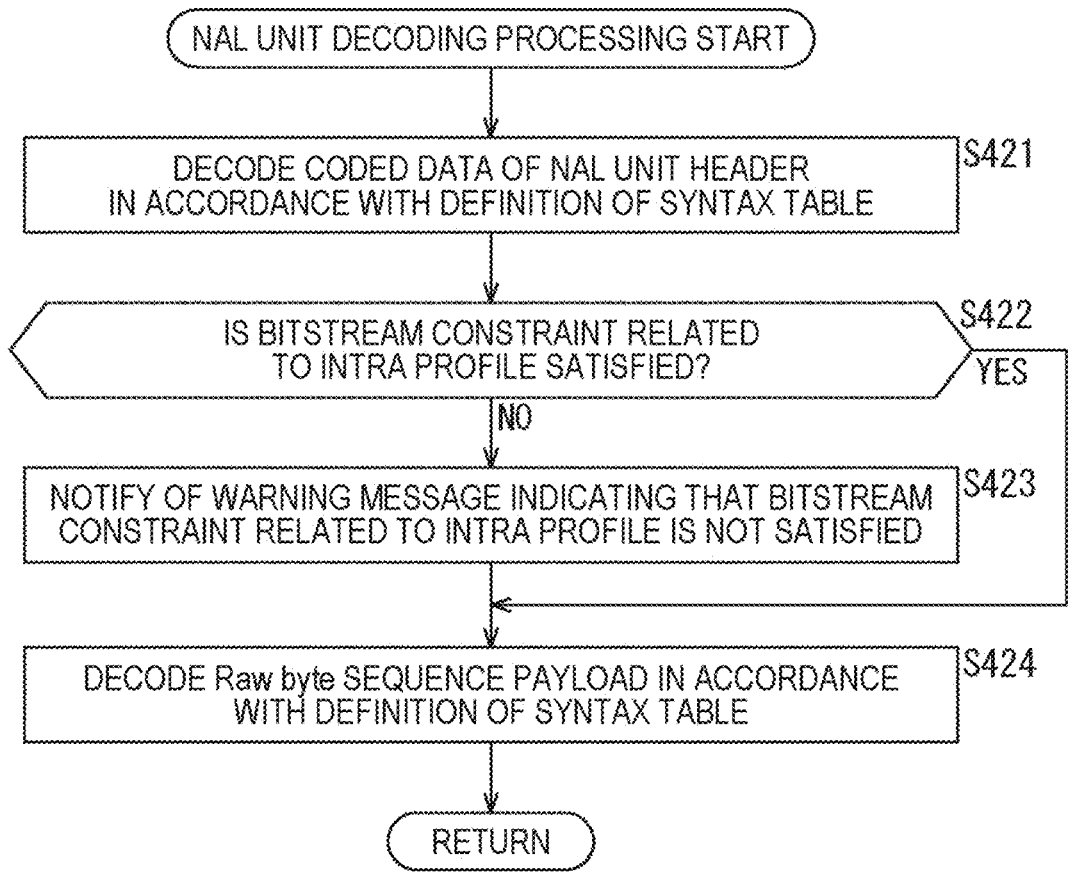
FIG. 14 is a flowchart illustrating an example of a flow of the NAL unit decoding processing.

For example, in a case where the control flag (irap_only_constraint_flag) decoded in step S401 of FIG. 13 is true, the bitstream constraint checking unit 212 may check whether the picture type of all pictures of the moving image is an I-picture in the bitstream as a decoding target. For example, the bitstream constraint checking unit 212 may check whether the NAL unit type of all VCL NAL units is the "value indicating IRAP" in the bitstream. For example, in a case of VVC, the bitstream constraint checking unit 212 may check whether nal_unit_type is any of 7 to 11.

In a case where it is determined in step S422 that the bitstream constraint related to the intra profile is not satisfied (for example, in a case where the parameter ret is false (ret=0)), the processing proceeds to step S423.

In step S423, the bitstream constraint checking unit 212 notifies of a warning message indicating that the bitstream constraint related to the intra profile is not satisfied.

When the processing of step S423 ends, the processing proceeds to step S424. Furthermore, in a case where it is determined in step S422 that the bitstream as a decoding target satisfies the bitstream constraint related to the intra profile, the processing proceeds to step S424.

In step S424, the Raw Byte sequence payload decoding unit 213 decodes a Raw byte sequence payload in accordance with a definition of a syntax table.

When the processing of step S424 ends, the processing returns to FIG. 13.

By executing individual processing in this manner, in a case where the control flag (irap_only_constraint_flag) for control of whether to limit a picture type of all pictures of the moving image to the I-picture is true, the decoding device 200 can check whether the picture type of all pictures is the I-picture in the bitstream as a decoding target. That is, the decoding device 200 can make a specification of the bitstream to be decoded to correspond to the profile more reliably.

Note that the encoding device 100 and the decoding device 200 may apply Method 1-3 described above in combination with another method (Method 1, Method 1-1, or Method 1-2 described above, or a combination thereof, or the like).

4. Constraint on Slice Type

<Method 2>

Furthermore, as illustrated at the top row of the table in FIG. 15, in a case of an intra profile, an intra-only constraint flag may be limited to true (Method 2). The intra-only constraint flag (gci_intra_only_constraint_flag) is flag information indicating whether or not the slice type of all slices of a moving image is the I-slice. Furthermore, this intra-only constraint flag can also be said as a control flag for control of whether or not to limit the slice type of all slices of the moving image to the I-slice. By providing such a constraint (also referred to as "bitstream constraint on intra-only constraint flag") by using the intra-only constraint flag, for example, this constraint can be applied to the intra profile described above. That is, it is possible to control whether or not to limit the slice type of all slices of the moving image to the I-slice through the intra-only constraint flag. Therefore, a specification of a bitstream can be made to correspond to the profile more reliably.

<Method 2-1>

For example, in a case of applying Method 2, as illustrated in the second row from the top of the table in FIG. 15, in a case where the profile is any of the Main 12 Intra profile, the Main 12 4:4:4 Intra profile, or the Main 16 4:4:4 Intra profile, the intra-only constraint flag may be limited to true (Method 2-1).

<Method 2-1-1>

For example, in a case of applying Method 2-1, as shown in the third row from the top of the table in FIG. 15, in a case where a value of a profile identifier is 10, 42 or 44, the intra-only constraint flag may be limited to true (Method 2-1-1).

<Method 2-2>

For example, in a case of applying Method 2, as shown in the bottom row of the table of FIG. 15, the intra-only constraint flag may be limited to true also in a case of a still picture profile (Method 2-2).

<Bitstream Constraint>

For example, in a general encoding standard (encoding/decoding method) for a moving image such as VVC, a bitstream constraint as illustrated in FIG. 16 may be provided as a bitstream constraint related to an intra profile. For example, in a case of VVC, the intra-only constraint flag (gci_intra_only_constraint_flag) is set as in syntax illustrated in FIG. 17.

This intra-only constraint flag (gci_intra_only_constraint_flag) is flag information indicating whether or not a slice type of all slices of a moving image included in a bitstream as a decoding target is the I-slice on the decoding side. For example, in a case where the intra-only constraint flag is true (for example, gci_intra_only_constraint_flag==1), it indicates that the slice type of all slices of the moving image included in the bitstream as a decoding target is the I-slice. Furthermore, in a case where the intra-only constraint flag is false (for example, gci_intra_only_constraint_flag==0), it indicates that the slice type of all slices of the moving image included in the bitstream as a decoding target is not necessarily the I-slice.

Furthermore, the intra-only constraint flag (gci_intra_only_constraint_flag) is a control flag that controls whether or not to limit a slice type of all slices of a moving image to the I-slice on the encoding side. For example, in a case where the intra-only constraint flag is true (for example, gci_intra_only_constraint_flag==1), the slice type of all slices of the moving image is set as the I-slice, and the moving image is encoded. Furthermore, in a case where the intra-only constraint flag is false (for example, gci_intra_only_constraint_flag==0), the moving image is encoded without such limitation applied to the slice type.

In the bitstream constraint of FIG. 16, in a case of an intra profile (the Main 12 Intra profile, the Main 12 4:4:4 Intra profile, or the Main 16 4:4:4 Intra profile), this intra-only constraint flag (gci_intra_only_constraint_flag) is limited to true.

By adding such a bitstream constraint to the general encoding standard of a moving image, this intra-only constraint flag (gci_intra_only_constraint_flag) can be set to true in a case where an intra profile is applied. That is, in a case where the intra profile is applied, a slice type of all slices of a moving image as an encoding target can be limited to the I-slice. For example, in a case of VVC, as illustrated in FIG. 18, the bitstream constraint of FIG. 2 may simply be added to "A3.5 Format range extensions profiles" of Non-Patent Document 7.

Note that, as illustrated in FIG. 18, in a case where the intra profile is applied, a value of sh_slice_type, which is a parameter indicating the slice type, may be limited to "2" for all slices of a moving image as an encoding target.

<Encoding Device>

Figure 19:
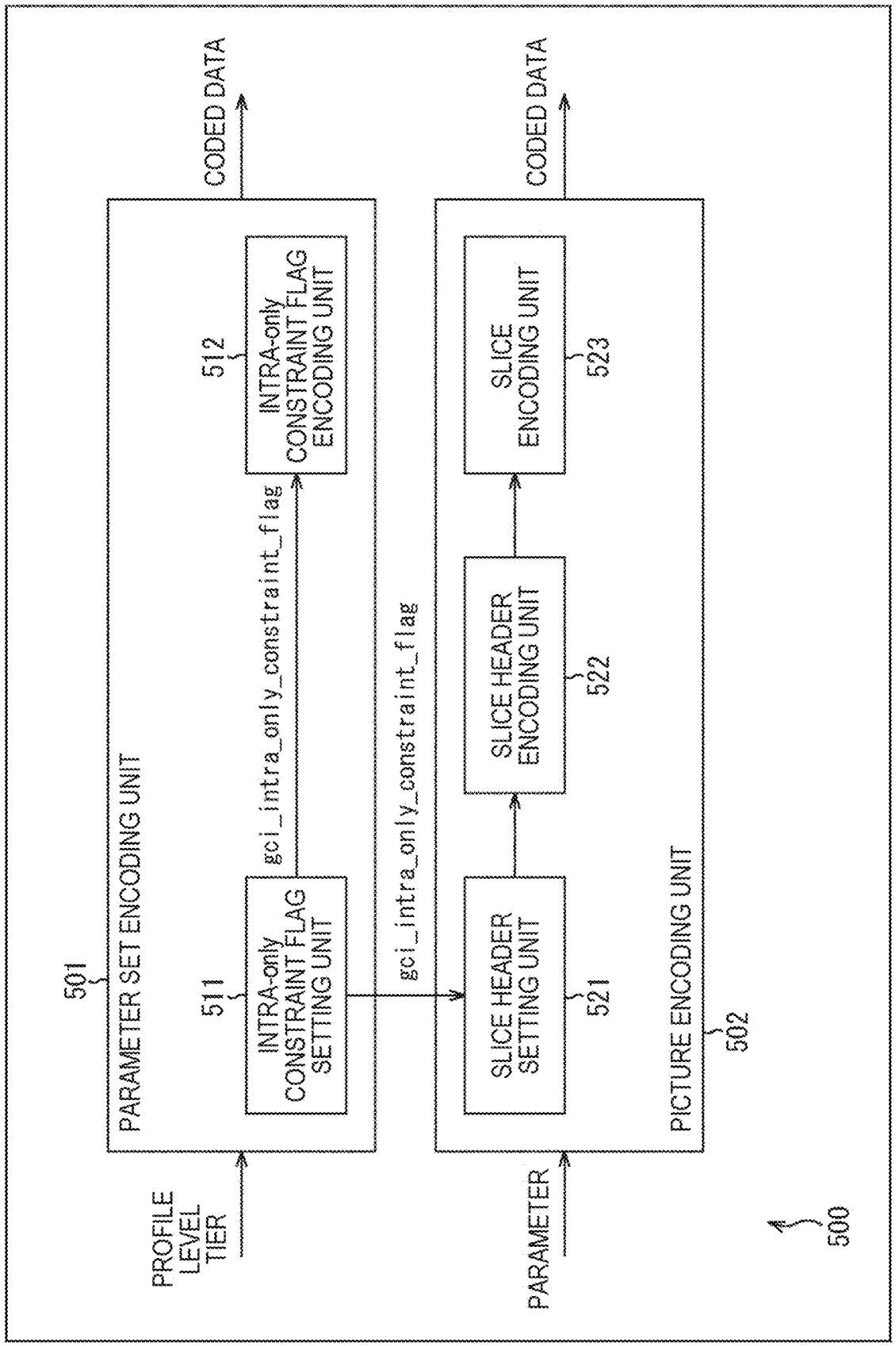
FIG. 19 is a block diagram illustrating a main configuration example of the encoding device.

FIG. 19 is a block diagram illustrating an example of a configuration of an encoding device, which is one mode of an image processing apparatus to which the present technology is applied. An encoding device 500 illustrated in FIG. 19 is a device that encodes a moving image as an encoding target and generates a bitstream.

For example, the encoding device 500 derives a prediction residual of a moving image and a predicted image thereof, performs coefficient transform (for example, orthogonal transform) on the prediction residual, and quantizes and encodes a transform coefficient thereof. Of course, this encoding method is an example. A method of encoding a moving image by the encoding device 500 is not limited to this example. For example, some of the above-described processing such as coefficient transform and quantization may be skipped (omitted).

The encoding device 500 encodes the moving image by applying Method 2, Method 2-1, Method 2-1-1, or Method 2-2 described above, or a combination thereof.

Note that, in FIG. 19, main parts of processing units, data flows, and the like are illustrated, and those illustrated in FIG. 19 are not necessarily all. That is, the encoding device 500 may include a processing unit not illustrated as a block in FIG. 19. Furthermore, the encoding device 500 may have a process or a data flow that is not illustrated as an arrow or the like in FIG. 19.

As illustrated in FIG. 19, the encoding device 500 includes a parameter set encoding unit 501 and a picture encoding unit 502. The parameter set encoding unit 501 acquires and encodes a parameter set including parameters such as a profile, a level, and a tier, and outputs coded data (stores the coded data into a bitstream). The picture encoding unit 502 acquires any parameter related to a moving image as an encoding target, and encodes the moving image for each slice by using the parameter.

At that time, the parameter set encoding unit 501 and the picture encoding unit 502 may perform processing by applying Method 2, Method 2-1, Method 2-1-1, or Method 2-2 described above, or a combination thereof. For example, in a case where a profile for encoding of a moving image is an intra profile, the parameter set encoding unit 501 may set the intra-only constraint flag (gci_intra_only_constraint_flag), which is for control of whether to limit a slice type of all slices of the moving image to the I-slice, to true, and encode a parameter set including the intra-only constraint flag. Furthermore, in a case where the intra-only constraint flag is true, the picture encoding unit 502 may encode the moving image with all slices of the moving image as an encoding target set as I-slices.

At that time, in a case where the intra-only constraint flag is true, the picture encoding unit 502 may set a value of sh_slice_type, which is a parameter indicating a slice type, to "2".

Furthermore, in a case where the profile is the Main 12 Intra profile, the Main 12 4:4:4 Intra profile, or the Main 16

4:4:4 Intra profile, the parameter set encoding unit 501 may set the intra-only constraint flag to true.

Furthermore, in a case where a value of the profile identifier (general_profile_idc) for identification of the profile is 10, 42, or 44, the parameter set encoding unit 501 may set the intra-only constraint flag to true.

Furthermore, also in a case where the profile is a still picture profile (for example, in a case where a value of the profile identifier (general_profile_idc) is 66, 98, or 100), the parameter set encoding unit 501 may set the intra-only constraint flag to true.

As illustrated in FIG. 19, the parameter set encoding unit 501 includes an intra-only constraint flag setting unit 511 and an intra-only constraint flag encoding unit 512. Furthermore, the picture encoding unit 502 includes a slice header setting unit 521, a slice header encoding unit 522, and a slice encoding unit 523.

The intra-only constraint flag setting unit 511 performs processing related to setting of the intra-only constraint flag. For example, the intra-only constraint flag setting unit 511 may set the intra-only constraint flag on the basis of a profile designated by the user or the like. For example, in a case where an intra profile is designated, the intra-only constraint flag setting unit 511 may set the intra-only constraint flag to true (gci_intra_only_constraint_flag==1). Furthermore, in a case where a profile other than the intra profile is designated, the intra-only constraint flag setting unit 511 may set the intra-only constraint flag to false (gci_intra_only_constraint_flag==0).

At that time, the intra-only constraint flag setting unit 511 may regard, as being the intra profile, a state where the profile is the Main 12 Intra profile, the Main 12 4:4:4 Intra profile, or the Main 16 4:4:4 Intra profile. That is, in a case where the designated profile is the Main 12 Intra profile, the Main 12 4:4:4 Intra profile, or the Main 16 4:4:4 Intra profile, the intra-only constraint flag setting unit 511 may set the intra-only constraint flag to true.

Furthermore, the intra-only constraint flag setting unit 511 may determine what the designated profile is by using the profile identifier (general_profile_idc) for identification of the profile. That is, in a case where a value of the profile identifier is 10, 42, or 44, the intra-only constraint flag setting unit 511 may set the intra-only constraint flag to true.

Furthermore, the intra-only constraint flag setting unit 511 may treat the still picture profile similarly to the intra profile. That is, also in a case where the profile is a still picture profile, similarly to the case of the intra profile, the intra-only constraint flag setting unit 511 may set the intra-only constraint flag to true.

At that time, the intra-only constraint flag setting unit 511 may regard, as being the still picture profile, a state where the profile is the Main 12 Still Picture profile, the Main 12 4:4:4 Still Picture profile, or the Main 16 4:4:4 Still Picture profile. That is, in a case where the designated profile is the Main 12 Still Picture profile, the Main 12 4:4:4 Still Picture profile, or the Main 16 4:4:4 Still Picture profile, the intra-only constraint flag setting unit 511 may set the intra-only constraint flag to true.

Also in a case of a still picture profile, the intra-only constraint flag setting unit 511 may determine what the designated profile is by using the profile identifier (general_profile_idc) for identification of the profile. That is, in a case where a value of the profile identifier is 66, 98, or 100, the intra-only constraint flag setting unit 511 may set the intra-only constraint flag to true.

The intra-only constraint flag setting unit 511 may supply the set intra-only constraint flag to the intra-only constraint flag encoding unit 512 and the slice header setting unit 521.

The intra-only constraint flag encoding unit 512 may encode the intra-only constraint flag supplied from the intra-only constraint flag setting unit 511, and store the coded data into the bitstream.

The slice header setting unit 521 performs processing related to slice header setting. For example, the slice header setting unit 521 may acquire the intra-only constraint flag supplied from the intra-only constraint flag setting unit 511. Furthermore, the slice header setting unit 521 may set a slice type on the basis of the intra-only constraint flag. For example, in a case where the intra-only constraint flag is true (gci_intra_only_constraint_flag==1), the slice header setting unit 521 may set all slices to I-slices. At that time, for example, the slice header setting unit 521 may set a value of sh_slice_type, which is a parameter indicating a slice type, to "2".

Note that, in a case where the intra-only constraint flag is false (gci_intra_only_constraint_flag==0), the slice header setting unit 521 selects and sets an appropriate slice type. For example, the slice header setting unit 521 may set a value of sh_slice_type to an appropriate value from 0 to 2.

Furthermore, the slice header setting unit 521 may set the slice type on the basis of a designated profile type instead of the intra-only constraint flag. For example, in a case where an intra profile is designated, the slice header setting unit 521 may set all slices to I-slices. For example, in a case where the Main 12 Intra profile, the Main 12 4:4:4 Intra profile, or the Main 16 4:4:4 Intra profile is designated, the slice header setting unit 521 may set all slices to I-slices. Furthermore, in a case where a value of the designated profile identifier is 10, 42, or 44, the slice header setting unit 521 may set the picture type of all pictures as the I-picture. Furthermore, also in a case where a still picture profile is designated, the slice header setting unit 521 may set the picture type of all pictures as the I-picture.

The slice header setting unit 521 may supply the slice header that has been set in this manner, to the slice header encoding unit 522.

The slice header encoding unit 522 encodes the slice header supplied from the slice header setting unit 521 in accordance with a definition of a syntax table. The slice encoding unit 523 encodes a slice in accordance with a definition of a syntax table.

With such a configuration, the encoding device 500 can encode the moving image in accordance with a bitstream constraint such as "limiting the intra-only constraint flag to true in a case of an intra profile". For example, the encoding device 500 can encode a moving image in accordance with the bitstream constraint illustrated in FIG. 16. That is, the encoding device 500 can make a specification of the bitstream to correspond to the profile more reliably.

<Flow of Encoding Processing>

Next, an example of a flow of encoding processing executed by this encoding device 500 will be described with reference to a flowchart in FIG. 20.

When the encoding processing is started, in step S501, the parameter set encoding unit 501 of the encoding device 500 executes the parameter set encoding processing to encode the parameter that has been set. At that time, in a case where the profile for encoding of the moving image is an intra profile, the parameter set encoding unit 501 sets the intra-only constraint flag to true and encodes the parameter set including the intra-only constraint flag.

In step S502, the picture encoding unit 502 executes picture encoding processing to encode a picture. At that time, in a case where the intra-only constraint flag is true, the picture encoding unit 502 encodes the moving image as an encoding target with all slices set as I-slices.

When the processing of step S502 ends, the encoding processing ends.

<Flow of Parameter Set Encoding Processing>

Next, an example of a flow of parameter set encoding processing executed in step S501 of FIG. 20 will be described with reference to a flowchart of FIG. 21.

When the parameter set encoding processing is started, in step S521, the intra-only constraint flag setting unit 511 sets the intra-only constraint flag (gci_intra_only_constraint_flag) on the basis of the designated profile. As described above, for example, in a case where an intra profile is designated, the intra-only constraint flag setting unit 511 may set the intra-only constraint flag to true. At that time, the intra-only constraint flag setting unit 511 may regard, as being the intra profile, a state where the profile is the Main 12 Intra profile, the Main 12 4:4:4 Intra profile, or the Main 16 4:4:4 Intra profile. Furthermore, the intra-only constraint flag setting unit 511 may determine what the designated profile is by using the profile identifier (general_profile_idc) for identification of the profile. Furthermore, the intra-only constraint flag setting unit 511 may treat the still picture profile similarly to the intra profile.

In step S522, the intra-only constraint flag encoding unit 512 encodes the intra-only constraint flag that has been set in step S521, in accordance with a definition of a syntax table.

Figure 20:
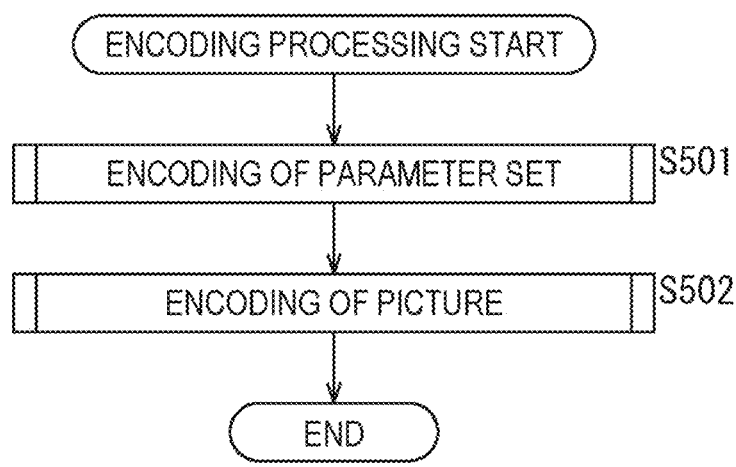
FIG. 20 is a flowchart for explaining an example of a flow of encoding processing.
Figure 21:
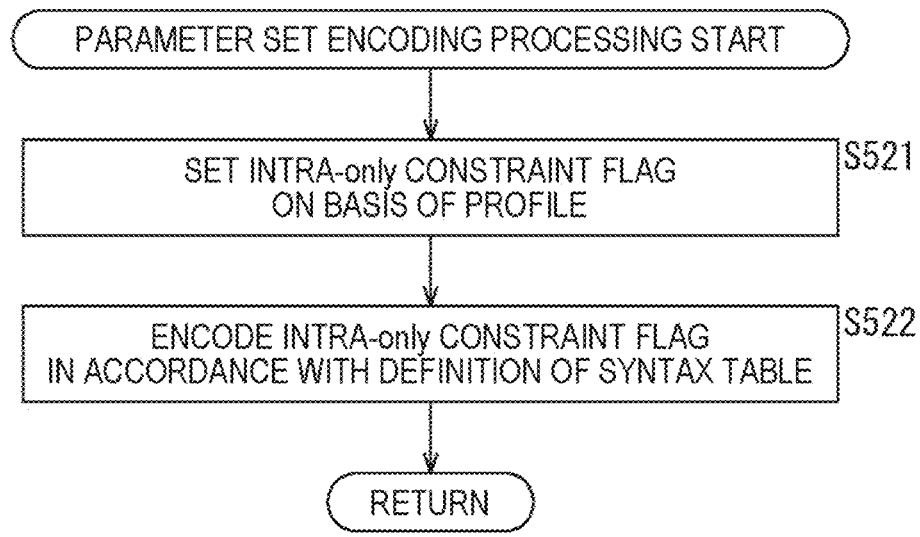
FIG. 21 is a flowchart illustrating an example of a flow of parameter set encoding processing.

When the processing of step S522 ends, the parameter set encoding processing ends, and the processing returns to FIG. 20.

<Flow of Picture Encoding Processing>

Figure 22:
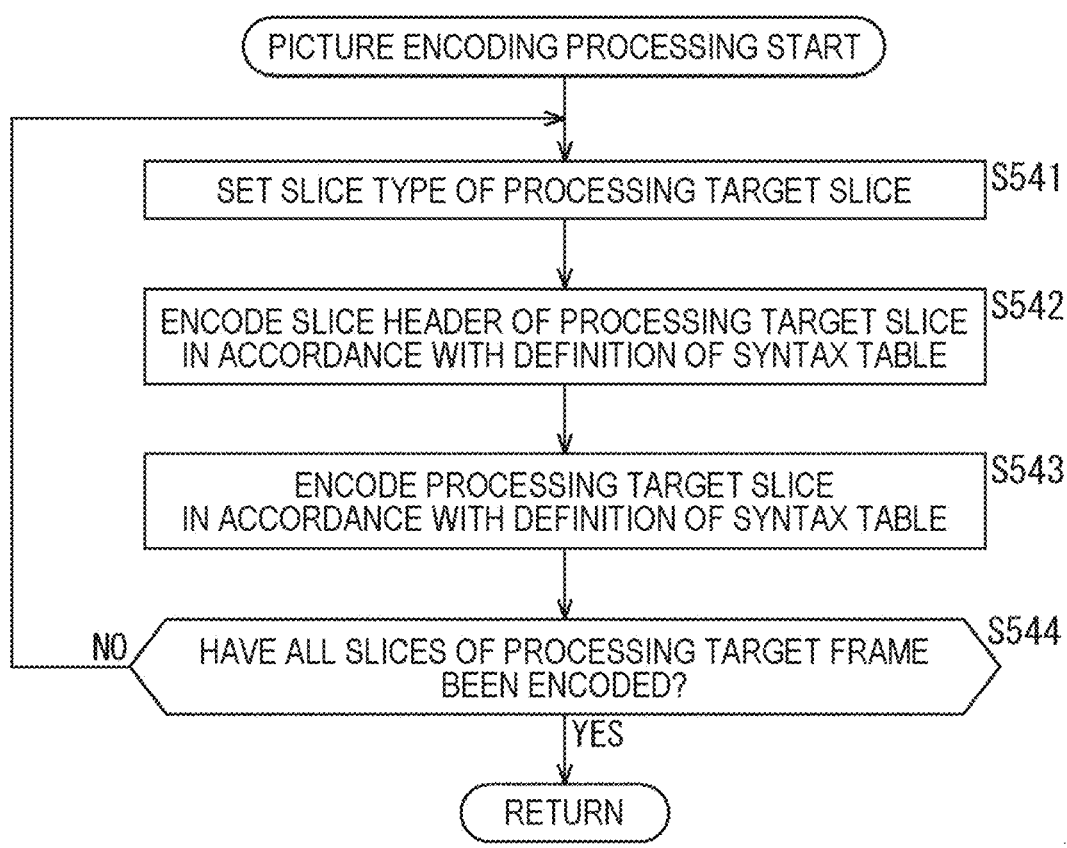
FIG. 22 is a flowchart illustrating an example of a flow of picture encoding processing.

Next, an example of a flow of the picture encoding processing executed in step S502 in FIG. 20 will be described with reference to a flowchart in FIG. 22.

When the picture encoding processing is started, the slice header setting unit 521 sets a slice type of a processing target slice in step S541.

At that time, in the slice header setting unit 521, the slice header setting unit 521 may set the slice type on the basis of the intra-only constraint flag. For example, in a case where the intra-only constraint flag is true (gci_intra_only_constraint_flag==1), the slice header setting unit 521 may set all slices to I-slices. At that time, for example, the slice header setting unit 521 may set a value of sh_slice_type, which is a parameter indicating a slice type, to "2".

Furthermore, the slice header setting unit 521 may set the slice type on the basis of a designated profile type instead of the intra-only constraint flag. For example, in a case where an intra profile is designated, the slice header setting unit 521 may set all slices to I-slices. For example, in a case where the Main 12 Intra profile, the Main 12 4:4:4 Intra profile, or the Main 16 4:4:4 Intra profile is designated, the slice header setting unit 521 may set all slices to I-slices. Furthermore, in a case where a value of the designated profile identifier is 10, 42, or 44, the slice header setting unit 521 may set the picture type of all pictures as the I-picture. Furthermore, also in a case where a still picture profile is designated, the slice header setting unit 521 may set the picture type of all pictures as the I-picture.

The slice header setting unit 521 sets a slice header including the slice type that has been set in this manner, for the processing target slice.

In step S542, the slice header encoding unit 522 encodes the slice header of the processing target slice that has been set in step S541, in accordance with a definition of a syntax table.

In step S543, the slice encoding unit 523 encodes the processing target slice in accordance with a definition of a syntax table.

In step S544, the picture encoding unit 502 determines whether or not all slices of the processing target frame have been encoded. In a case where it is determined that there is an unprocessed slice, a new processing target slice is selected from the unprocessed slices, and the processing returns to step S541. That is, individual processing of steps S541 to S544 is executed for each slice of the processing target frame.

Then, in a case where it is determined in step S544 that all slices of the processing target frame have been encoded, the picture encoding processing ends, and the processing returns to FIG. 20.

By executing individual processing in this manner, the encoding device 500 can encode the moving image in accordance with a bitstream constraint such as "limiting the intra-only constraint flag to true in a case of an intra profile". For example, the encoding device 500 can encode a moving image in accordance with the bitstream constraint illustrated in FIG. 16. That is, the encoding device 500 can make a specification of the bitstream to correspond to the profile more reliably.

<Decoding Device>

Figure 23:
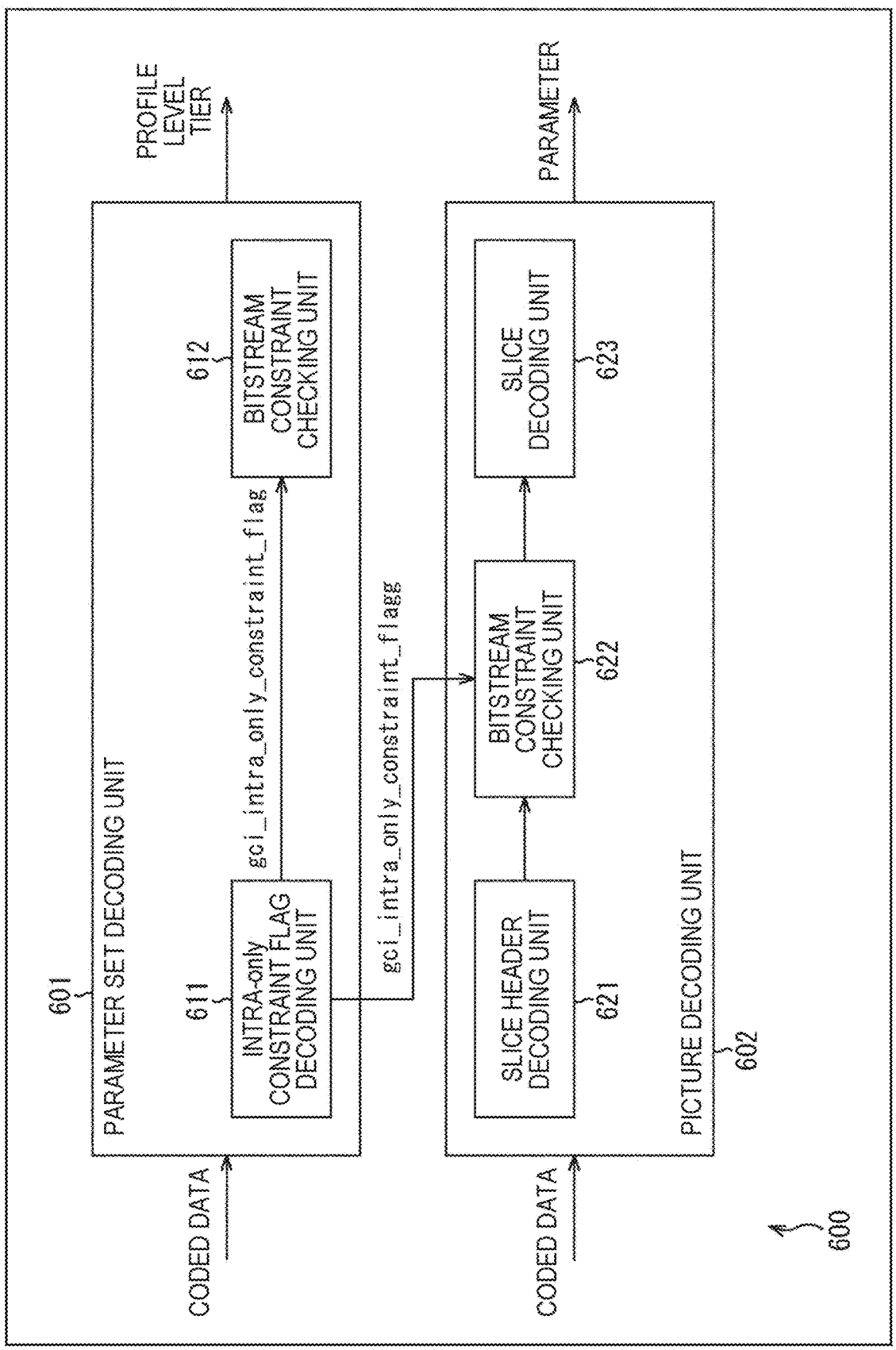
FIG. 23 is a block diagram illustrating a main configuration example of the decoding device.

FIG. 23 is a block diagram illustrating an example of a configuration of a decoding device, which is an aspect of an image processing apparatus to which the present technology is applied. A decoding device 600 illustrated in FIG. 23 is a device that decodes a bitstream to generate (restore) a moving image as an encoding target.

For example, the decoding device 600 decodes a bitstream to generate (restore) a quantization coefficient, inversely quantizes the quantization coefficient to derive a transform coefficient, performs inverse coefficient transform (for example, inverse orthogonal transform) on the transform coefficient to derive a prediction residual, generates a predicted image from a decoded image, and adds the predicted image to the prediction residual to generate (restore) image data. Of course, this decoding method is an example. A method of decoding a bitstream by the decoding device 600 is not limited to this example. For example, some of the above-described processing such as inverse quantization and inverse coefficient transform may be skipped (omitted).

The decoding device 600 decodes the bitstream by applying Method 2, Method 2-1, Method 2-1-1, or Method 2-2 described above, or a combination thereof.

Note that, in FIG. 23, main parts of processing units, data flows, and the like are illustrated, and those illustrated in FIG. 23 are not necessarily all. That is, the decoding device 600 may include a processor not illustrated as a block in FIG. 23. Furthermore, the decoding device 600 may have a process or a data flow that is not illustrated as an arrow or the like in FIG. 23.

As illustrated in FIG. 23, the decoding device 600 includes a parameter set decoding unit 601 and a picture decoding unit 602. The parameter set decoding unit 601 acquires coded data of a parameter set including parameters such as a profile, a level, and a tier stored in a bitstream, and decodes the coded data to generate (restore) the parameter set (for example, the parameters such as a profile, a level, and a tier). The picture decoding unit 602 acquires a bitstream, decodes the bitstream, generates (restores) a moving image as an encoding target, and outputs a parameter related to the moving image.

The parameter set decoding unit 601 includes an intra-only constraint flag decoding unit 611 and a bitstream constraint checking unit 612. Furthermore, the picture decoding unit 602 includes a slice header decoding unit 621, a bitstream constraint checking unit 622, and a slice decoding unit 623.

The intra-only constraint flag decoding unit 611 applies Method 2, Method 2-1, Method 2-1-1, or Method 2-2 described above, or a combination thereof, and decodes a bitstream to generate (restore) the intra-only constraint flag (gci_intra_only_constraint_flag). The intra-only constraint flag is a control flag for control of whether to limit a slice type of all slices of a moving image to the I-slice. Therefore, the intra-only constraint flag decoding unit 611 can also be said as a control flag decoding unit. Note that the intra-only constraint flag can also be said as flag information indicating whether or not a slice type of all slices of a moving image stored in a bitstream is the I-slice. The intra-only constraint flag decoding unit 611 supplies the generated intra-only constraint flag to the bitstream constraint checking unit 612 and the bitstream constraint checking unit 622.

The bitstream constraint checking unit 612 applies Method 2, Method 2-1, Method 2-1-1, or Method 2-2 described above, or a combination thereof, and checks whether or not the bitstream satisfies a bitstream constraint related to the intra-only constraint flag. Therefore, the bitstream constraint checking unit 612 can also be said as a control flag checking unit that checks a control flag. For example, in a case where the profile of the bitstream is an intra profile, the bitstream constraint checking unit 612 may check whether the intra-only constraint flag is true (for example, gci_intra_only_constraint_flag==1).

For example, in a case where the profile of the bitstream is the Main 12 Intra profile, the Main 12 4:4:4 Intra profile, or the Main 16 4:4:4 Intra profile, the bitstream constraint checking unit 612 may check whether the intra-only constraint flag is true.

Furthermore, in a case where a value of the profile identifier (general_profile_idc) for identification of the profile is 10, 42, or 44, the bitstream constraint checking unit 612 may check whether the intra-only constraint flag is true.

Furthermore, also in a case where the profile of the bitstream is a still picture profile, the bitstream constraint checking unit 612 may check whether the intra-only constraint flag is true.

The bitstream constraint checking unit 612 may output a check result as described above. For example, in a case where the bitstream constraint checking unit 612 determines that the bitstream does not satisfy the bitstream constraint related to the intra-only constraint flag (there is an intra-only constraint flag whose value is false even in a case of the intra profile), the bitstream constraint checking unit 612 may notify the user or the like of a warning message indicating that the bitstream constraint is not satisfied. For example, the bitstream constraint checking unit 612 may display the warning message on a screen as a character or an image, or may output the warning message as sound from a speaker or the like. Furthermore, the bitstream constraint checking unit 612 may provide the warning message to another device, another processing unit (another application), or the like as data or the like.

Furthermore, the bitstream constraint checking unit 612 may control decoding of the intra-only constraint flag on the basis of the check result. For example, in a case where it is determined that the bitstream does not satisfy the bitstream constraint related to the intra-only constraint flag described above, the bitstream constraint checking unit 612 may end the decoding processing on the intra-only constraint flag. Furthermore, in a case where the bitstream constraint checking unit 612 determines that the bitstream does not satisfy the bitstream constraint related to the intra-only constraint flag, the bitstream constraint checking unit 612 may temporarily stops the decoding processing on the intra-only constraint flag until permitted by the user or the like.

Furthermore, the bitstream constraint checking unit 612 may perform both the output of the warning message and the control of the decoding processing.

The slice header decoding unit 621 decodes the bitstream in accordance with a definition of a syntax table, to generate (restore) a slice header of the processing target slice. The slice header decoding unit 621 supplies the generated slice header of the processing target slice to the bitstream constraint checking unit 622.

The bitstream constraint checking unit 622 performs processing related to checking of a bitstream constraint. For example, the bitstream constraint checking unit 622 may acquire the intra-only constraint flag supplied from the intra-only constraint flag decoding unit 611. Furthermore, the bitstream constraint checking unit 622 may acquire the slice header supplied from the slice header decoding unit 621. The bitstream constraint checking unit 622 may apply Method 2, Method 2-1, Method 2-1-1, or Method 2-2 described above, or a combination thereof, and check whether the slice type of all slices of the moving image is the I-slice in the bitstream, in a case where a predetermined condition is satisfied. For example, the bitstream constraint checking unit 622 may check whether or not a value of sh_slice_type, which is a parameter indicating the slice type, is "2" for all slices.

Furthermore, in a case where the intra-only constraint flag is true, the bitstream constraint checking unit 622 may check whether the slice type of all slices of the moving image is the I-slice in the bitstream. For example, in a case where the intra-only constraint flag supplied from the intra-only constraint flag decoding unit 611 is true, the bitstream constraint checking unit 622 may check whether the slice type of all slices of the moving image is the I-slice in the bitstream.

Furthermore, the bitstream constraint checking unit 622 may check whether the slice type of all slices is the I-slice on the basis of a profile type of the bitstream instead of the intra-only constraint flag. For example, in a case where the profile of the bitstream is an intra profile, the bitstream constraint checking unit 622 may check whether the slice type of all slices of the moving image is the I-slice in the bitstream. For example, in a case where the profile type of the bitstream is the Main 12 Intra profile, the Main 12 4:4:4 Intra profile, or the Main 16 4:4:4 Intra profile, the bitstream constraint checking unit 622 may check whether the slice type of all slices is the I-slice. Furthermore, in a case where a value of the profile identifier stored in the bitstream is 10, 42, or 44, the bitstream constraint checking unit 622 may check whether the slice type of all slices is the I-slice. Furthermore, also in a case where the profile of the bitstream is a still picture profile, the bitstream constraint checking unit 622 may check whether the slice type of all slices is the I-slice.

The bitstream constraint checking unit 622 may output a check result as described above. For example, in a case where it is determined that the bitstream does not satisfy the bitstream constraint related to the intra-only constraint flag described above (there is a slice that is not an I-slice even in a case of the intra profile), the bitstream constraint checking unit 622 may notify the user or the like of a warning message indicating that the bitstream constraint is not satisfied. For example, the bitstream constraint checking unit 622 may display the warning message on a screen as a character or an image, or may output the warning message as sound from a speaker or the like. Furthermore, the bitstream constraint checking unit 622 may provide the warning message to another device, another processing unit (another application), or the like as data or the like.

Furthermore, the bitstream constraint checking unit 622 may control decoding of the intra-only constraint flag on the basis of the check result. For example, in a case where it is determined that the bitstream does not satisfy the bitstream constraint related to the intra-only constraint flag described above, the bitstream constraint checking unit 622 may end the decoding processing on the bitstream. Furthermore, in a case where the bitstream constraint checking unit 622 determines that the bitstream does not satisfy the bitstream constraint related to the intra-only constraint flag, the bitstream constraint checking unit 622 may temporarily stop the decoding processing on the bitstream until permitted by the user or the like.

Furthermore, the bitstream constraint checking unit 622 may perform both the output of the warning message and the control of the decoding processing.

The slice decoding unit 623 decodes a bitstream, to generate (restore) a moving image as a decoding target included in the bitstream. For example, the slice decoding unit 623 decodes the processing target slice in accordance with a definition of a syntax table.

With such a configuration, for example, in a case where the profile of the bitstream is an intra profile, the decoding device 600 can check whether all the intra-only constraint flags are true. That is, the decoding device 600 can make a specification of the bitstream to be decoded to correspond to the profile more reliably.

<Flow of Decoding Processing>

Next, an example of a flow of decoding processing executed by this decoding device 600 will be described with reference to the flowchart in FIG. 24.

In this case, when the decoding processing is started, the parameter set decoding unit 601 executes the parameter decoding processing in step S601, to decode coded data of a parameter set included in a bitstream and generate (restore) the parameter set.

In step S602, the picture decoding unit 602 executes picture decoding processing, to decode coded data of the picture included in the bitstream and generate (restore) the picture.

When the processing in step S602 ends, the decoding processing ends.

<Flow of Parameter Set Decoding Processing>

Next, an example of a flow of parameter set decoding processing executed in step S601 of FIG. 24 will be described with reference to a flowchart of FIG. 25.

When the parameter set encoding processing is started, the intra-only constraint flag decoding unit 611 decodes a bitstream in accordance with a definition of a syntax table, to generate (restore) the intra-only constraint flag in step S621.

In step S622, the bitstream constraint checking unit 612 applies Method 2, Method 2-1, Method 2-1-1, or Method 2-2 described above, or a combination thereof, and determines whether or not the bitstream satisfies a bitstream constraint related to the intra-only constraint flag. For example, in a case where the profile of the bitstream is an intra profile, the bitstream constraint checking unit 612 may check whether the intra-only constraint flag is true (for example, gci_intra_only_constraint_flag==1). In a case where it is determined that the intra-only constraint flag is false, the processing proceeds to step S623.

In step S623, the bitstream constraint checking unit 612 notifies of a warning message indicating that the bitstream constraint related to the intra-only constraint flag is not satisfied.

Figure 24:
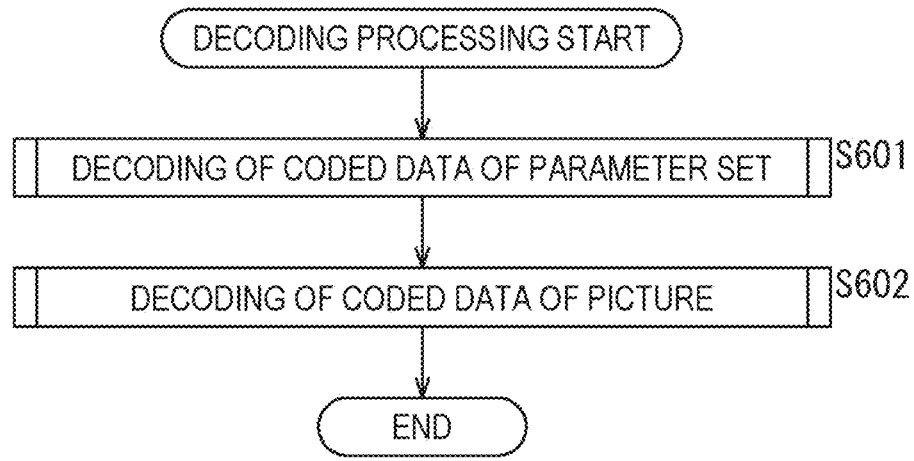
FIG. 24 is a flowchart for explaining an example of a flow of decoding processing.
Figure 25:
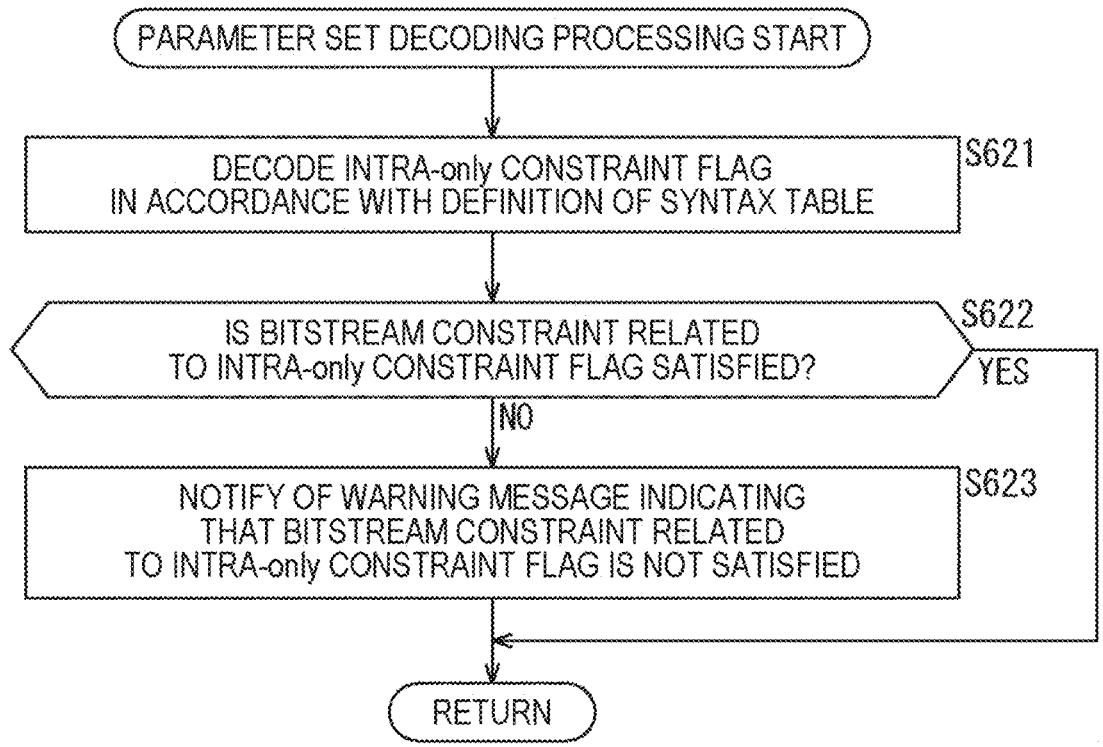
FIG. 25 is a flowchart illustrating an example of a flow of parameter set decoding processing.

When the processing in step S623 ends, the parameter set decoding processing ends, and the processing returns to FIG. 24. Furthermore, in a case where it is determined in step S622 that the intra-only constraint flag is true, the parameter set decoding processing ends, and the processing returns to FIG. 24.

<Flow of Picture Decoding Processing>

Figure 26:
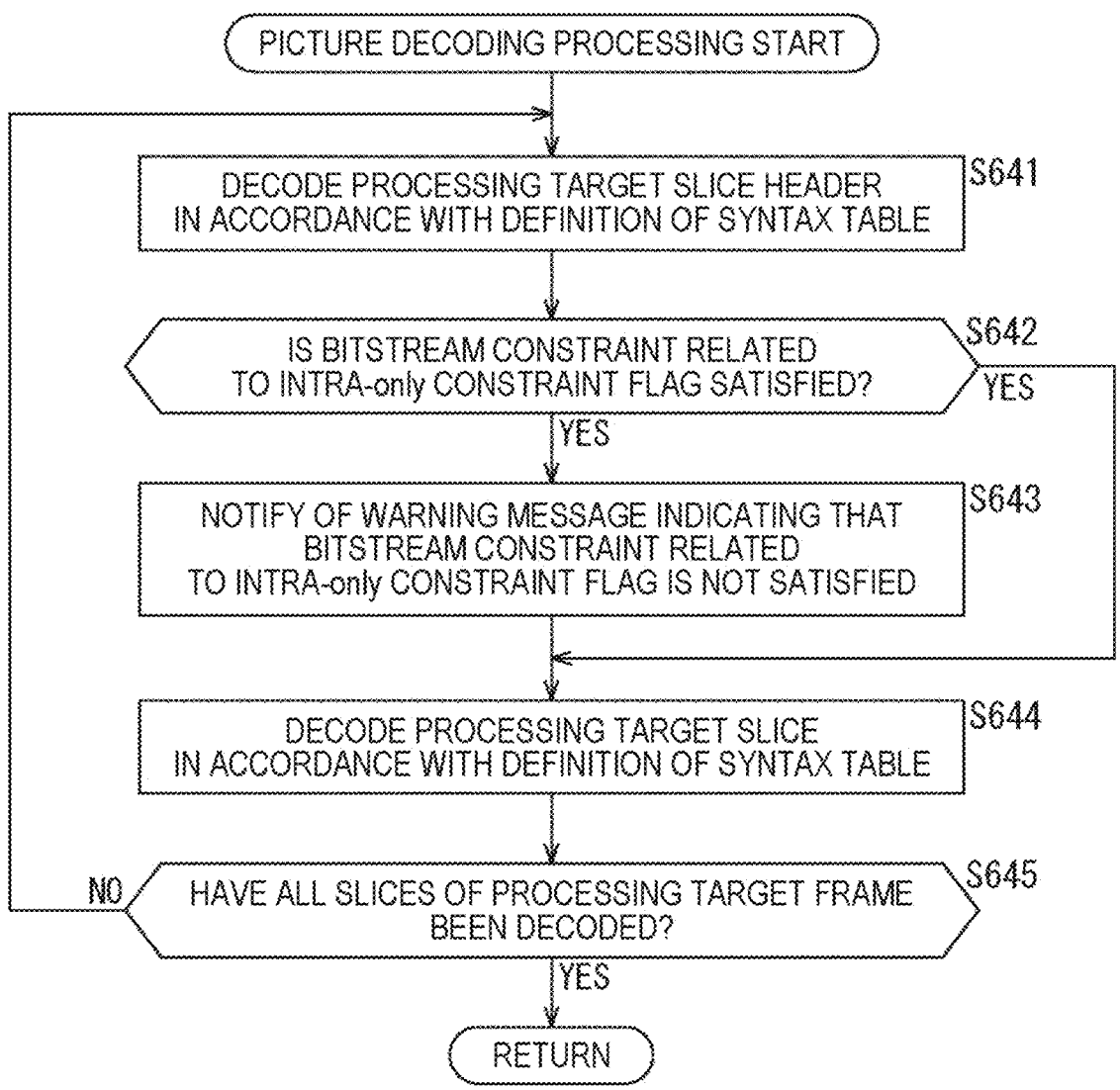
FIG. 26 is a flowchart illustrating an example of a flow of picture decoding processing.

Next, an example of a flow of the picture decoding processing executed in step S602 in FIG. 24 will be described with reference to a flowchart in FIG. 26.

When the picture encoding processing is started, in step S641, the slice header decoding unit 621 decodes a bitstream in accordance with a definition of a syntax table, to generate (restore) a slice header of a processing target slice.

In step S642, the bitstream constraint checking unit 622 applies Method 2, Method 2-1, Method 2-1-1, or Method 2-2 described above, or a combination thereof, and determines whether or not the bitstream satisfies a bitstream constraint related to the intra-only constraint flag. For example, in a case where a predetermined condition is satisfied, the bitstream constraint checking unit 622 may determine whether or not the slice type of all slices of the moving image is the I-slice in the bitstream. In a case where it is determined that the bitstream constraint is not satisfied, the processing proceeds to step S643.

In step S643, the bitstream constraint checking unit 612 notifies of a warning message indicating that the bitstream constraint related to the intra-only constraint flag is not satisfied. For example, the bitstream constraint checking unit 622 notifies of a warning message indicating that a predetermined condition is satisfied but the slice type of all slices of the moving image is not necessarily the I-slice in the bitstream.

When the processing of step S643 ends, the processing proceeds to step S644. Furthermore, in a case where it is determined in step S642 that the bitstream satisfies the bitstream constraint related to the intra-only constraint flag, the processing proceeds to step S644.

In step S644, the slice decoding unit 623 decodes the bitstream in accordance with a definition of a syntax table, to generate (restore) a processing target slice.

In step S645, the picture decoding unit 602 determines whether or not all slices of the processing target frame have been decoded. In a case where it is determined that there is an unprocessed slice, a new processing target slice is selected from the unprocessed slices, and the processing returns to step S641. That is, individual processing of steps S641 to S645 is executed for each slice of the processing target frame.

Then, in a case where it is determined in step S644 that all slices of the processing target frame have been decoded, the picture decoding processing ends, and the processing returns to FIG. 24.

By executing individual processing in this manner, for example, in a case where the profile of the bitstream is an intra profile, the decoding device 600 can check whether all the intra-only constraint flags are true. That is, the decoding device 600 can make a specification of the bitstream to be decoded to correspond to the profile more reliably.

5. Embodiment (Image Encoding Device/Image Decoding Device)

<Image Encoding Device>

Figure 27:
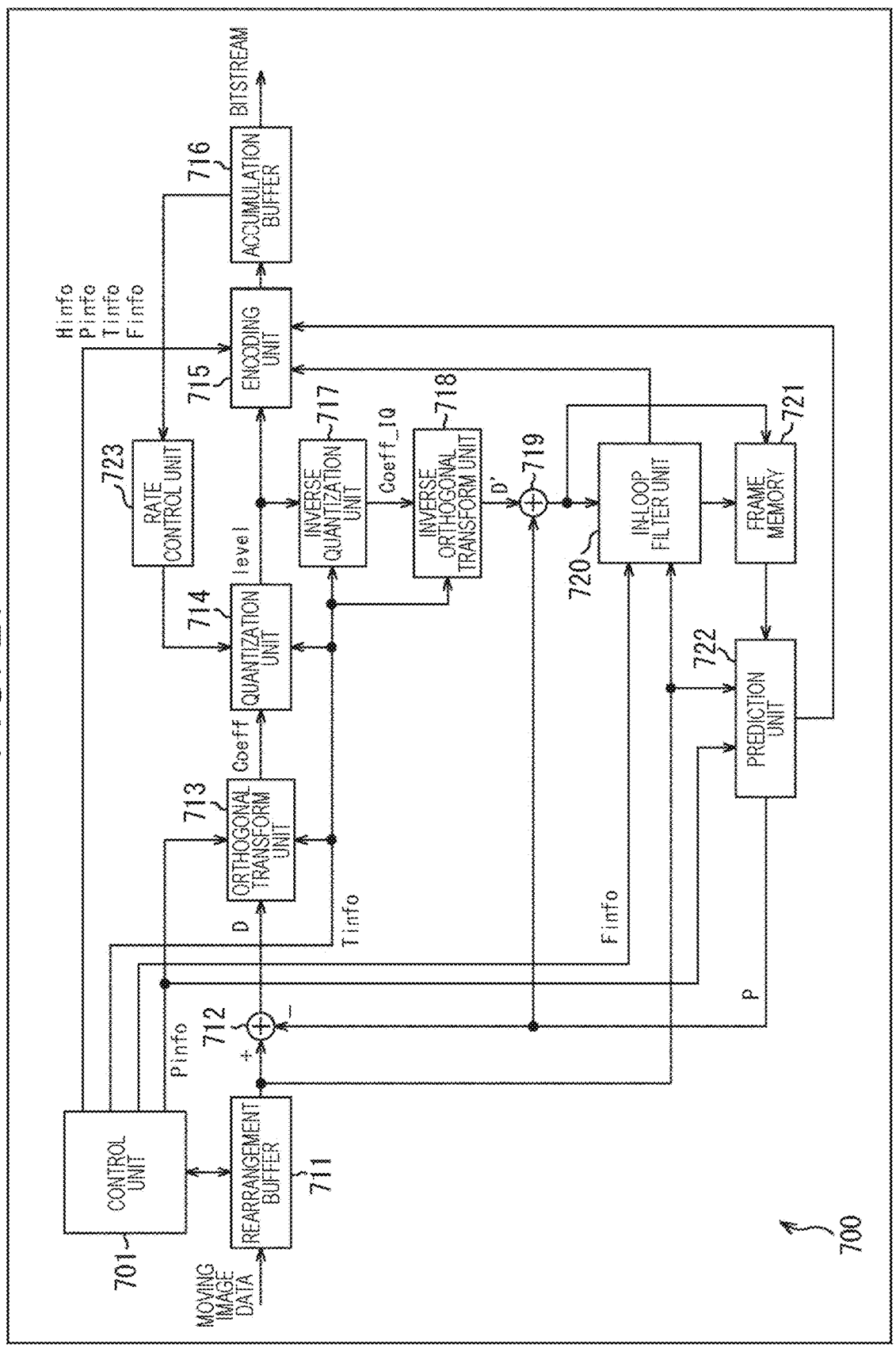
FIG. 27 is a block diagram illustrating a main configuration example of an image encoding device.

The present technology described above can be applied to any configuration. For example, the present technology can be applied to an image encoding device. FIG. 27 is a block diagram illustrating an example of a configuration of an image encoding device that is an aspect of an image processing apparatus to which the present technology is applied. An image encoding device 700 illustrated in FIG. 27 is a device that encodes image data of a moving image. For example, the image encoding device 700 can encode the image data of the moving image by an encoding scheme disclosed in any one of above-mentioned Non-Patent Documents.

Note that, in FIG. 27, main processing units (blocks), data flows and the like are illustrated, and those illustrated in FIG. 27 are not necessarily all. That is, the image encoding device 700 may include a processing unit not illustrated as a block in FIG. 27. Furthermore, the image encoding device 700 may have processing or a data flow that is not illustrated as an arrow or the like in FIG. 27.

As illustrated in FIG. 27, the image encoding device 700 includes a control unit 701, a rearrangement buffer 711, a calculation unit 712, an orthogonal transform unit 713, a quantization unit 714, an encoding unit 715, an accumulation buffer 716, an inverse quantization unit 717, an inverse orthogonal transform unit 718, a calculation unit 719, an in-loop filter unit 720, a frame memory 721, a prediction unit 722, and a rate control unit 723.

<Control Unit>

The control unit 701 divides moving image data held by the rearrangement buffer 711 into blocks (CU, PU, transform block and the like) serving as units of processing on the basis of an external block size or a block size in a unit of processing designated in advance. Furthermore, the control unit 701 determines encoding parameters (header information Hinfo, prediction mode information Pinfo, transform information Tinfo, filter information Finfo, and the like) to be supplied to each block on the basis of, for example, rate-distortion optimization (RDO).

Details of these encoding parameters will be described later. When determining the encoding parameters as described above, the control unit 701 supplies them to each block. Specifically, details are as follows.

The header information Hinfo is supplied to each of the blocks. The prediction mode information Pinfo is supplied to the encoding unit 715 and the prediction unit 722. The transform information Tinfo is supplied to the encoding unit 715, the orthogonal transform unit 713, the quantization unit 714, the inverse quantization unit 717, and the inverse orthogonal transform unit 718. The filter information Finfo is supplied to the in-loop filter unit 720.

<Rearrangement Buffer>

Each field (input image) of moving image data is input to the image encoding device 700 in order of reproduction (order of display) thereof. The rearrangement buffer 711 acquires and holds (stores) each of the input images in order of reproduction (order of display) thereof. The rearrangement buffer 711 rearranges the input images in order of encoding (order of decoding) or divides the input images into blocks in units of processing on the basis of control by the control unit 701. The rearrangement buffer 711 supplies each of the processed input images to the calculation unit 712. Furthermore, the rearrangement buffer 711 also supplies each of the input images (original images) to the prediction unit 722 and the in-loop filter unit 720.

<Calculation Unit>

The calculation unit 712 uses an image I corresponding to the block serving as the unit of processing and a predicted image P supplied from the prediction unit 722 as inputs, subtracts the predicted image P from the image I as represented in the following expression to derive a prediction residual D, and supplies the same to the orthogonal transform unit 713.

$$D = I - P$$

<Orthogonal Transform Unit>

The orthogonal transform unit 713 uses the prediction residual D supplied from the calculation unit 712 and the transform information Tinfo supplied from the control unit 701 as inputs, and performs orthogonal transform on the prediction residual D on the basis of the transform information Tinfo to derive a transform coefficient Coeff. For example, the orthogonal transform unit 713 performs primary transform for the prediction residual D to generate a primary transform coefficient, and performs secondary transform for the primary transform coefficient on the basis of the ST identifier to generate a secondary transform coefficient. The orthogonal transform unit 713 supplies the obtained secondary transform coefficient to the quantization unit 714 as the transform coefficient Coeff. Note that the orthogonal transform unit 713 is not limited to the orthogonal transform, and can perform arbitrary coefficient transform. That is, the transform coefficient Coeff may be derived by performing arbitrary coefficient transform on the prediction residual D. Therefore, the orthogonal transform unit 713 can also be referred to as a coefficient transform unit.

<Quantization Unit>

The quantization unit 714 uses the transform coefficient Coeff supplied from the orthogonal transform unit 713 and the transform information Tinfo supplied from the control unit 701 as inputs, and scales (quantizes) the transform coefficient Coeff on the basis of the transform information Tinfo. Note that the quantization rate is controlled by the rate control unit 723. The quantization unit 714 supplies the quantization coefficient qcoeff, which is the level value of the transform coefficient quantized in this way, to the encoding unit 715 and the inverse quantization unit 717.

<Encoding Unit>

The encoding unit 715 uses the quantization coefficient qcoeff supplied from the quantization unit 714, various encoding parameters (the header information Hinfo, the prediction mode information Pinfo, the transform information Tinfo, the filter information Finfo, and the like) supplied from the control unit 701, information regarding a filter such as a filter coefficient supplied from the in-loop filter unit 720, and information regarding an optimum prediction mode supplied from the prediction unit 722 as inputs. The encoding unit 715 performs variable-length encoding (for example, arithmetic encoding) on quantization coefficient qcoeff to generate a bit string (coded data).

Moreover, the encoding unit 715 includes the information regarding the filter supplied from the in-loop filter unit 720 in the filter information Finfo, and includes the information regarding the optimum prediction mode supplied from the prediction unit 722 in the prediction mode information Pinfo. Then, the encoding unit 715 encodes the above-described various encoding parameters (the header information Hinfo, the prediction mode information Pinfo, the transform information Tinfo, the filter information Finfo and the like), to generate a bit string.

Furthermore, the encoding unit 715 multiplexes the bit strings (coded data) of various types of information generated as described above to generate a bitstream of coded data. The encoding unit 715 supplies the bitstream to the accumulation buffer 716.

<Accumulation Buffer>

The accumulation buffer 716 temporarily holds a bitstream of coded data obtained in the encoding unit 715. The accumulation buffer 716 outputs a bitstream of the held coded data to the outside of the image encoding device 700 at a predetermined timing. For example, the bitstream is transmitted to the decoding side via an arbitrary recording medium, an arbitrary transmission medium, an arbitrary information processing device, or the like. That is, the accumulation buffer 716 also serves as a transmission unit that transmits the coded data (bitstream).

<Inverse Quantization Unit>

The inverse quantization unit 717 performs processing related to inverse quantization. For example, the inverse quantization unit 717 uses the quantization coefficient qcoeff supplied from the quantization unit 714 and the transform information Tinfo supplied from the control unit 701 as inputs, and scales (inversely quantizes) the value of the quantization coefficient qcoeff on the basis of the transform information Tinfo. Note that this inverse quantization is inverse processing of the quantization performed in the quantization unit 714. The inverse quantization unit 717 supplies a transform coefficient Coeff_IQ obtained by such inverse quantization to the inverse orthogonal transform unit 718.

<Inverse Orthogonal Transform Unit>

The inverse orthogonal transform unit 718 performs processing related to inverse orthogonal transform. For example, the inverse orthogonal transform unit 718 uses the transform coefficient Coeff_IQ supplied from the inverse quantization unit 717 and the transform information Tinfo supplied from the control unit 701 as inputs, and performs inverse orthogonal transform on the transform coefficient Coeff_IQ on the basis of the transform information Tinfo to derive a prediction residual D'. This inverse orthogonal transform is inverse processing of the orthogonal transform performed by the orthogonal transform unit 713. The inverse orthogonal transform unit 718 supplies the prediction residual D' obtained by such inverse orthogonal transform to the calculation unit 719.

In other words, the inverse orthogonal transform unit 718 executes an inverse process of the process executed by the orthogonal transform unit 713. That is, similarly to the case of the orthogonal transform unit 713, the inverse orthogonal transform unit 718 is not limited to the inverse orthogonal transform and can perform arbitrary inverse coefficient transform. This inverse coefficient transform is inverse processing of the coefficient transform executed by the orthogonal transform unit 713. That is, the prediction residual D' may be derived by performing arbitrary inverse coefficient transform on the transform coefficient Coeff_IQ. Therefore, the inverse orthogonal transform unit 718 can also be referred to as an inverse coefficient transform unit.

<Calculation Unit>

The calculation unit 719 uses the prediction residual D' supplied from the inverse orthogonal transform unit 718 and the predicted image P supplied from the prediction unit 722 as inputs. The calculation unit 719 adds the prediction residual D' and the predicted image P corresponding to the prediction residual D', and derives a locally decoded image Rlocal. The calculation unit 719 supplies the derived locally decoded image Rlocal to the in-loop filter unit 720 and the frame memory 721.

<In-Loop Filter Unit>

The in-loop filter unit 720 performs processing related to in-loop filter processing. For example, the in-loop filter unit 720 uses the locally decoded image Rlocal supplied from the calculation unit 719, the filter information Finfo supplied from the control unit 701, and the input image (original image) supplied from the rearrangement buffer 711 as inputs. Note that, the information input to the in-loop filter unit 720 is any information, and information other than these pieces of information may be input. For example, information such as a prediction mode, motion information, an encode amount target value, a quantization parameter QP, a picture type, a block (CU, CTU and the like) and the like may be input to the in-loop filter unit 720 as necessary.

The in-loop filter unit 720 appropriately performs filter processing on the locally decoded image Rlocal on the basis of the filter information Finfo. The in-loop filter unit 720 also uses the input image (original image) or other input information for the filter processing as necessary.

For example, the in-loop filter unit 720 applies four in-loop filters of a bilateral filter, a deblocking filter (DBF), a sample adaptive offset (SAO), and an adaptive loop filter (ALF) in this order. Note that, any filter may be applied in any order, and it is possible to appropriately select.

Of course, the filter processing performed by the in-loop filter unit 720 is arbitrary and is not limited to the above example. For example, the in-loop filter unit 720 may apply a Wiener filter and the like.

The in-loop filter unit 720 supplies the locally decoded image Rlocal subjected to the filter processing to the frame memory 721. Note that, for example, in a case where information regarding the filter such as the filter coefficient is transmitted to the decoding side, the in-loop filter unit 720 supplies the information regarding the filter to the encoding unit 715.

<Frame Memory>

The frame memory 721 performs processing related to storage of data related to an image. For example, the frame memory 721 uses the locally decoded image Rlocal supplied from the calculation unit 719 or the locally decoded image Rlocal subjected to the filter processing supplied from the in-loop filter unit 720 as inputs, and holds (stores) them. Furthermore, the frame memory 721 reconstructs a decoded image R in each picture unit using the locally decoded image Rlocal to hold (store in a buffer in the frame memory 721). The frame memory 721 supplies the decoded image R (or a part thereof) to the prediction unit 722 in response to a request from the prediction unit 722.

<Prediction Unit>

The prediction unit 722 performs processing related to generation of a predicted image. For example, the prediction unit 722 uses the prediction mode information Pinfo supplied from the control unit 701, the input image (original image) supplied from the rearrangement buffer 711, and the decoded image R (or a part thereof) read from the frame memory 721 as inputs. The prediction unit 722 performs prediction processing such as inter prediction or intra prediction using the prediction mode information Pinfo and the input image (original image), performs prediction with reference to the decoded image R as a reference image, performs motion compensation processing on the basis of the prediction result, and generates the predicted image P. The prediction unit 722 supplies the generated predicted image P to the calculation unit 712 and the calculation unit 719. Furthermore, the prediction unit 722 supplies information regarding the prediction mode selected by the above-described processing, that is, the optimum prediction mode, to the encoding unit 715 as necessary.

<Rate Control Unit>

The rate control unit 723 performs processing related to rate control. For example, the rate control unit 723 controls the rate of the quantization operation of the quantization unit 714 so that overflow or underflow does not occur on the basis of the encode amount of the coded data accumulated in the accumulation buffer 716.

Note that these processing units (the control unit 701, the rearrangement buffer 711 to the rate control unit 723) have an arbitrary configuration. For example, each of the processing units may include a logic circuit that achieves the above-described processing. Furthermore, each of the processing units may include, for example, a CPU, a ROM, a RAM, and the like, and execute a program by using the CPU, the ROM, the RAM, and the like to achieve the above-described processing. Needless to say, individual processing unit may have both the configurations, and a part of the above-described processing may be achieved by a logic circuit and another may be achieved by executing the program. The configurations of the processing units may be independent from each other, and, for example, among the processing units, some processing units may achieve a part of the above-described processing with a logic circuit, some other processing units may achieve the above-described processing by executing a program, and still some other processing units may achieve the above-described processing with both a logic circuit and execution of a program.

In the image encoding device 700 having the above-described configuration, the above-described present technology may be applied to the encoding unit 715. For example, the encoding unit 715 may apply Method 1, Method 1-1, Method 1-2, Method 1-3, Method 2, Method 2-1, Method 2-1-1, Method 2-2, or a combination thereof. That is, the encoding unit 715 may have the configuration of the encoding device 100 (FIG. 5 or 9) or the encoding device 500 (FIG. 19).

By doing in this way, the image encoding device 700 can obtain an effect similar to the effect obtained by each encoding device in a case of applying each method described in <3. Constraint on picture type> and <4. Constraint on slice type>. For example, the image encoding device 700 can make a specification of a bitstream to correspond to a profile more reliably.

<Flow of Image Encoding Processing>

Figure 28:
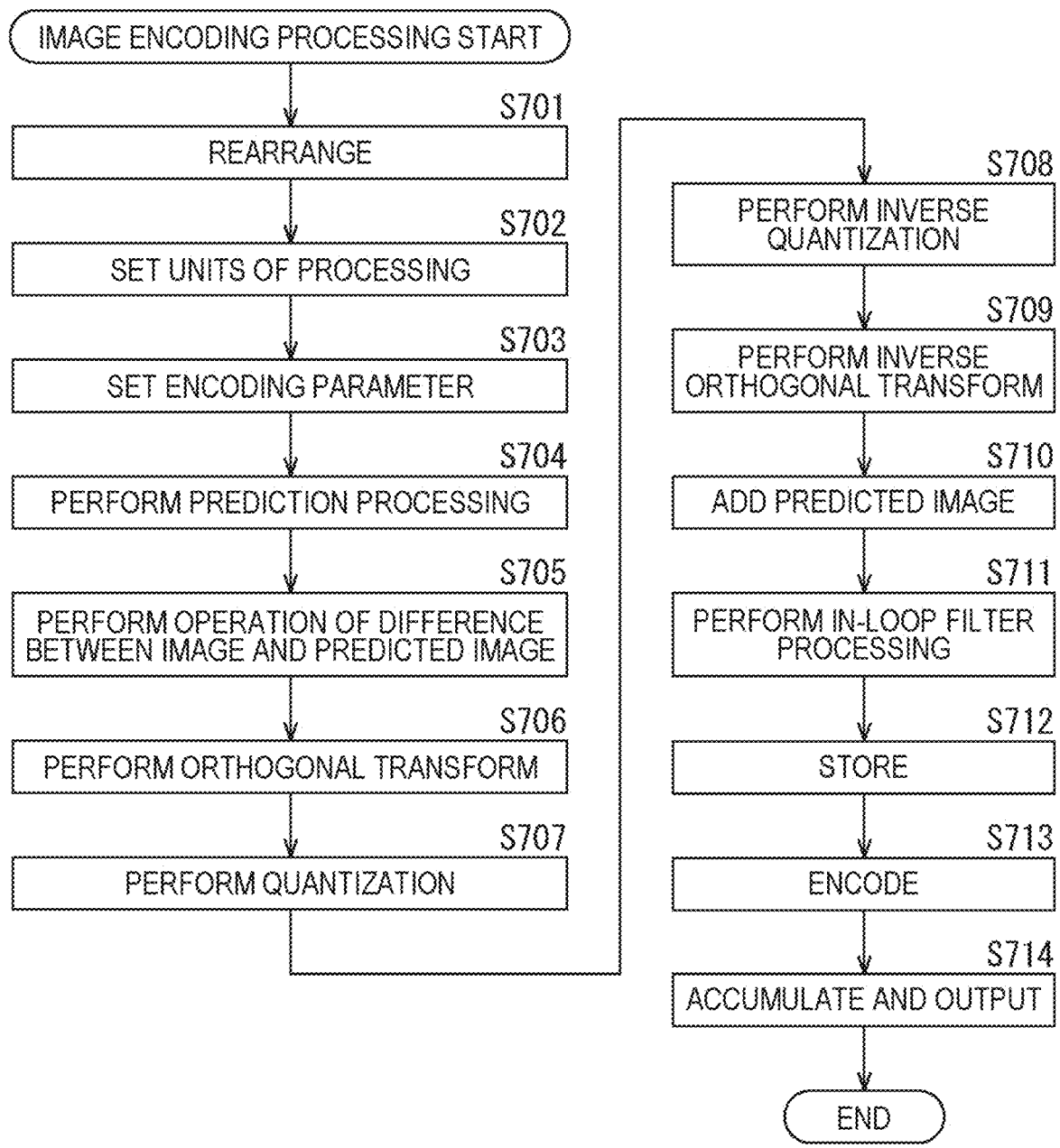
FIG. 28 is a flowchart illustrating an example of a flow of image encoding processing.

Next, an example of a flow of image encoding processing executed by the image encoding device 700 having the above-described configuration will be described with reference to a flowchart in FIG. 28.

When the image encoding processing is started, at step S701, the rearrangement buffer 711 is controlled by the control unit 701 to rearrange an order of frames of input moving image data from the order of display to the order of encoding.

In step S702, the control unit 701 sets units of processing (performs block partition) for the input images held by the rearrangement buffer 711.

At step S703, the control unit 701 determines (sets) an encoding parameter for the input image held by the rearrangement buffer 711.

In step S704, the prediction unit 722 performs prediction processing and generates a predicted image or the like in an optimum prediction mode. For example, in the prediction processing, the prediction unit 722 performs intra prediction to generate a predicted image or the like in an optimum intra-prediction mode, performs inter prediction to generate a predicted image or the like in an optimum inter prediction mode, and selects an optimum prediction mode from the predicted images on the basis of a cost function value or the like.

At step S705, the calculation unit 712 performs operation of a difference between the input image and the predicted image in the optimum mode selected by the prediction processing at step S704. That is, the calculation unit 712 generates the prediction residual D between the input image and the predicted image. The prediction residual D obtained in this manner has a reduced data amount as compared with the original image data. Therefore, the data amount can be compressed as compared with a case where the image is encoded as it is.

In step S706, the orthogonal transform unit 713 performs orthogonal transform processing on the prediction residual D generated by the processing in step S705 to derive the transform coefficient Coeff.

In step S707, the quantization unit 714 quantizes the transform coefficient Coeff obtained by the processing in step S706 by using the quantization parameter calculated by the control unit 701 or the like, and derives the quantization coefficient qcoeff.

In step S708, the inverse quantization unit 717 inversely quantizes the quantization coefficient qcoeff generated by the processing in step S707 with a characteristic corresponding to the quantization characteristic in step S707 to derive the transform coefficient Coeff_IQ.

At step S709, the inverse orthogonal transform unit 718 performs inverse orthogonal transform on the transform coefficient Coeff_IQ obtained by the processing at step S708 by a method corresponding to the orthogonal transform processing at step S706, and derives the prediction residual D'.

At step S710, the calculation unit 719 adds the predicted image obtained by the prediction processing at step S704 to the prediction residual D' derived by the processing at step S709, thereby generating a decoded image that is locally decoded.

In step S711, the in-loop filter unit 720 performs the in-loop filter processing on the locally decoded image derived by the processing in step S710.

At step S712, the frame memory 721 stores the locally decoded decoded image derived by the processing at step S710 and the locally decoded decoded image subjected to the filter processing at step S711.

In step S713, the encoding unit 715 executes encoding processing, to encode the quantization coefficient qcoeff, various encoding parameters, and the like obtained by the processing in step S707 and generate a bitstream of coded data.

In step S714, the accumulation buffer 716 accumulates the bitstream obtained in step S713 and outputs the bitstream to the outside of the image encoding device 700. This bitstream is transmitted to the decoding side via a transmission path or a recording medium, for example. Furthermore, the rate control unit 723 performs rate control as necessary.

When the processing of step S714 ends, the image encoding processing ends.

The above-described present technology may be applied to the encoding processing executed in step S713 of such image encoding processing. For example, in this processing, Method 1, Method 1-1, Method 1-2, Method 1-3, Method 2, Method 2-1, Method 2-1-1, Method 2-2, or a combination thereof may be applied.

Figure 6:
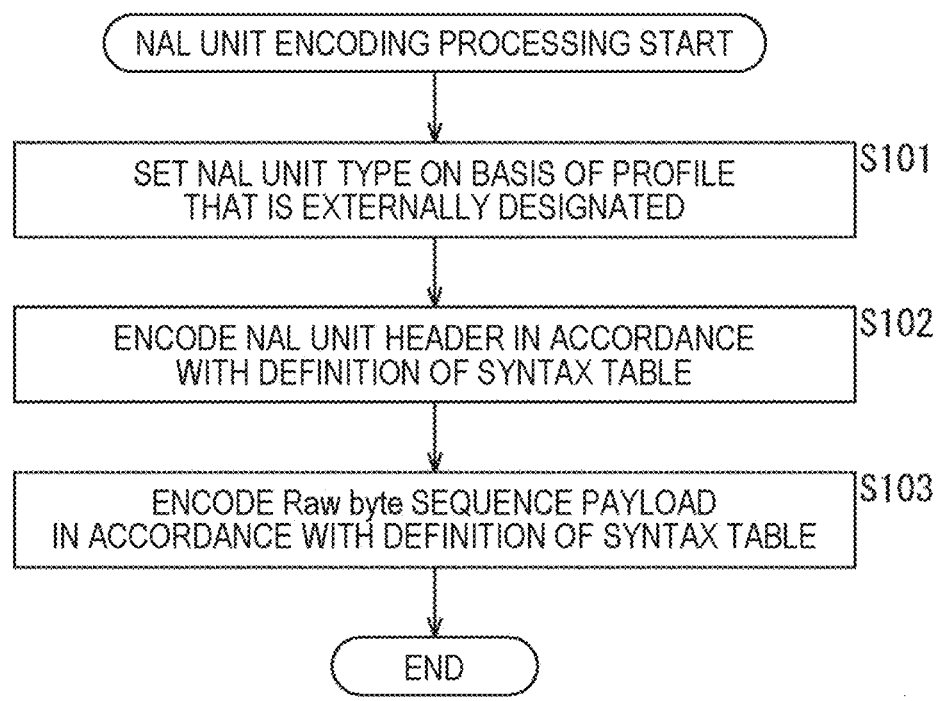
FIG. 6 is a flowchart illustrating an example of a flow of NAL unit encoding processing.

For example, the NAL unit encoding processing in FIG. 6, the encoding processing in FIG. 10, or the encoding processing in FIG. 20 may be executed in the encoding processing described above (step S713).

By doing in this way, the image encoding device 700 can obtain an effect similar to the effect obtained by each encoding device in a case of applying each method described in <3. Constraint on picture type> and <4. Constraint on slice type>. For example, the image encoding device 700 can make a specification of a bitstream to correspond to a profile more reliably.

<Image Decoding Device>

Figure 29:
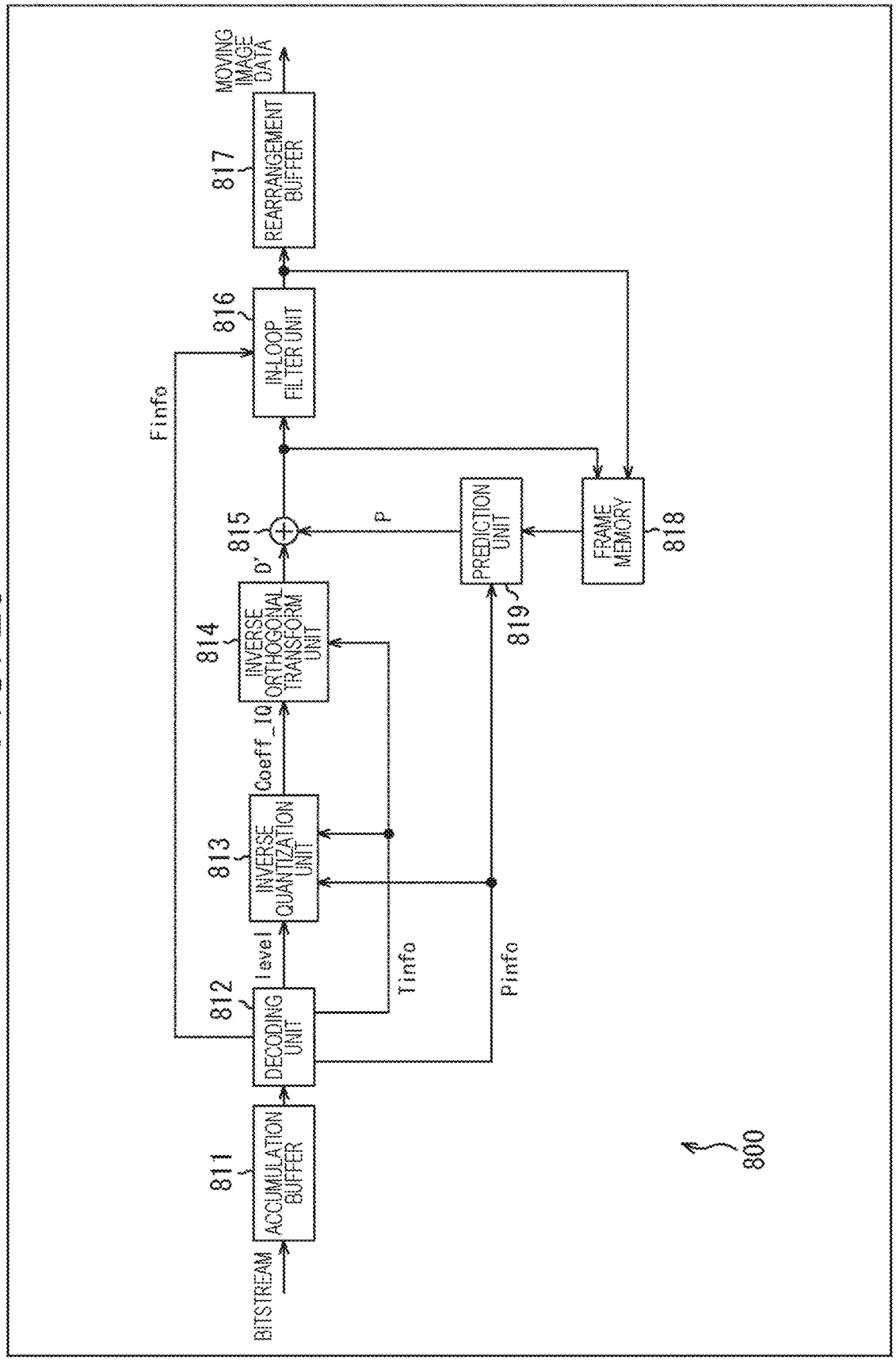
FIG. 29 is a block diagram illustrating a main configuration example of an image decoding device.

The present technology described above can be applied to any configuration. For example, the present technology can be applied to an image decoding device. FIG. 29 is a block diagram illustrating an example of a configuration of an image decoding device which is an aspect of an image processing apparatus to which the present technology is applied. An image decoding device 800 illustrated in FIG. 29 is a device that generates moving image data by decoding coded data (bitstream) of a moving image. For example, the image decoding device 800 can decode the coded data by the decoding method described in any one of the above Non-Patent Documents.

Note that, in FIG. 29, main processing units (blocks), data flows and the like are illustrated, and those illustrated in FIG. 29 are not necessarily all. That is, the image decoding device 800 may include a processing unit not illustrated as a block in FIG. 29. Furthermore, the image decoding device 800 may have a process or a data flow that is not illustrated as an arrow or the like in FIG. 29.

As illustrated in FIG. 29, the image decoding device 800 includes an accumulation buffer 811, a decoding unit 812, an inverse quantization unit 813, an inverse orthogonal transform unit 814, a calculation unit 815, an in-loop filter unit 816, a rearrangement buffer 817, a frame memory 818, and a prediction unit 819. Note that the prediction unit 819 includes an intra prediction unit, an inter prediction unit, and the like (not illustrated).

<Accumulation Buffer>

The accumulation buffer 811 acquires and holds (stores) a bitstream input to the image decoding device 800. The accumulation buffer 811 supplies the accumulated bitstream to the decoding unit 812 at a predetermined timing or in a case where a predetermined condition is satisfied.

<Decoding Unit>

The decoding unit 812 performs processing related to image decoding. For example, the decoding unit 812 uses the bitstream supplied from the accumulation buffer 811 as an input, performs variable-length decoding on the syntax value of each syntax element from the bit string according to a definition of a syntax table, and derives a parameter.

The syntax element and the parameter derived from the syntax value of the syntax element include, for example, the header information Hinfo, the prediction mode information Pinfo, the transform information Tinfo, the filter information Finfo, and the like. That is, the decoding unit 812 parses (analyzes and acquires) these pieces of information from a bitstream. These pieces of information will be described below.

<Header Information Hinfo>

The header information Hinfo includes, for example, header information such as video parameter set (VPS)/ sequence parameter set (SPS)/picture parameter set (PPS)/ slice header (SH). The header information Hinfo includes, for example, information defining an image size (width PicWidth, height PicHeight), a bit depth (luminance bitDepthY, color difference bitDepthC), a chroma array type ChromaArrayType, a maximum value MaxCUSize/minimum value MinCUSize of CU size, a maximum depth MaxQTDepth/a minimum depth MinQTDepth of quadtree partitioning (also referred to as Quad-tree partitioning), a maximum depth MaxBTDepth/minimum depth MinBTDepth of binary tree partitioning (Binary-tree partitioning), a maximum value MaxTSSize of a transform skip block (also referred to as a maximum transform skip block size), an on/off flag (also referred to as an enabled flag) of each encoding tool, and the like.

For example, as the on-off flag of the encoding tool included in the header information Hinfo, there is an on-off flag related to the following transform and quantization processing. Note that the on-off flag of the encoding tool can also be interpreted as a flag indicating whether or not syntax related to the encoding tool exists in the coded data. Furthermore, in a case where the value of the on-off flag is 1 (true), it is indicated that the encoding tool can be used, and in a case where the value of the on-off flag is 0 (false), it is indicated that the encoding tool cannot be used. Note that the interpretation of the flag value may be reversed.

An inter-component prediction enabled flag (ccp_enabled_flag): is flag information indicating whether or not inter-component prediction (cross-component prediction (CCP), also referred to as CC prediction) can be used. For example, in a case where the flag information is "1" (true), it is indicated that the flag information can be used, and in a case where the flag information is "0" (false), it is indicated that the flag information cannot be used.

Note that the CCP is also referred to as cross-component linear prediction (CCLM or CCLMP).

<Prediction Mode Information Pinfo>

The prediction mode information Pinfo includes, for example, information such as size information PBSize (predicted block size) of a processing target PB (predicted block), intra-prediction mode information IPinfo, and motion prediction information MVinfo.

The intra-prediction mode information IPinfo includes, for example, prev_intra_luma_pred_flag, mpm_idx, rem_intra_pred_mode, a luminance intra-prediction mode IntraPredModeY derived from syntax thereof, or the like.

Furthermore, the intra-prediction mode information IPinfo includes, for example, a cross-component prediction flag (ccp_flag(cclmp_flag)), a multi-class linear prediction mode flag (mclm_flag), a chroma sample position type identifier (chroma_sample_loc_type_idx), a chroma MPM identifier (chroma_mpm_idx), a luminance intra-prediction mode (IntraPredModeC) derived from these syntaxes, or the like.

The inter-component prediction flag (ccp_flag (cclmp_flag)) is flag information indicating whether or not to apply the inter-component linear prediction. For example, when ccp_flag==1, it is indicated that the inter-component prediction is applied, and when ccp_flag==0, it is indicated that the inter-component prediction is not applied.

The multi-class linear prediction mode flag (mclm_flag) is information regarding a mode of linear prediction (linear prediction mode information). More specifically, the multi-class linear prediction mode flag (mclm_flag) is flag information indicating whether or not to set the multi-class linear prediction mode. For example, in a case of "0", a one-class mode (single-class mode) (for example, CCLMP) is indicated, and in a case of "1", a two-class mode (multi-class mode) (for example, MCLMP) is indicated.

The chrominance sample position type identifier (chroma_sample_loc_type_idx) is an identifier that identifies a type (also referred to as a chrominance sample position type) of a pixel position of the chrominance component. For example, in a case where the chrominance array type (ChromaArrayType), which is information regarding a color format, indicates 420 format, the chrominance sample position type identifier is assigned as in the following expression.

chroma_sample_loc_type_idx==0: Type2
 chroma_sample_loc_type_idx==1: Type3
 chroma_sample_loc_type_idx==2: Type0
 chroma_sample_loc_type_idx==3: Type1

Note that the chroma sample position type identifier (chroma_sample_loc_type_idx) is transmitted as (stored in) information regarding a pixel position of a chroma component (chroma_sample_loc_info( )).

The chroma MPM identifier (chroma_mpm_idx) is an identifier indicating which prediction mode candidate in a chroma intra-prediction mode candidate list (intraPredModeCandListC) is designated as a chroma intra-prediction mode.

The motion prediction information MVinfo includes, for example, information such as merge_idx, merge_flag, inter_pred_idc, ref_idx_LX, mvp_lX_flag, X={0, 1}, mvd, and the like.

Needless to say, information to be included in the prediction mode information Pinfo is arbitrary, and information other than these pieces of information may be included.

<Transform Information Tinfo>

The transform information Tinfo includes, for example, the following information. Of course, the information included in the transform information Tinfo is arbitrary, and information other than these pieces of information may be included.

Lateral width size (TBWSize) and vertical width size (TBHSize) of transform block as a processing target.
 Transform skip flag (transform_skip_flag (also referred to as ts_flag))
 Scan identifier (scanIdx)
 Quantization parameter (qp)
 Quantization matrix (scaling matrix (for example, JCTVC-W1005, 7.3.4 Scaling list data syntax))

Note that log 2TBWSize and log 2TBHSize may be included in the transform information Tinfo instead of TBWSize and TBHSize. log 2TBWSize is a logarithmic value of TBWSize with base 2. log 2TBHSize is the logarithmic value of TBHSize with base 2. Furthermore, in the image decoding device 800, the transform skip flag is a flag indicating whether or not inverse coefficient transform (inverse primary transform and inverse secondary transform) is skipped.

<Filter Information Finfo>

The filter information Finfo includes, for example, control information related to each filter process described below.

Control information regarding the deblocking filter (DBF)
 Control information regarding pixel adaptive offset (SAO)
 Control Information regarding adaptive loop filter (ALF)
 Control information on other linear and nonlinear filters More specifically, for example, information for specifying a picture to which each filter is applied and a region in the picture, filter on/off control information in units of CUs, filter on/off control information regarding a boundary of slices or tiles, or the like is included. Of course, the information included in the filter information Finfo is arbitrary, and information other than these pieces of information may be included.

The description returns to the description of the decoding unit 812. The decoding unit 812 derives the quantization coefficient qcoeff with reference to syntax related to the quantization coefficient qcoeff obtained by decoding the bitstream. The decoding unit 812 supplies the quantization coefficient qcoeff to the inverse quantization unit 813.

Furthermore, the decoding unit 812 supplies encoding parameters such as the parsed header information Hinfo, prediction mode information Pinfo, transform information Tinfo, filter information Finfo, and the like to each block. For example, the decoding unit 812 supplies the header information Hinfo to the inverse quantization unit 813, the inverse orthogonal transform unit 814, the prediction unit 819, and the in-loop filter unit 816. Furthermore, the decoding unit 812 supplies the prediction mode information Pinfo to the inverse quantization unit 813 and the prediction unit 819. Furthermore, the decoding unit 812 supplies the transform information Tinfo to the inverse quantization unit 813 and the inverse orthogonal transform unit 814. Furthermore, the decoding unit 812 supplies the filter information Finfo to the in-loop filter unit 816.

Of course, the above example is one example, and the present technology is not limited to this example. For example, each encoding parameter may be supplied to an arbitrary processing unit. Furthermore, other information may be supplied to an arbitrary processing unit.

<Inverse Quantization Unit>

The inverse quantization unit 813 has at least a configuration necessary for performing processing related to inverse quantization. For example, the inverse quantization unit 813 uses the transform information Tinfo and the quantization coefficient qcoeff supplied from the decoding unit 812 as inputs, scales (inversely quantizes) the value of the quantization coefficient qcoeff on the basis of the transform information Tinfo, and derives the transform coefficient Coeff_IQ after inverse quantization. The inverse quantization unit 813 supplies the derived transform coefficient Coeff_IQ to the inverse orthogonal transform unit 814.

Note that this inverse quantization is performed as inverse processing of the quantization by the quantization unit 714 of the image encoding device 700. Furthermore, this inverse quantization is processing similar to the inverse quantization by the inverse quantization unit 717 of the image encoding device 700. That is, the inverse quantization unit 717 of the image encoding device 700 performs processing (inverse quantization) similar to the inverse quantization unit 813.

<Inverse Orthogonal Transform Unit>

The inverse orthogonal transform unit 814 performs processing related to inverse orthogonal transform. For example, the inverse orthogonal transform unit 814 uses the transform coefficient Coeff_IQ supplied from the inverse quantization unit 813 and the transform information Tinfo supplied from the decoding unit 812 as inputs, and performs inverse orthogonal transform processing on the transform coefficient Coeff_IQ on the basis of the transform information Tinfo to derive the prediction residual D'. For example, the inverse orthogonal transform unit 814 performs inverse secondary transform for the transform coefficient Coeff_IQ on the basis of the ST identifier to generate a primary transform coefficient, and performs primary transform for the primary transform coefficient to generate the prediction residual D'. The inverse orthogonal transform unit 814 supplies the derived prediction residual D' to the calculation unit 815.

Note that this inverse orthogonal transform is performed as inverse processing of the orthogonal transform by the orthogonal transform unit 713 of the image encoding device 700. Furthermore, this inverse orthogonal transform is processing similar to the inverse orthogonal transform by the inverse orthogonal transform unit 718 of the image encoding device 700. That is, the inverse orthogonal transform unit 718 of the image encoding device 700 performs processing (inverse orthogonal transform) similar to the inverse orthogonal transform unit 814.

Therefore, the inverse orthogonal transform unit 814 can perform any inverse coefficient transform without being limited to the inverse orthogonal transform, similarly to the inverse orthogonal transform unit 718 of the image encoding device 700. This inverse coefficient transform is inverse processing of the coefficient transform executed by the orthogonal transform unit 713 of the image encoding device 700. That is, the prediction residual D' may be derived by performing arbitrary inverse coefficient transform on the transform coefficient Coeff_IQ. Therefore, the inverse orthogonal transform unit 814 can also be referred to as an inverse coefficient transform unit.

<Calculation Unit>

The calculation unit 815 performs processing related to addition of information regarding an image. For example, the calculation unit 815 uses the prediction residual D' supplied from the inverse orthogonal transform unit 814 and the predicted image P supplied from the prediction unit 819 as inputs. The calculation unit 815 adds the prediction residual D' and the predicted image P (prediction signal) corresponding to the prediction residual D' to derive the locally decoded image Rlocal as expressed by the following formula. The calculation unit 815 supplies the derived locally decoded image Rlocal to the in-loop filter unit 816 and the frame memory 818.

$$Rlocal = D' + P$$

<In-Loop Filter Unit>

The in-loop filter unit 816 performs processing related to the in-loop filter processing. For example, the in-loop filter unit 816 uses the locally decoded image Rlocal supplied from the calculation unit 815 and the filter information Finfo supplied from the decoding unit 812 as inputs. Note that, the information input to the in-loop filter unit 816 is any information, and information other than these pieces of information may be input.

The in-loop filter unit 816 appropriately performs filter processing on the locally decoded image Rlocal on the basis of the filter information Finfo.

For example, the in-loop filter unit 816 applies four in-loop filters of a bilateral filter, a deblocking filter (DBF), a sample adaptive offset (SAO), and an adaptive loop filter (ALF) in this order. Note that, any filter may be applied in any order, and it is possible to appropriately select.

The in-loop filter unit 816 performs filtering processing corresponding to the filtering processing performed by the encoding side (for example, the in-loop filter unit 720 of the image encoding device 700). Of course, the filter processing performed by the in-loop filter unit 816 is arbitrary and is not limited to the above example. For example, the in-loop filter unit 816 may apply a Wiener filter and the like.

The in-loop filter unit 816 supplies the filtered locally decoded image Rlocal to the rearrangement buffer 817 and the frame memory 818.

<Rearrangement Buffer>

The rearrangement buffer 817 receives the locally decoded image Rlocal supplied from the in-loop filter unit 816 as an input and holds (stores) the locally decoded image Rlocal. The rearrangement buffer 817 reconstructs and holds (stores in the buffer) the decoded image R for each picture unit using the locally decoded image Rlocal. The rearrangement buffer 817 rearranges the obtained decoded image R from the decoding order to the reproduction order. The rearrangement buffer 817 outputs the rearranged decoded image R group to the outside of the image decoding device 800 as moving image data.

<Frame Memory>

The frame memory 818 performs processing related to storage of data related to an image. For example, the frame memory 818 uses the locally decoded image Rlocal supplied from the calculation unit 815 as an input, reconstructs the decoded image R for each picture unit, and stores the decoded image R in the buffer in the frame memory 818.

Furthermore, the frame memory 818 uses the locally decoded image Rlocal subjected to the in-loop filter processing supplied from the in-loop filter unit 816 as an input, reconstructs the decoded image R for each picture unit, and stores the decoded image R in the buffer in the frame memory 818. The frame memory 818 appropriately supplies the stored decoded image R (or a part thereof) to the prediction unit 819 as a reference image.

Note that the frame memory 818 may store the header information Hinfo, the prediction mode information Pinfo, the transform information Tinfo, the filter information Finfo, and the like related to generation of the decoded image.

<Prediction Unit>

The prediction unit 819 performs processing related to generation of a predicted image. For example, the prediction unit 819 uses the prediction mode information Pinfo supplied from the decoding unit 812 as an input, performs prediction by a prediction method designated by the prediction mode information Pinfo, and derives the predicted image P. At the time of derivation, the prediction unit 819 uses the decoded image R (or a part thereof) before filtering or after filtering stored in the frame memory 818, designated by the prediction mode information Pinfo, as a reference image. The prediction unit 819 supplies the derived predicted image P to the calculation unit 815.

Note that these processing units (the accumulation buffer 811 to the prediction unit 819) have an arbitrary configuration. For example, each of the processing units may include a logic circuit that achieves the above-described processing. Furthermore, each of the processing units may include, for example, a CPU, a ROM, a RAM, and the like, and execute a program by using the CPU, the ROM, the RAM, and the like to achieve the above-described processing. Needless to say, individual processing unit may have both the configurations, and a part of the above-described processing may be achieved by a logic circuit and another may be achieved by executing the program. The configurations of the processing units may be independent from each other, and, for example, among the processing units, some processing units may achieve a part of the above-described processing with a logic circuit, some other processing units may achieve the above-described processing by executing a program, and still some other processing units may achieve the above-described processing with both a logic circuit and execution of a program.

In the image decoding device 800 having the above-described configuration, the above-described present technology may be applied to the decoding unit 812. For example, the decoding unit 812 may apply Method 1, Method 1-1, Method 1-2, Method 1-3, Method 2, Method 2-1, Method 2-1-1, Method 2-2, or a combination thereof. That is, the decoding unit 812 may have the configuration of the decoding device 200 (FIG. 7 or FIG. 12) or the decoding device 600 (FIG. 23).

By doing in this way, the image decoding device 800 can obtain an effect similar to the effect obtained by each decoding device in a case of applying each method described in <3. Constraint on picture type> and <4. Constraint on slice type>. For example, the image decoding device 800 can make a specification of a bitstream to correspond to a profile more reliably.

<Flow of Image Decoding Processing>

Figure 30:
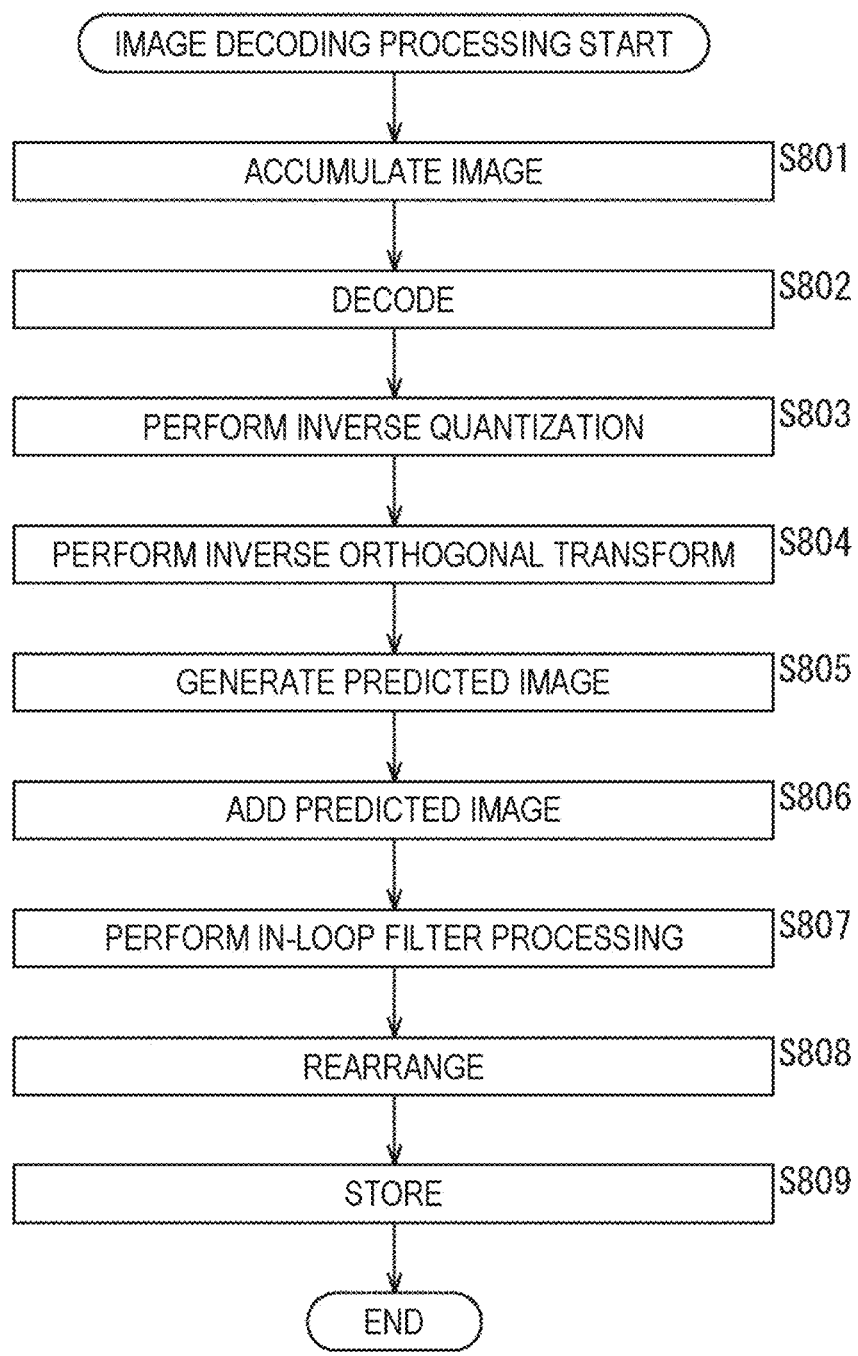
FIG. 30 is a flowchart illustrating an example of a flow of image decoding processing.

Next, an example of a flow of image decoding processing executed by the image decoding device 800 having the above configuration will be described with reference to a flowchart of FIG. 30.

When the image decoding processing is started, in step S801, the accumulation buffer 811 acquires and holds (accumulates) coded data (bitstream) supplied from the outside of the image decoding device 800.

In step S802, the decoding unit 812 executes decoding processing, to decode the coded data (bitstream) to obtain the quantization coefficient qcoeff. Furthermore, the decoding unit 812 parses (analyzes and acquires) various encoding parameters from the coded data (bitstream) by this decoding.

In step S803, the inverse quantization unit 813 performs inverse quantization, which is inverse processing of the quantization performed on the encoding side, on the quantization coefficient qcoeff obtained by the processing in step S802 to obtain the transform coefficient Coeff_IQ.

In step S804, the inverse orthogonal transform unit 814 performs inverse orthogonal transform processing, which is inverse processing of the orthogonal transform processing performed on the encoding side, on the transform coefficient Coeff_IQ obtained in step S803 to obtain the prediction residual D'.

In step S805, the prediction unit 819 executes prediction processing by a prediction method designated by the encoding side on the basis of the information parsed in step S802, and generates the predicted image P by referring to the reference image stored in the frame memory 818 or the like.

In step S806, the calculation unit 815 adds the prediction residual D' obtained in step S804 and the predicted image P obtained in step S805 to derive the locally decoded image Rlocal.

In step S807, the in-loop filter unit 816 performs the in-loop filter processing on the locally decoded image Rlocal obtained by the processing of step S806.

In step S808, the rearrangement buffer 817 derives the decoded image R using the filtered locally decoded image Rlocal obtained by the processing in step S807, and rearranges the order of the group of decoded images R from the decoding order to the reproduction order. The group of the decoded images R rearranged in order of regeneration is output as moving images to outside of the image decoding device 800.

Furthermore, in step S809, the frame memory 818 stores at least one of the locally decoded image Rlocal obtained by the processing in step S806 and the locally decoded image Rlocal after the filter processing obtained by the processing in step S807.

When the processing of step S809 ends, the image decoding processing ends.

The above-described present technology may be applied to the decoding processing executed in step S802 of such image decoding processing. For example, in this processing, Method 1, Method 1-1, Method 1-2, Method 1-3, Method 2, Method 2-1, Method 2-1-1, Method 2-2, or a combination thereof may be applied.

Figure 8:
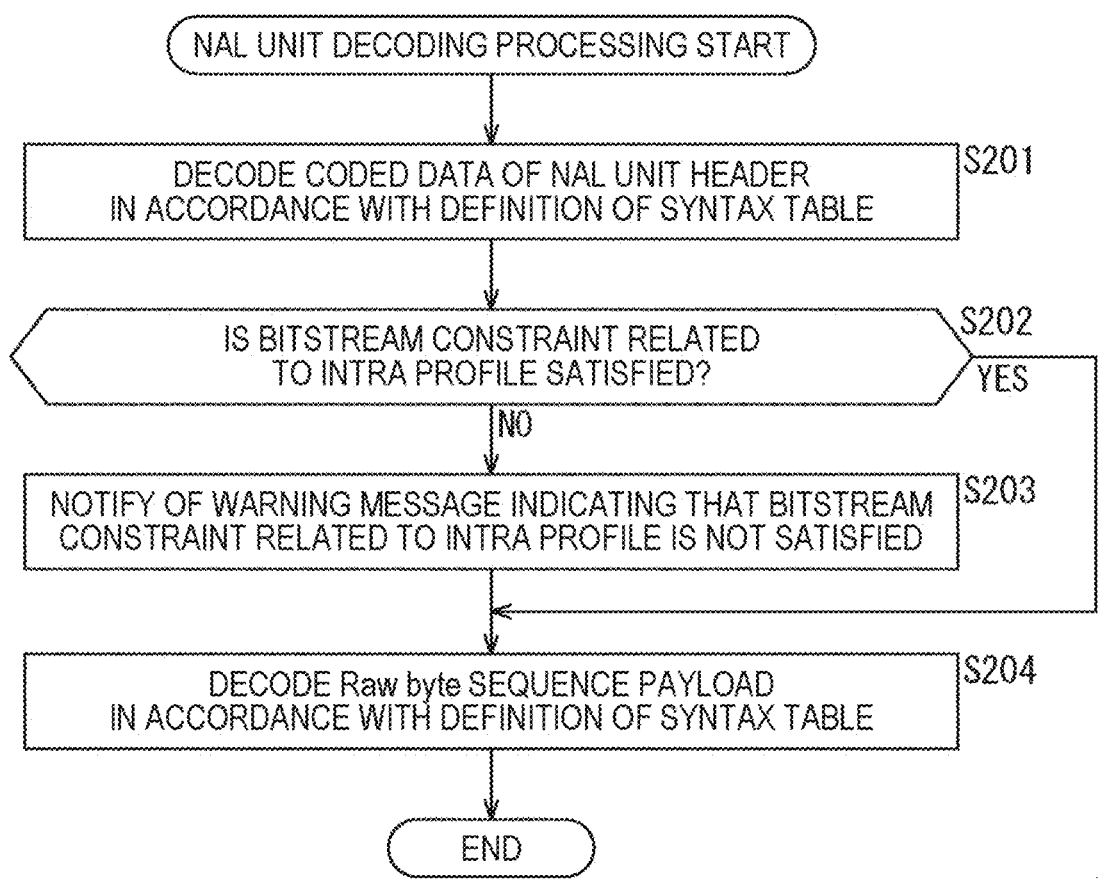
FIG. 8 is a flowchart illustrating an example of a flow of NAL unit decoding processing.

For example, the NAL unit decoding processing in FIG. 8, the decoding processing in FIG. 13, or the decoding processing in FIG. 24 may be executed in the decoding processing described above (step S802).

By doing in this way, the image decoding device 800 can obtain an effect similar to the effect obtained by each decoding device in a case of applying each method described in <3. Constraint on picture type> and <4. Constraint on slice type>. For example, the image decoding device 800 can make a specification of a bitstream to correspond to a profile more reliably.

6. Supplementary Note

<Computer>

The above-described series of processing can be executed by hardware or software. When a series of processing is executed by software, a program included in the software is installed on a computer. Here, the computer includes a computer incorporated in dedicated hardware, a general-purpose personal computer capable of executing various functions by installing various programs, and the like, for example.

Figure 31:
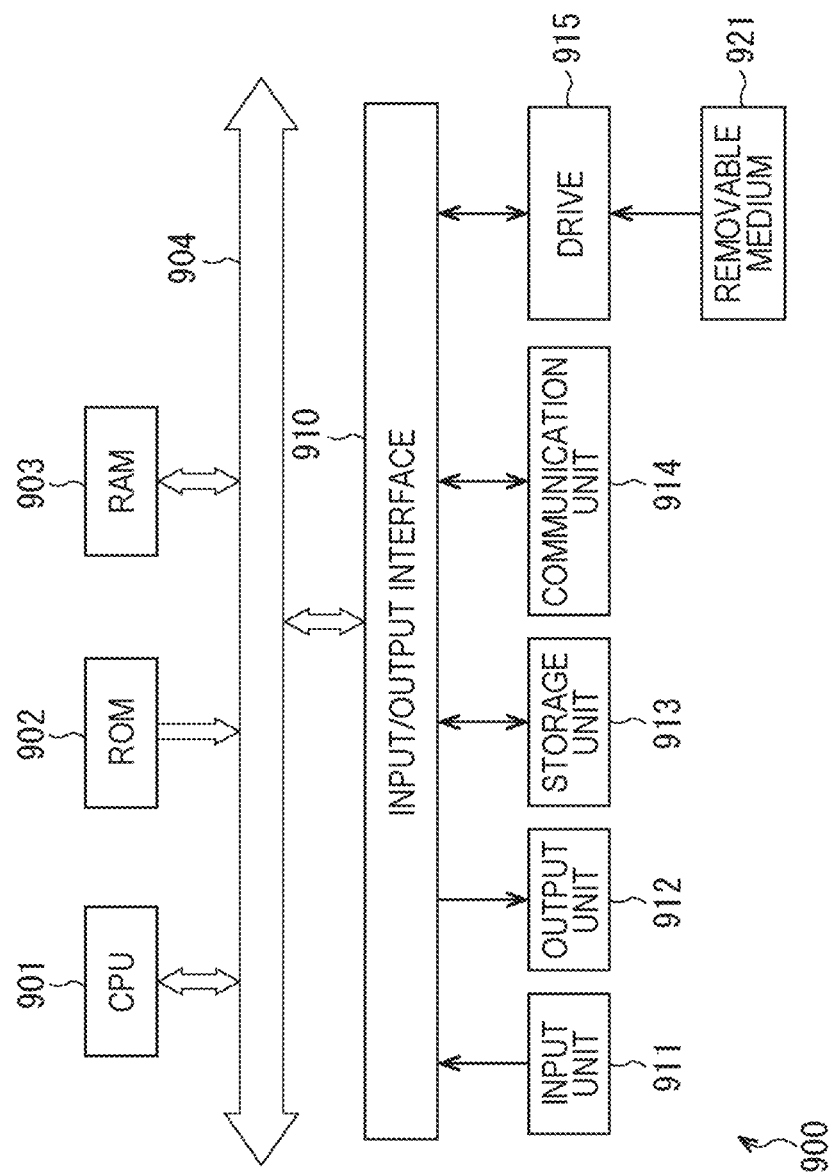
FIG. 31 is a block diagram illustrating a main configuration example of a computer.

FIG. 31 is a block diagram illustrating a configuration example of hardware of a computer that executes the above-described series of processing by a program.

In a computer 900 illustrated in FIG. 31, a central processing unit (CPU) 901, a read only memory (ROM) 902, and a random access memory (RAM) 903 are mutually connected via a bus 904.

Furthermore, an input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a non-volatile memory and the like. The communication unit 914 includes, for example, a network interface. The drive 915 drives a removable medium 921 such as a magnetic disk, an optical disk, a magneto-optical disk, or a semiconductor memory.

In the computer configured as described above, for example, the CPU 901 loads a program stored in the storage unit 913 into the RAM 903 via the input/output interface 910 and the bus 904 and executes the program, whereby the above-described series of processing is performed. Furthermore, the RAM 903 also appropriately stores data and the like necessary for the CPU 901 to execute various types of processing.

A program executed by the computer can be applied by being recorded on the removable medium 921 as a package medium, or the like, for example. In this case, the program can be installed in the storage unit 913 via the input/output interface 910 by attaching the removable medium 921 to the drive 915.

Furthermore, the program can also be provided via a wired or wireless transmission medium such as a local area network, the Internet, or digital satellite broadcasting. In this case, the program can be received by the communication unit 914 and installed in the storage unit 913.

In addition, this program can be installed in the ROM 902 or the storage unit 913 in advance.

Applicable Target of Present Technology

The present technology can be applied to any image encoding system or decoding system. That is, as long as it does not contradict the present technology described above, the specifications of various processing related to the image encoding and decoding, such as transform (inverse transform), quantization (inverse quantization), encoding (decoding), and prediction are arbitrary, and are not limited to the above-described examples. Furthermore, some of these pieces of processing may be omitted unless there is a contradiction with the present technology described above.

Furthermore, the present technology can be applied to a multi-view image encoding system that encodes a multi-view image including images of a plurality of viewpoints (views). Furthermore, the present technology can be applied to a multi-view image decoding system that decodes coded data of a multi-view image including images of a plurality of viewpoints (views). In that case, the present technology may be applied to encoding and decoding of each viewpoint (view).

Moreover, the present technology can be applied to a hierarchical image encoding (scalable encoding) system that encodes a hierarchical image layered (hierarchized) so as to have a scalability function for a predetermined parameter. Furthermore, the present technology can be applied to a hierarchical image decoding (scalable decoding) system that decodes coded data of a hierarchical image layered (hierarchized) so as to have a scalability function for a predetermined parameter. In that case, the present technology may be applied to encoding and decoding of each level (layer).

Furthermore, the present technology can be applied to any configuration. For example, the present technology can be applied to various electronic devices such as a transmitter and a receiver (for example, a television receiver and a mobile phone) in satellite broadcasting, cable broadcasting such as cable TV, distribution on the Internet, and distribution to a terminal by cellular communication, or a device (for example, a hard disk recorder and a camera) that records an image on a medium such as an optical disk, a magnetic disk, and a flash memory, or reproduces an image from the storage medium.

Furthermore, for example, the present technology can also be implemented as a partial configuration of an apparatus, such as a processor (for example, a video processor) as a system large scale integration (LSI) or the like, a module (for example, a video module) using a plurality of the processors or the like, a unit (for example, a video unit) using a plurality of the modules or the like, or a set (for example, a video set) obtained by further adding other functions to the unit.

Furthermore, for example, the present technology can also be applied to a network system including a plurality of apparatuses. For example, the present technology may be implemented as cloud computing shared and processed in cooperation by a plurality of apparatuses via a network. For example, the present technology may be implemented in a cloud service that provides a service related to an image (moving image) to any terminal such as a computer, an audio visual (AV) device, a portable information processing terminal, or an Internet of Things (IoT) device.

Note that, in the present specification, a system means a set of a plurality of components (apparatuses, modules (parts) and the like), and it does not matter whether or not all the components are in the same housing. Therefore, both of a plurality of apparatuses stored in different housings and connected via a network, and one apparatus in which a plurality of modules is stored in one housing are systems.

Field and Application to which the Present Technology is Applicable

The system, device, processing unit and the like to which the present technology is applied may be used in arbitrary fields such as traffic, medical care, crime prevention, agriculture, livestock industry, mining, beauty care, factory, household appliance, weather, and natural surveillance, for example. Furthermore, application thereof is also arbitrary.

For example, the present technology can be applied to systems and devices used for providing content for appreciation and the like. Furthermore, for example, the present technology can also be applied to systems and devices used for traffic, such as traffic condition management and automated driving control. Moreover, for example, the present technology can also be applied to systems and devices used for security. Furthermore, for example, the present technology can be applied to systems and devices used for automatic control of a machine and the like. Moreover, for example, the present technology can also be applied to systems and devices provided for use in agriculture and livestock industry. Furthermore, the present technology can also be applied to systems and devices that monitor, for example, the status of nature such as a volcano, a forest, and the ocean, wildlife and the like. Moreover, for example, the present technology can also be applied to systems and devices used for sports.

Others

Note that, in the present specification, a "flag" is information for identifying a plurality of states, and includes not only information used for identifying two states of true (1) and false (0) but also information capable of identifying three or more states. Therefore, a value that may be taken by the "flag" may be, for example, a binary of I/O or a ternary or more. That is, the number of bits forming this "flag" is any number, and may be one bit or a plurality of bits. Furthermore, identification information (including the flag) is assumed to include not only identification information thereof in a bitstream but also difference information of the identification information with respect to certain reference information in the bitstream, and thus, in the present specification, the "flag" and "identification information" include not only the information thereof but also the difference information with respect to the reference information.

Furthermore, various types of information (such as metadata) regarding coded data (bitstream) may be transmitted or recorded in any form as long as this is associated with the coded data. Herein, the term "associate" is intended to mean to make, when processing one data, the other data available (linkable), for example. That is, the data associated with each other may be collected as one data or may be made individual data. For example, information associated with the coded data (image) may be transmitted on a transmission path different from that of the coded data (image). Furthermore, for example, the information associated with the coded data (image) may be recorded in a recording medium different from that of the coded data (image) (or another recording area of the same recording medium). Note that, this "association" may be of not entire data but a part of data. For example, an image and information corresponding to the image may be associated with each other in any unit such as a plurality of frames, one frame, or a part within a frame.

Note that, in the present specification, terms such as "combine", "multiplex", "add", "integrate", "include", "store", "put in", "introduce", and "insert" mean, for example, to combine a plurality of objects into one, such as to combine coded data and metadata into one data, and mean one method of "associating" described above.

Furthermore, the embodiment of the present technology is not limited to the above-described embodiment and various modifications may be made without departing from the scope of the present technology.

For example, a configuration described as one apparatus (or processing unit) may be divided and configured as a plurality of apparatuses (or processing units). Conversely, configurations described above as a plurality of apparatuses (or processing units) may be collectively configured as one apparatus (or processing unit). Furthermore, a configuration other than the above-described configurations may be added to the configuration of each apparatus (or individual processing unit). Moreover, if the configuration and operation of the entire system are substantially the same, a part of the configuration of a certain apparatus (or processing unit) may be included in the configuration of another apparatus (or another processing unit).

Furthermore, for example, the above-described programs may be executed in an arbitrary apparatus. In this case, the apparatus is only required to have a necessary function (functional block and the like) and obtain necessary information.

Furthermore, for example, each step in one flowchart may be executed by one apparatus, or may be executed by being shared by a plurality of apparatuses. Moreover, when a plurality of pieces of processing is included in one step, the plurality of pieces of processing may be executed by one apparatus, or may be shared and executed by a plurality of apparatuses. In other words, a plurality of pieces of processing included in one step can be executed as a plurality of steps. Conversely, the pieces of processing described as a plurality of steps can be collectively executed as one step.

Furthermore, the program executed by the computer may have the following features. For example, the pieces of processing of the steps describing the program may be executed in time series in the order described in the present specification. Furthermore, the pieces of processing of the steps describing the program may be executed in parallel. Moreover, the pieces of processing of the steps describing the program may be individually executed at the necessary timing, such as when the program is called. That is, the pieces of processing of the respective steps may be executed in an order different from the above-described order as long as there is no contradiction. Furthermore, the pieces of processing of steps describing this program may be executed in parallel with the pieces of processing of another program. Moreover, the pieces of processing of the steps describing this program may be executed in combination with the pieces of processing of another program.

Furthermore, for example, a plurality of technologies related to the present technology can be implemented independently as a single entity as long as there is no contradiction. It goes without saying that any plurality of present technologies can be implemented in combination. For example, part or all of the present technology described in any of the embodiment can be implemented in combination with part or all of the present technology described in other embodiments. Furthermore, part or all of any of the above-described present technology can be implemented using together with another technology that is not described above.

Note that the present technology can also have the following configuration.

(1) An image processing apparatus including a picture encoding unit configured to encode a moving image as an encoding target with a picture type of all pictures set as an I-picture, in a case where a predetermined condition is satisfied.

(2) The image processing apparatus according to (1), in which in a case where the predetermined condition is satisfied, the picture encoding unit sets a NAL unit type of all VCL NAL units to a "value indicating IRAP", and encodes the moving image.

(3) The image processing apparatus according to (1) or (2), in which in a case where a profile for encoding of the moving image is an intra profile, the picture encoding unit encodes the moving image with the picture type of all the pictures set as an I-picture.

(4) The image processing apparatus according to (3), in which in a case where the profile is Main 12 Intra profile, Main 12 4:4:4 Intra profile, or Main 16 4:4:4 Intra profile, the picture encoding unit encodes the moving image with the picture type of all the pictures set as an I-picture.

(5) The image processing apparatus according to (4), in which in a case where a value of a profile identifier for identification of the profile is 10, 42, or 44, the picture encoding unit encodes the moving image with the picture type of all the pictures set as an I-picture.

(6) The image processing apparatus according to any one of (3) to (5), in which also in a case where the profile is a still picture profile, the picture encoding unit encodes the moving image with the picture type of all the pictures set as an I-picture.

(7) The image processing apparatus according to any one of (1) to (6), in which in a case where a control flag is true, the control flag being for control of whether to limit a picture type of all pictures of the moving image to an I-picture, the picture encoding unit encodes the moving image with the picture type of all the pictures set as an I-picture.

(8) The image processing apparatus according to (7), further including a parameter set encoding unit configured to set the control flag, encode the set control flag, and store the control flag into a bitstream of the moving image.

(9) An image processing method including encoding a moving image as an encoding target with a picture type of all pictures set as an I-picture, in a case where a predetermined condition is satisfied.

(11) An image processing apparatus including:

a picture decoding unit configured to decode a bitstream of a moving image as a decoding target; and a checking unit configured to check whether a picture type of all pictures of the moving image is an I-picture in the bitstream, in a case where a predetermined condition is satisfied.

(12) The image processing apparatus according to (11), in which in a case where the predetermined condition is satisfied, the checking unit checks whether a NAL unit type of all VCL NAL units is a "value indicating IRAP" in the bitstream.

(13) The image processing apparatus according to (11) or (12), in which in a case where a profile of the bitstream is an intra profile, the checking unit checks whether the picture type of all the pictures is an I-picture in the bitstream.

(14) The image processing apparatus according to (13), in which in a case where the profile is Main 12 Intra profile, Main 12 4:4:4 Intra profile, or Main 16 4:4:4 Intra profile, the checking unit checks whether the picture type of all the pictures is an I-picture in the bitstream.

(15) The image processing apparatus according to (14), in which in a case where a value of a profile identifier for identification of the profile is 10, 42, or 44, the checking unit checks whether the picture type of all the pictures is an I-picture in the bitstream.

(16) The image processing apparatus according to any one of (13) to (15), in which also in a case where the profile is a still picture profile, the checking unit checks whether the picture type of all the pictures is an I-picture in the bitstream.

(17) The image processing apparatus according to any one of (11) to (16), in which in a case where a control flag is true, the control flag being for control of whether to limit a picture type of all pictures of the moving image to an I-picture, the checking unit checks whether the picture type of all the pictures is an I-picture in the bitstream.

(18) The image processing apparatus according to (17), further including a control flag decoding unit configured to decode the bitstream to generate the control flag, in which in a case where the control flag decoded by the control flag decoding unit is true, the checking unit checks whether the picture type of all the pictures is an I-picture in the bitstream.

(19) An image processing method including:

decoding a bitstream of a moving image as a decoding target; and checking whether a picture type of all pictures of the moving image is an I-picture in the bitstream, in a case where a predetermined condition is satisfied.

(21) An image processing apparatus including:

a parameter set encoding unit configured to set a control flag to true and encode a parameter set including the control flag, the control flag being for control of whether to limit a slice type of all slices of a moving image to an I-slice, in a case where a profile for encoding of the moving image is an intra profile; and a picture encoding unit configured to encode the moving image with all the slices set as I-slices in a case where the control flag is true.

(22) The image processing apparatus according to (21), in which in a case where the control flag is true, the picture encoding unit sets a value of sh_slice_type to "2", the sh_slice_type being a parameter indicating a slice type.

(23) The image processing apparatus according to (21) or (22), in which the parameter set encoding unit sets the control flag to true in a case where the profile is Main 12 Intra profile, Main 12 4:4:4 Intra profile, or Main 16 4:4:4 Intra profile.

(24) The image processing apparatus according to (23), in which the parameter set encoding unit sets the control flag to true in a case where a value of a profile identifier for identification of the profile is 10, 42, or 44.

(25) The image processing apparatus according to any one of (21) to (24), in which also in a case where the profile is a still picture profile, the parameter set encoding unit sets the control flag to true.

(26) An image processing method including:

setting a control flag to true and encoding a parameter set including the control flag, the control flag being for control of whether to limit a slice type of all slices of a moving image to an I-slice, in a case where a profile for encoding of the moving image is an intra profile; and encoding the moving image with all the slices set as I-slices in a case where the control flag is true.

(31) An image processing apparatus including:

a control flag decoding unit configured to decode a bitstream of a moving image and generate a control flag for control of whether to limit a slice type of all slices of the moving image to an I-slice; and a control flag checking unit configured to check whether the control flag is true in a case where a profile of the bitstream is an intra profile.

(32) The image processing apparatus according to (31), in which the control flag checking unit checks whether the control flag is true in a case where the profile is Main 12 Intra profile, Main 12 4:4:4 Intra profile, or Main 16 4:4:4 Intra profile.

(33) The image processing apparatus according to (32), in which in a case where a value of a profile identifier for identification of the profile is 10, 42, or 44, the control flag checking unit checks whether the control flag is true.

(34) The image processing apparatus according to any one of (31) to (33), in which also in a case where the profile is a still picture profile, the control flag checking unit checks whether the control flag is true.

(35) The image processing apparatus according to any one of (31) to (34), further including:

a picture decoding unit configured to decode the bitstream to generate the moving image; and a picture checking unit configured to check whether a slice type of all slices of the moving image is an I-slice in the bitstream in a case where a predetermined condition is satisfied.

(36) The image processing apparatus according to (35), in which in a case where the control flag is true, the picture checking unit checks whether the slice type of all the slices is an I-slice in the bitstream.

(37) The image processing apparatus according to (35) or (36), in which in a case where the profile is an intra profile, the picture checking unit checks whether the slice type of all the slices is an I-slice in the bitstream.

(38) An image processing method including:
decoding a bitstream of a moving image and generating a control flag for control of whether to limit a slice type of all slices of the moving image to an I-slice; and
checking whether the control flag is true in a case where a profile of the bitstream is an intra profile.

REFERENCE SIGNS LIST

100 Encoding device
101 NAL unit encoding unit
111 NAL unit header setting unit
112 NAL unit header setting unit
113 Raw Byte sequence payload encoding unit
200 Decoding device
201 NAL unit decoding unit
211 NAL unit header decoding unit
212 Bitstream constraint checking unit
213 Raw Byte sequence payload decoding unit
301 Parameter set encoding unit
311 Control flag setting unit
312 Control flag encoding unit
401 Parameter set decoding unit
411 Control flag decoding unit
500 Encoding device
501 Parameter set encoding unit
502 Picture encoding unit
511 Intra-only constraint flag setting unit
512 Intra-only constraint flag encoding unit
521 Slice header setting unit
522 Slice header encoding unit
523 Slice encoding unit
600 Decoding device
601 Parameter set decoding unit
602 Picture decoding unit
611 Intra-only constraint flag decoding unit
612 Bitstream constraint checking unit
621 Slice header decoding unit
622 Bitstream constraint checking unit
623 Slice decoding unit
700 Image encoding device
715 Encoding unit
800 Image decoding device
812 Decoding unit
900 Computer

The invention claimed is:
1. An image processing apparatus comprising:
processing circuitry configured to:
encode a moving image as an encoding target with a picture type of all pictures set as an I-picture, in a case where a predetermined condition is satisfied; and
in a case where a control flag is true, the control flag being for control of whether to limit a picture type of all pictures of the moving image to an I-picture, encode the moving image with the picture type of all the pictures set as an I-picture.
2. The image processing apparatus according to claim 1, wherein
in a case where the predetermined condition is satisfied, the processing circuitry is configured to:
set a NAL unit type of all VCL NAL units to a "value indicating IRAP", and
encode the moving image.
3. The image processing apparatus according to claim 1, wherein
in a case where a profile for encoding of the moving image is an intra profile, the processing circuitry is configured to encode the moving image with the picture type of all the pictures set as an I-picture.
4. The image processing apparatus according to claim 3, wherein
in a case where the profile is Main 12 Intra profile, Main 12 4:4:4 Intra profile, or Main 16 4:4:4 Intra profile, the processing circuitry is configured to encode the moving image with the picture type of all the pictures set as an I-picture.
5. The image processing apparatus according to claim 4, wherein
in a case where a value of a profile identifier for identification of the profile is 10, 42, or 44, the processing circuitry is configured to encode the moving image with the picture type of all the pictures set as an I-picture.
6. The image processing apparatus according to claim 3, wherein
in a case where the profile is a still picture profile, the processing circuitry is configured to encode the moving image with the picture type of all the pictures set as an I-picture.
7. An image processing method comprising:
encoding a moving image as an encoding target with a picture type of all pictures set as an I-picture, in a case where a predetermined condition is satisfied:
in a case where a control flag is true, the control flag being for control of whether to limit a picture type of all pictures of the moving image to an I-picture encoding the moving image with the picture type of all the pictures set as an I-picture.
8. An image processing apparatus including:
processing circuitry configured to:
decode a bitstream of a moving image as a decoding target;
check whether a picture type of all pictures of the moving image is an I-picture in the bitstream, in a case where a predetermined condition is satisfied; and
in a case where a control flag is true, the control flag being for control of whether to limit a picture type of all pictures of the moving image to an I-picture, check whether the picture type of all the pictures is an I-picture in the bitstream.
9. The image processing apparatus according to claim 8, wherein
in a case where the predetermined condition is satisfied, the processing circuitry is configured to check whether a NAL unit type of all VCL NAL units is a "value indicating IRAP" in the bitstream.
10. The image processing apparatus according to claim 8, wherein
in a case where a profile of the bitstream is an intra profile, the processing circuitry is configured to check whether the picture type of all the pictures is an I-picture in the bitstream.
11. The image processing apparatus according to claim 10, wherein
in a case where the profile is Main 12 Intra profile, Main 12 4:4:4 Intra profile, or Main 16 4:4:4 Intra profile, the processing circuitry is configured to check whether the picture type of all the pictures is an I-picture in the bitstream.
12. The image processing apparatus according to claim 11, wherein in a case where a value of a profile identifier for identification of the profile is 10, 42, or 44, the processing circuitry is configured to check whether the picture type of all the pictures is an I-picture in the bitstream.

13. The image processing apparatus according to claim 10, wherein
in a case where the profile is a still picture profile, the processing circuitry is configured to check whether the picture type of all the pictures is an I-picture in the bitstream.

14. An image processing method comprising:
decoding a bitstream of a moving image as a decoding target;
checking whether a picture type of all pictures of the moving image is an I-picture in the bitstream, in a case where a predetermined condition is satisfied; and
in a case where a control flag is true, the control flag being for control of whether to limit a picture type of all pictures of the moving image to an I-picture check whether the picture type of all the pictures is an I-picture in the bitstream.

15. An image processing apparatus comprising:
processing circuitry configured to:
set a control flag to true;
encode a parameter set including the control flag, the control flag being for control of whether to limit a slice type of all slices of a moving image to an I-slice, in a case where a profile for encoding of the moving image is an intra profile; and
encode the moving image with all the slices set as I-slices in a case where the control flag is true.

16. An image processing method comprising:
setting a control flag to true;
encoding a parameter set including the control flag, the control flag being for control of whether to limit a slice type of all slices of a moving image to an I-slice, in a case where a profile for encoding of the moving image is an intra profile; and
encoding the moving image with all the slices set as I-slices in a case where the control flag is true.

17. An image processing apparatus comprising:
processing circuitry configured to:
decode a bitstream of a moving image;
generate a control flag for control of whether to limit a slice type of all slices of the moving image to an I-slice; and
check whether the control flag is true in a case where a profile of the bitstream is an intra profile.

18. An image processing method comprising:
decoding a bitstream of a moving image;
generating a control flag for control of whether to limit a slice type of all slices of the moving image to an I-slice; and
checking whether the control flag is true in a case where a profile of the bitstream is an intra profile.

* * * * *